(12) United States Patent
Klinstein et al.

(10) Patent No.: US 11,426,946 B2
(45) Date of Patent: *Aug. 30, 2022

(54) SYSTEMS AND METHODS USING AN ULTRASONIC TRANSDUCER AND SCRUBBING HORN MOTION TO SEAL A PART

(71) Applicant: Dukane IAS, LLC, St. Charles, IL (US)

(72) Inventors: Leo Klinstein, Glenview, IL (US); Petr Vasko, Velke Prilepy (CZ); Robert Edward Aldaz, St. Charles, IL (US); Joseph Re, Lemont, IL (US); Andrew Germaine, East Yorkshire (GB)

(73) Assignee: Dukane IAS, LLC, St. Charles, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/403,653

(22) Filed: Aug. 16, 2021

(65) Prior Publication Data
US 2021/0370613 A1 Dec. 2, 2021

Related U.S. Application Data

(63) Continuation-in-part of application No. 17/074,252, filed on Oct. 19, 2020, now Pat. No. 11,090,758.
(Continued)

(51) Int. Cl.
*B29C 65/08* (2006.01)
*B29C 65/00* (2006.01)
(Continued)

(52) U.S. Cl.
CPC .......... *B29C 65/085* (2013.01); *B29C 65/088* (2013.01); *B29C 66/43122* (2013.01);
(Continued)

(58) Field of Classification Search
CPC ..... B29C 65/08; B29C 65/085; B29C 65/088; B29C 66/43122; B29L 2031/7128; B65B 51/225
(Continued)

(56) References Cited

U.S. PATENT DOCUMENTS

| 5,183,523 A | 2/1993 | Rinehart |
| 6,502,372 B1 | 1/2003 | Kaneko |

(Continued)

FOREIGN PATENT DOCUMENTS

| DE | 3218920 A1 | 11/1983 |
| JP | S60-82328 A | 5/1985 |
| JP | H01-133718 A | 5/1989 |

OTHER PUBLICATIONS

Extended European Search Report in European Patent Application No. EP 21171661.8, dated Sep. 10, 2021 (18 pages).
(Continued)

*Primary Examiner* — James D Sells
(74) *Attorney, Agent, or Firm* — Nixon Peabody LLP

(57) ABSTRACT

An ultrasonic welding system. The system includes an ultrasonic transducer assembly having a horn and a first transducer and a second transducer arranged to impart ultrasonic energy into the horn. The horn has a first part-interfacing surface and a second part-interfacing surface opposite the first part-interfacing surface. An actuator assembly is operatively coupled to the ultrasonic transducer assembly and configured to cause rotation of the horn. A controller is configured to: cause the actuator assembly to rotate the horn so that the first part-interfacing surface applies the ultrasonic energy to a first part along an entire length of the first part-interface surface while a first ultrasonic energy is applied through the horn via the first transducer to cause the first part-interfacing surface to vibrate
(Continued)

back and forth along its entire length as the first ultrasonic energy is applied by the first transducer to the horn.

19 Claims, 44 Drawing Sheets
(8 of 44 Drawing Sheet(s) Filed in Color)

Related U.S. Application Data which is a continuation-in-part of application No. 16/863,662, filed on Apr. 30, 2020, now Pat. No. 10,807,314.

(51) Int. Cl.
  *B65B 51/22* (2006.01)
  *B29L 31/00* (2006.01)
(52) U.S. Cl.
  CPC ........ *B29C 66/8322* (2013.01); *B65B 51/225* (2013.01); *B29L 2031/7128* (2013.01); *B29L 2031/7162* (2013.01)
(58) Field of Classification Search
  USPC ........................................................ 156/73.1
  See application file for complete search history.

(56) References Cited

U.S. PATENT DOCUMENTS

| | | | |
|---|---|---|---|
| 7,523,775 | B2 | 4/2009 | Matusmara |
| 8,082,966 | B2 | 12/2011 | Short |
| 8,272,424 | B2 | 9/2012 | Short |
| 8,414,723 | B2 * | 4/2013 | Maatta .................... B31F 5/006 |
| | | | 156/73.4 |
| 9,346,120 | B1 | 5/2016 | Graff |
| 9,938,033 | B2 | 4/2018 | Matheny |
| 10,029,409 | B2 | 7/2018 | Short |
| 10,391,715 | B1 | 8/2019 | Matheny |
| 10,399,274 | B2 | 9/2019 | Short |
| 10,807,314 | B1 | 10/2020 | Klinstein |
| 11,090,758 | B1 * | 8/2021 | Klinstein ............ B29C 66/8246 |

OTHER PUBLICATIONS

Widmann PM-Series, "Manufacturing a Variety of Pouches by Using the Ultrasonic Technology," retrieved on Jul. 20, 2020 at https://www.widmann-maschinen.com/en/machines/series-produced-machines/packaging (7 pages).

* cited by examiner

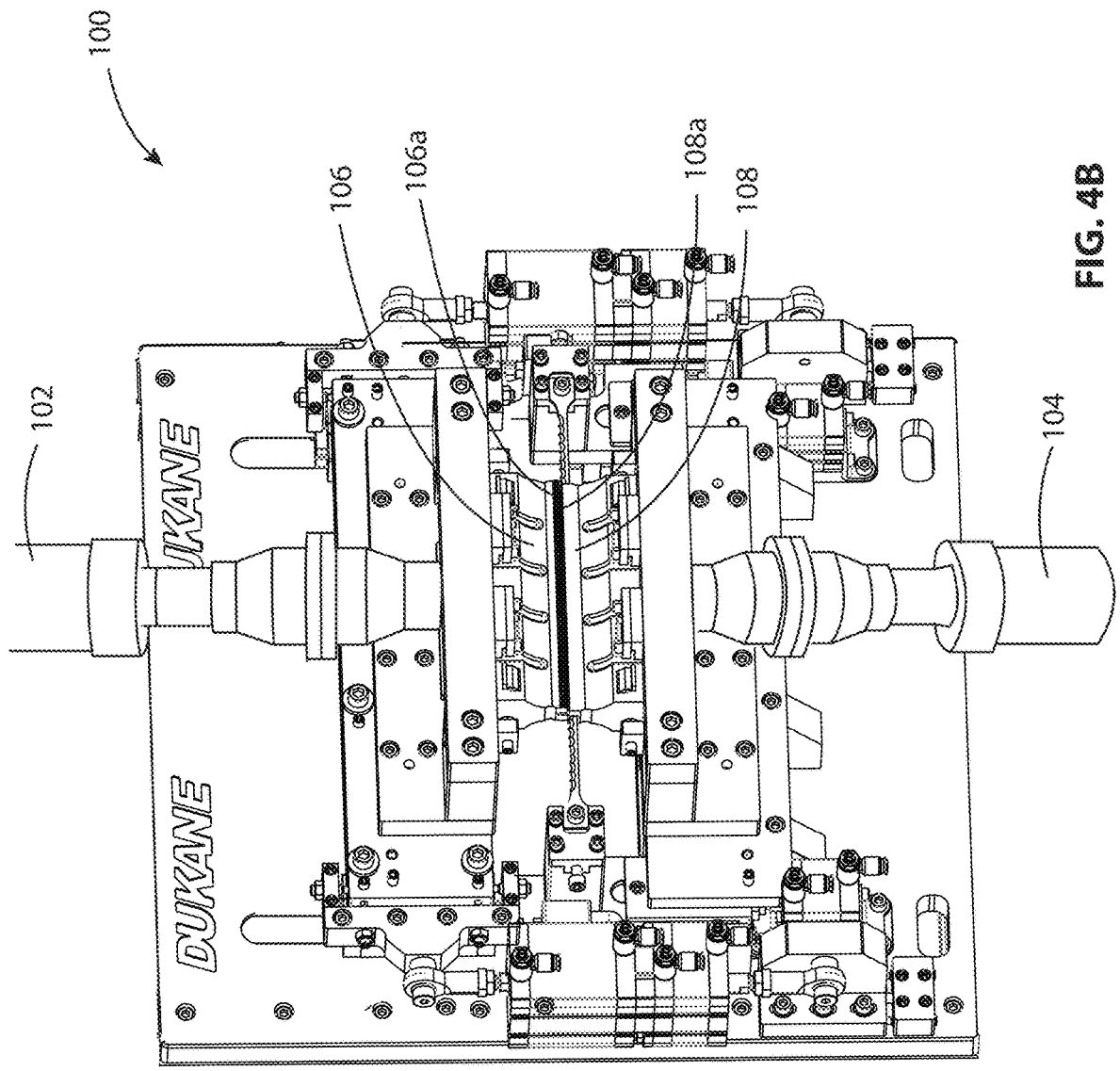

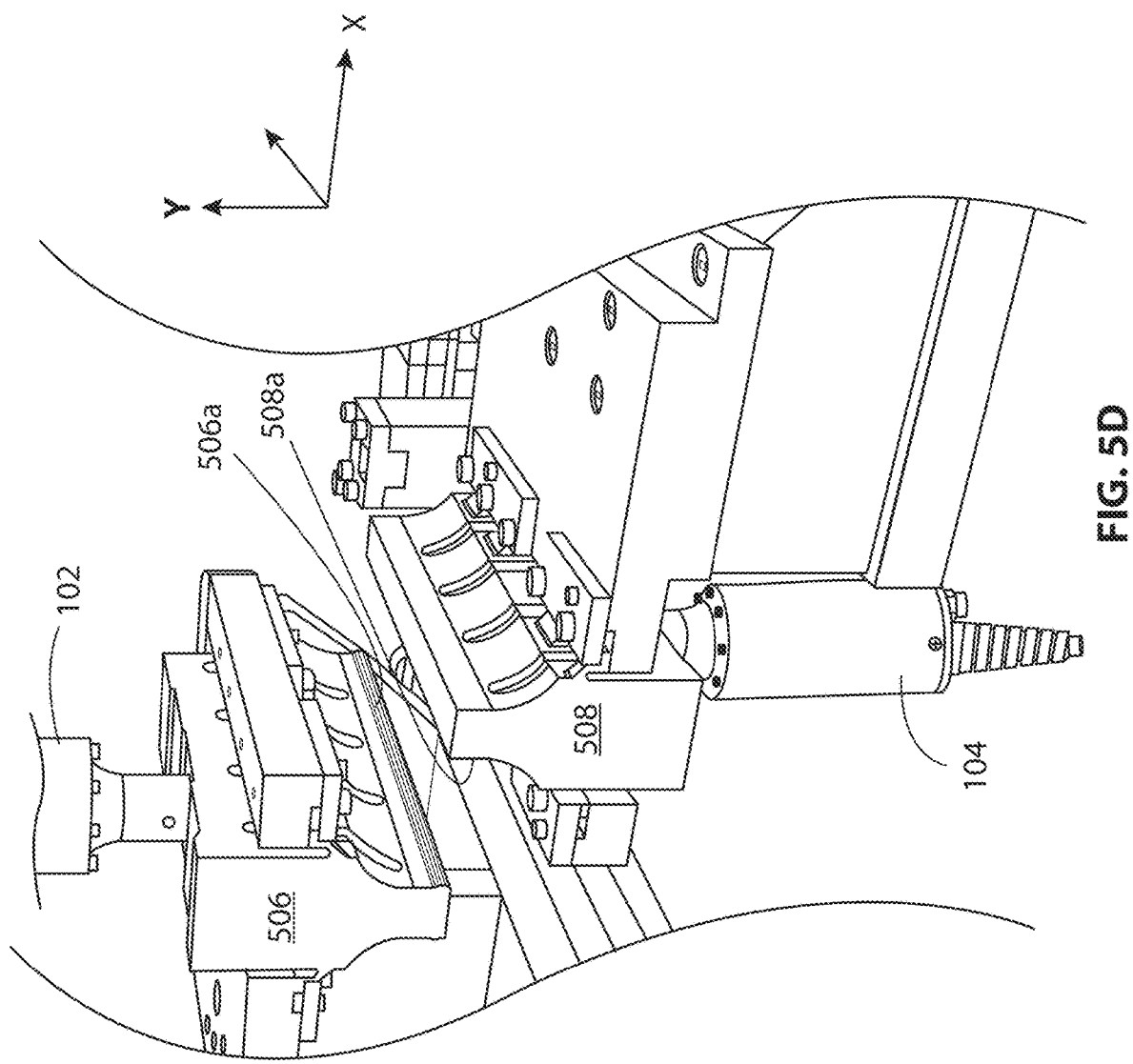

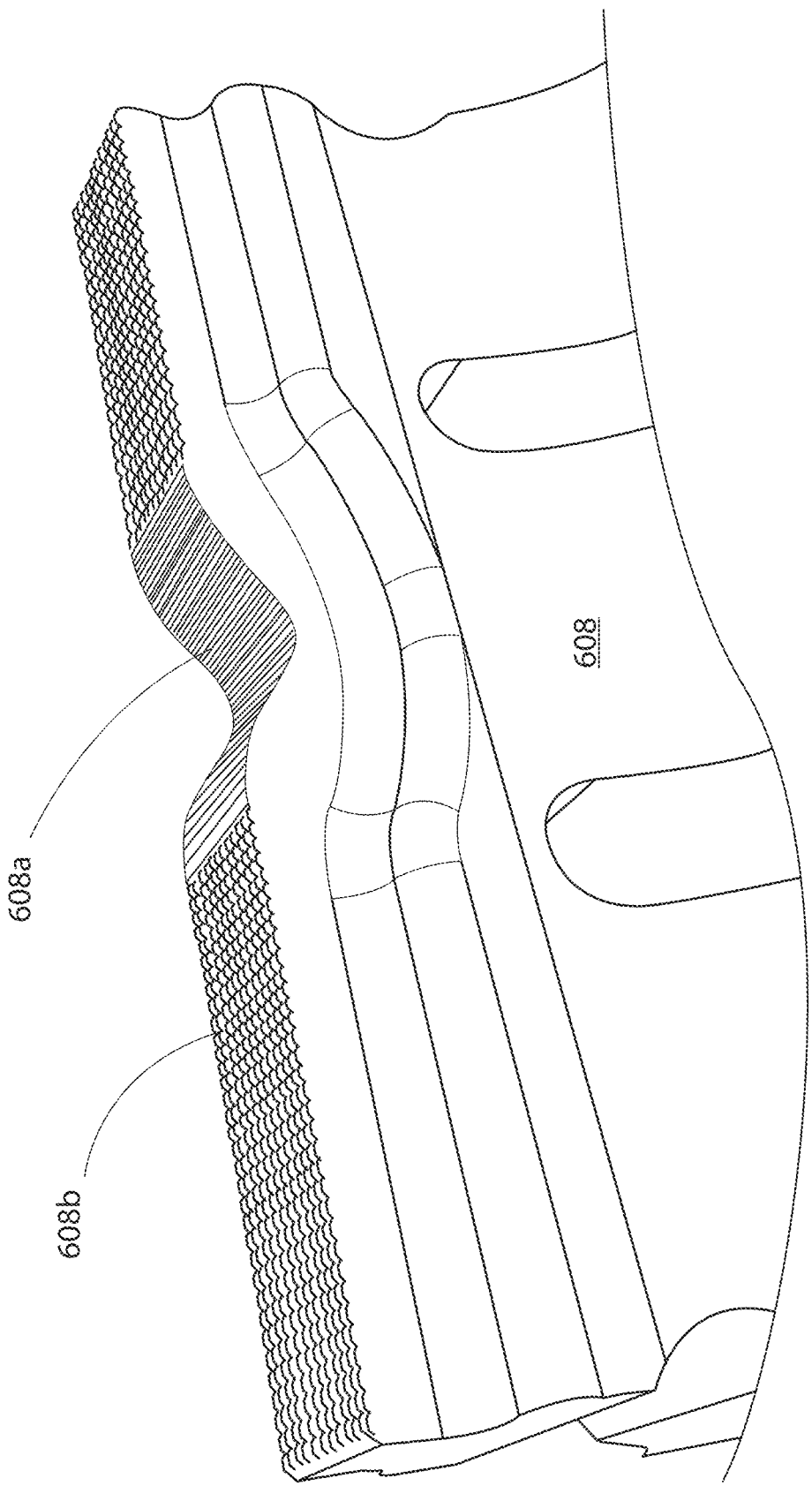

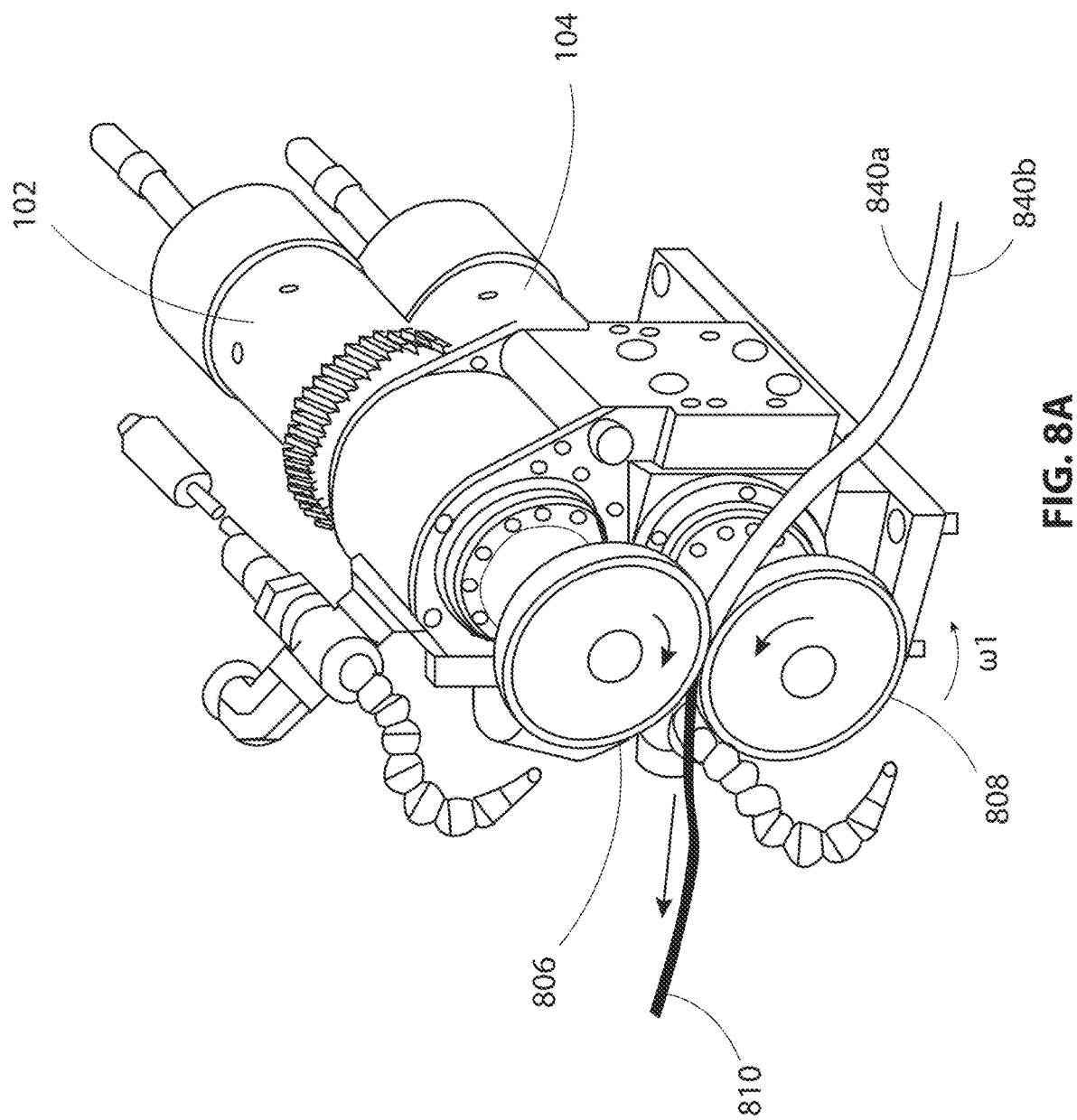

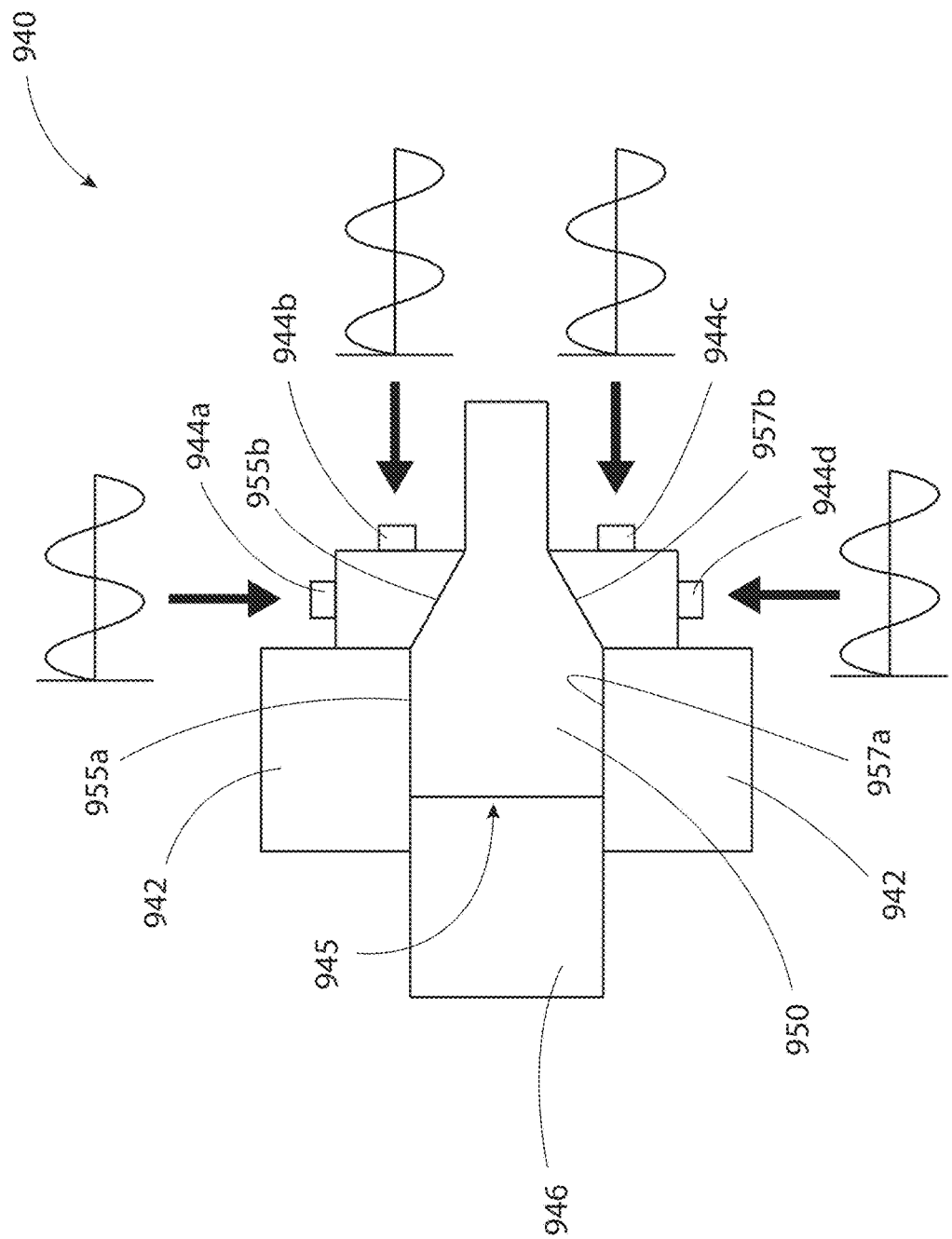

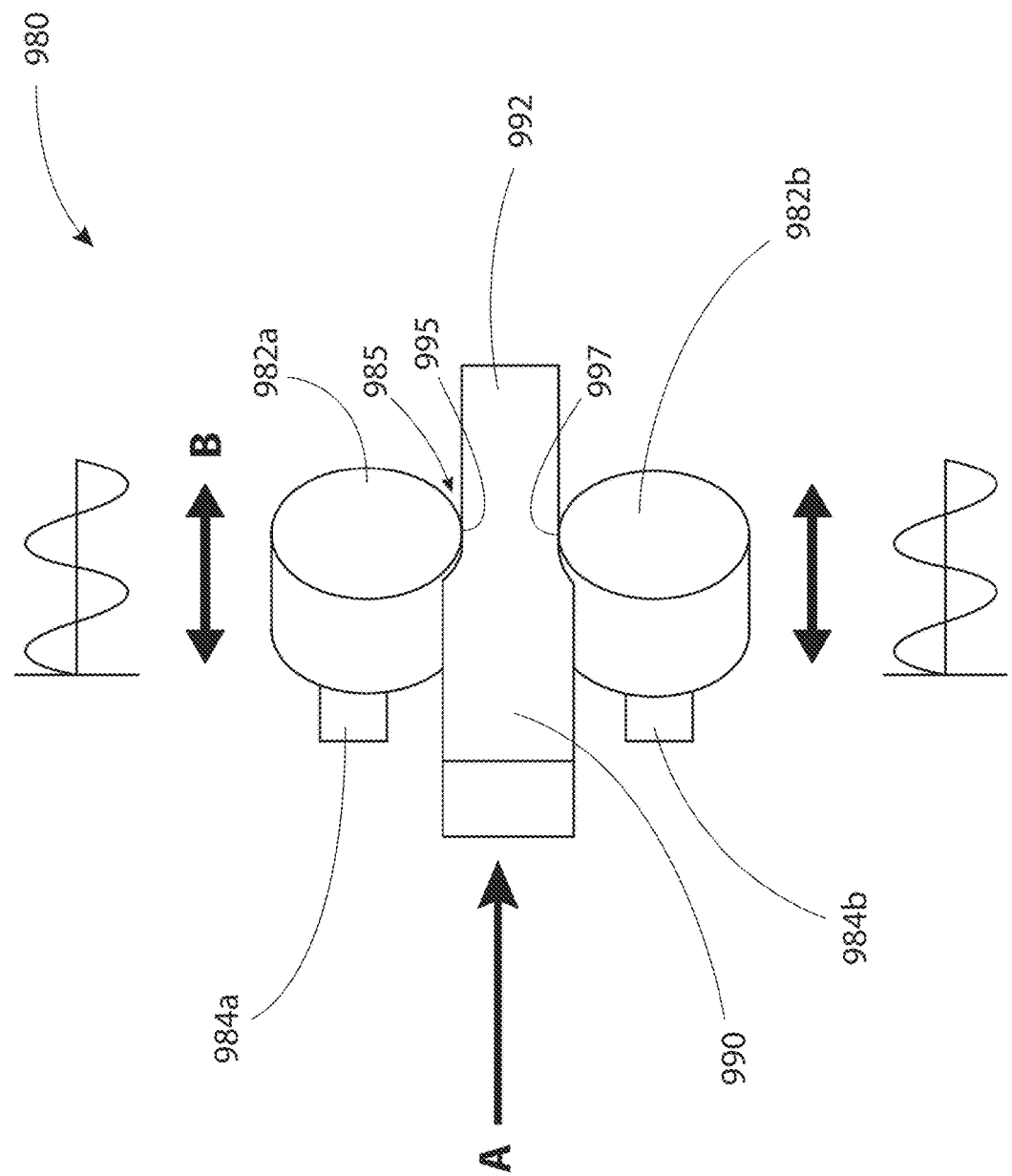

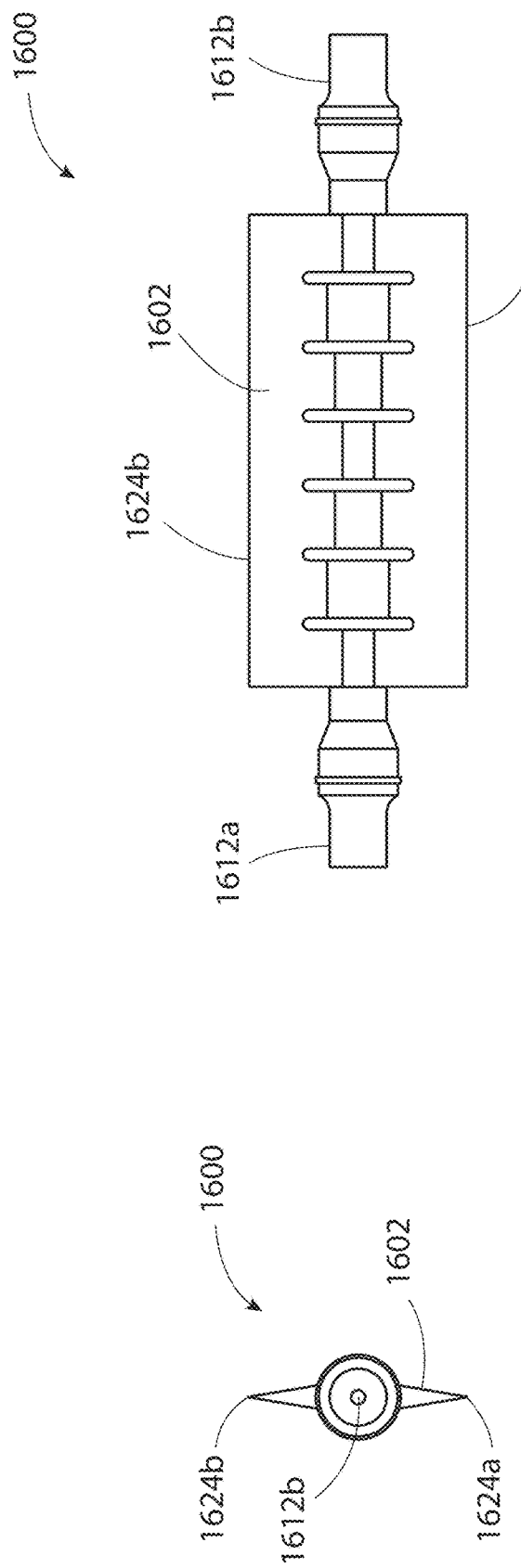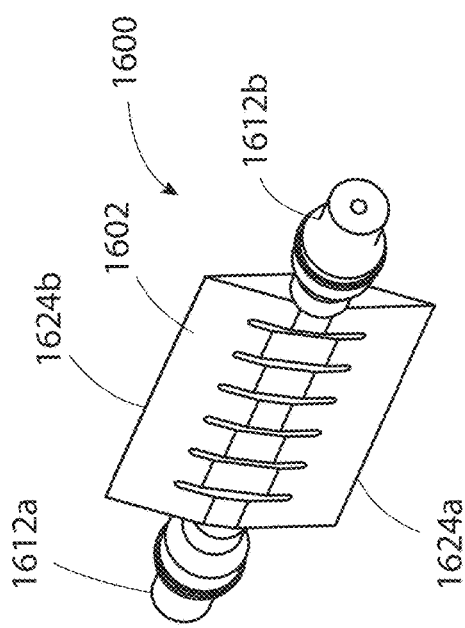
FIG. 16B
FIG. 16A
FIG. 16C

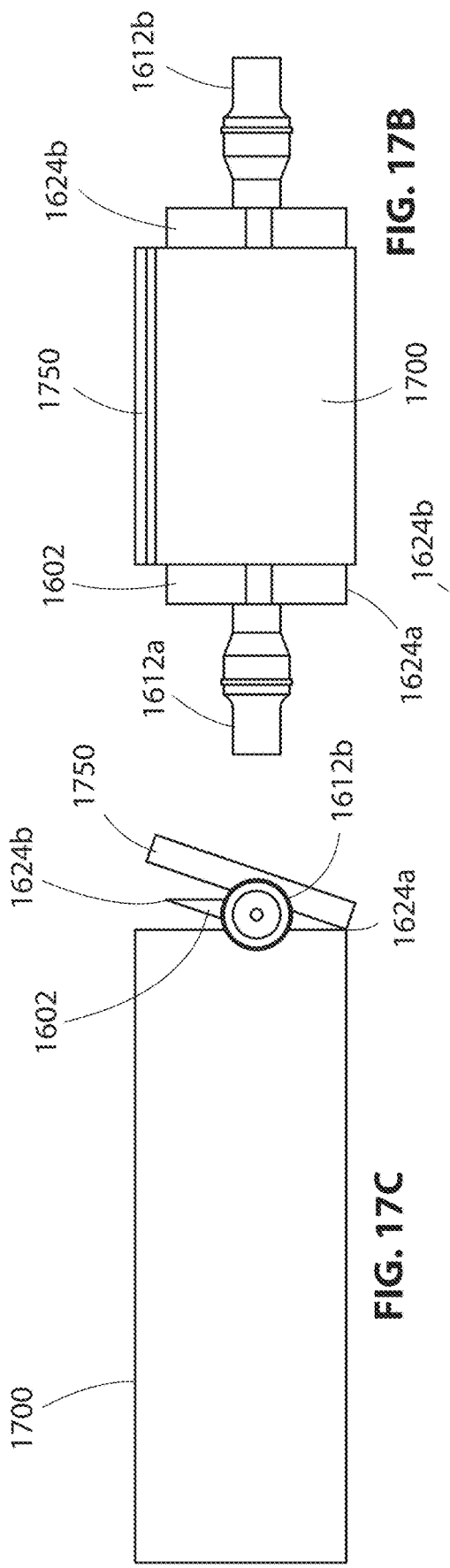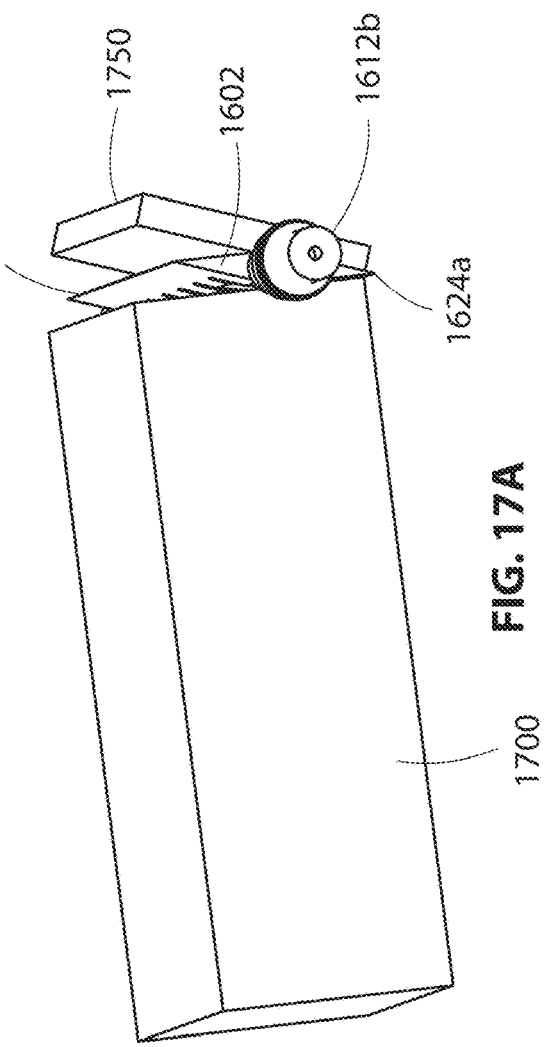

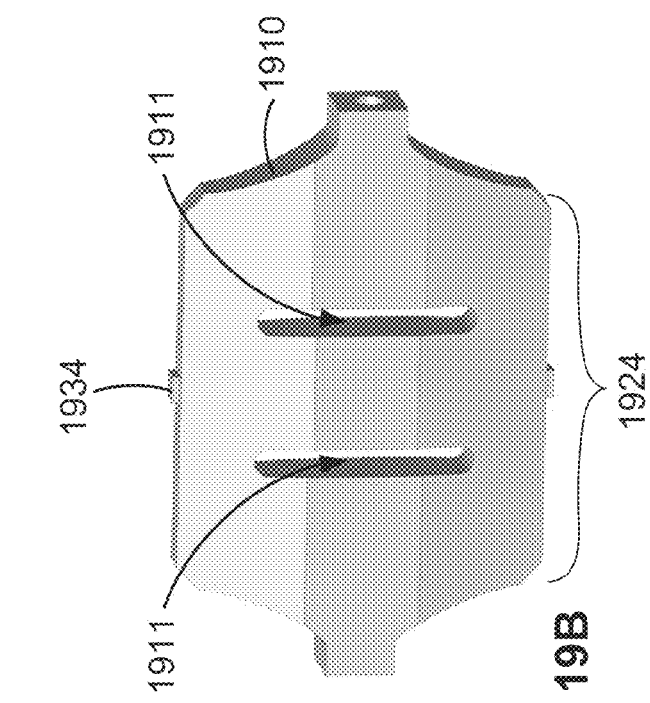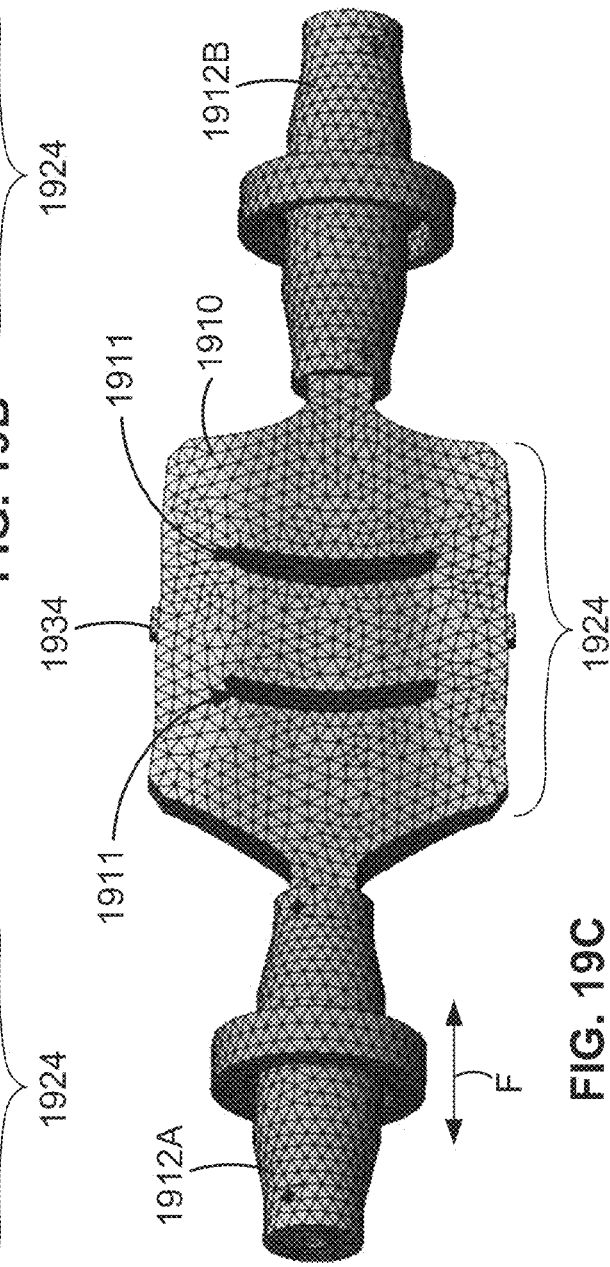
FIG. 19A  FIG. 19B  FIG. 19C

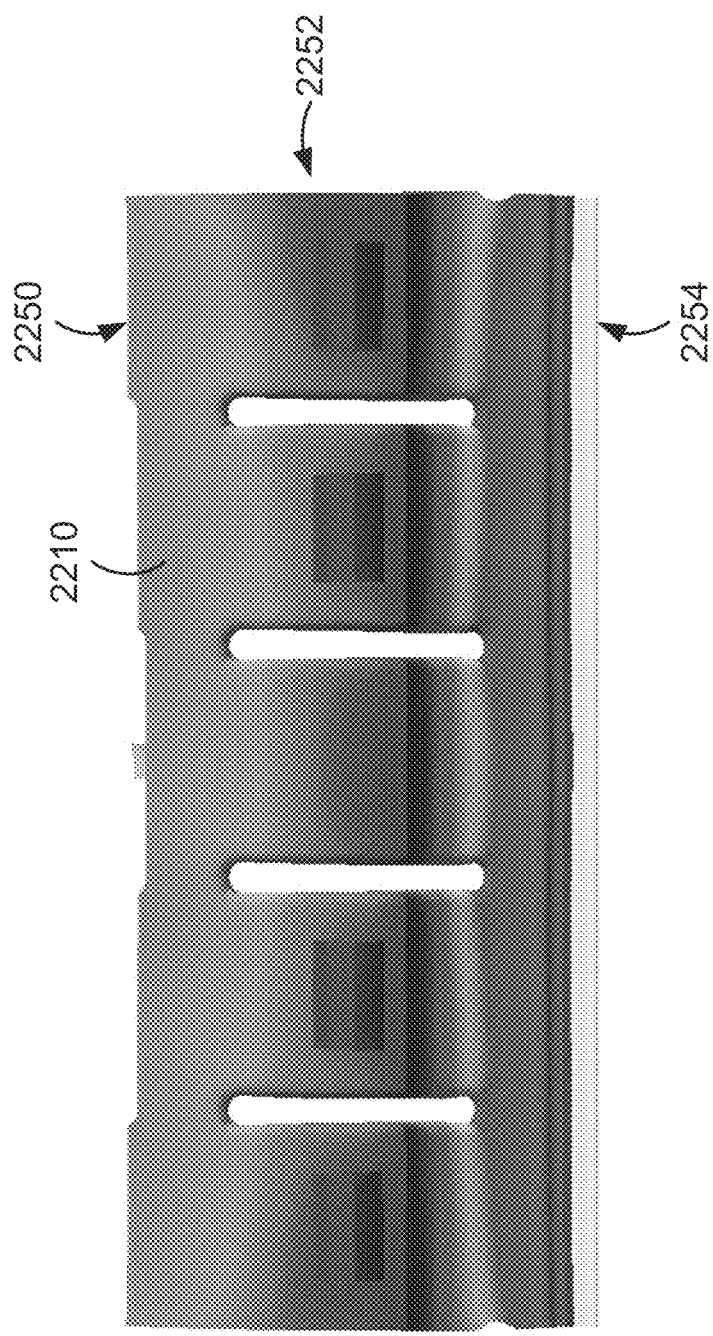
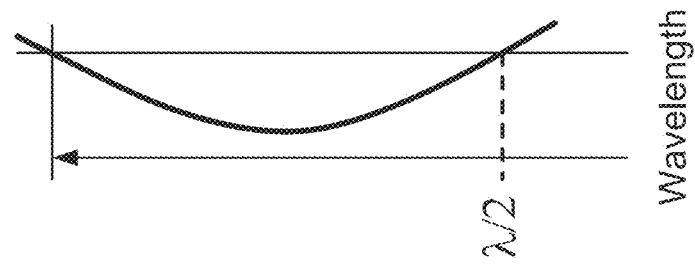
FIG. 22
(PRIOR ART)

SYSTEMS AND METHODS USING AN ULTRASONIC TRANSDUCER AND SCRUBBING HORN MOTION TO SEAL A PART

CROSS REFERENCE TO RELATED APPLICATIONS

This application is a continuation-in-part of U.S. patent application Ser. No. 17/074,252, filed Oct. 19, 2020, entitled "Systems and Methods Using Multiple Synchronized Transducers to Finish a Part," now allowed, which is a continuation-in-part of U.S. patent application Ser. No. 16/863,662, filed Apr. 30, 2020, entitled "Ultrasonic Welding Systems and Methods Using Dual, Synchronized Horns on Opposite Sides of Parts to be Joined," which is granted as U.S. Pat. No. 10,807,314, the entireties of which are incorporated herein by reference.

BACKGROUND OF THE INVENTION

Certain types of packaging or containers can have complex seal interfaces with a varying number of layers to be sealed along the seal interface. The seal in some applications must be hermetic, air tight, or must contain a liquid without any leaks. Conventional techniques to seal these interfaces are extremely wieldy, expensive, and can require multiple passes over the same interface to complete the seal, requiring a lengthy amount of time for each item to be sealed. Some preparation or manipulation of the item and/or its seal interface must also be carried out before the seal can be formed. These preparations or manipulations cause additional delays in the sealing process.

Typically, these items can be composed of or coated with a plastic film or a polyethylene material (e.g., liquid paperboard), such as pillow packs, flow wraps, and cartons or other containers, such as milk cartons having so-called gable tops. To seal these items, conventional approaches can require different machines to seal different materials, take a relatively long time and can require multiple passes to create a leak-proof seal, suffer from inconsistent seals and can produce failed seals that produce channel leaks, produce waste, are incapable of addressing certain seal shapes, particularly narrow seals, and require a lot of maintenance due in part to their complexity and number of moving parts.

In traditional ultrasonic welding, one ultrasonic stack is energized, and the part is pressed between the stack and a stationary anvil. For certain applications, this single-stack configuration poses challenges where the parts have multiple layers or other unusual geometries, and can require multiple passes over the same part to create a high quality seal or weld.

Gable top or other packaging sealing applications having an uneven number of layers (such as 4-2-4-5 layers across a width of an interface to be sealed) exemplifies the inadequacy of using a single-stack horn. Suppose each carton layer absorbs or attenuates about 10% of the applied ultrasonic energy/amplitude. By the time traditional welding gets through 4-5 layers, there will only be about 50% of the ultrasonic energy/amplitude remaining at the last layer, which is not enough to produce a reliable seal. If the force or amplitude or time were increased to compensate for this energy loss, there is a risk of over-welding the 2-layer section and possibly burning the external surface leaving a visual artifact on the product.

Round or oval interfaces, like spouts or ports, are very challenging to seal using conventional ultrasonic welding techniques. Usually, conventional techniques require many horns (e.g., up to four) and multiple repeating movements of the horns, e.g., three steps or more) to seal these types of parts. These configurations are bulky, complex, and introduce delay into a manufacturing process by having to repeat ultrasonic movements multiple times to carry out their welding or sealing task. A need exists, therefore, for a solution that solves these and other problems. Aspects of the present disclosure are directed to fulfilling these and other needs using ultrasonic energy in a one-pass application to create a seal on a part, such as on a Gable top of a carton.

Parts made of metal can be deformed using a die to contort the metal into a desired shape. Examples include wire drawing, deep drawing, rolling, extrusion, and forging processes. Some conventional processes leverage an externally applied lubricant to the die-part interface to facilitate the deformation of the metal through the die. Conventional processes can leave artifacts on the surface of the metal deformed by a die, and the throughput of the forming process is a function of the speed and force with which the metal can be deformed as it is forced through the die. A need exists to provide a better solution for metal forming processes.

Pillow pouches or bags or similar containers can be made of a flexible material such as plastic or a non-woven film, polyester printed to aluminum then laminated to polyethylene, metal including aluminum, metal foil, fabric, film, polyethylene-coated fiberboard or liquid paperboard, and the like. When presented on a roll, the sections between adjacent pouches need to be sealed to securely contain the contents of the pouch or bag. Conventional processes typically seal the pouch and later cut the section between adjacent pouches to singulate the pouches. First, these dual seal-then-cut actions introduce latency to the throughput of the entire pouch assembly and sealing process. Second, the roll must be paused long enough for the seal to be made between adjacent pouches, and the throughput is a direct function of how quickly the seal can be formed. Speeding up this sealing process will increase throughput. Carrying out the sealing and cutting operations simultaneously or near-simultaneously will further increase throughput.

SUMMARY OF THE INVENTION

According to an aspect of the present disclosure, an ultrasonic welding system for sealing together multiple layers of a part includes: a first ultrasonic welding stack including a first horn and a second ultrasonic stack including a second horn, the first horn having a first welding surface, the second horn having a second welding surface opposing the first welding surface to define a gap therebetween, wherein the gap is configured to receive therein the part to be sealed along a section of the part; an actuator assembly operatively coupled to the first and second ultrasonic welding stacks and configured to cause the first welding surface to move relative to the second welding surface; one or more controllers operatively coupled to the first and second ultrasonic welding stacks and to the actuator assembly, the one or more controllers operatively being configured to: cause the actuator assembly to urge the first and second welding surfaces of the first and second horns toward one another until contacting the part, and thereby apply toward the part a first ultrasonic energy via the first horn and a second ultrasonic energy via the second horn such that a frequency and a phase of the first and second ultrasonic energies are synchronized as the first and second ultrasonic energies are applied on both sides of the part simultaneously, to thereby the seal the part along the section.

The frequency can be between 15 kHz and 70 kHz. The part can be a gable top having a different number of layers arranged across a longitudinal direction of the gable top. Alternately, the part can be a gable top having a different number of layers arranged across a direction transverse to a longitudinal direction of the gable top. An amplitude of the first ultrasonic energy can be the same as or can differ from an amplitude of the second ultrasonic energy.

The system can further include a first generator generating the first ultrasonic energy and a second generator generating the second ultrasonic energy, wherein the first generator is designated as a master generator that auto-locks feedback from the first ultrasonic welding stack using a phase lock loop to itself and instructs the second generator that acts as a slave generator to match its own phase and frequency feedback to that generator by the first generator.

The part can be composed of a material that includes a polymeric film, a thermoplastic material, a non-woven material, a metal foil, or a metal. The part can be a pillow pack having an end portion having a different number of layers arranged across a longitudinal direction of the end portion. The part can include a different number of layers that includes, along the section of the part to be sealed, a first number of layers in a first portion of the section and a second number of layers in a second portion of the section, the first number differing from the second number.

The apparatus can be a pillow pack or a carton or a pouch. The part can be a spout to be sealed to a pouch.

The first horn can be a rotary horn and the second horn can be a rotary horn. The controller can be further configured to rotate the first horn and the second horn at the same rotational speed while applying the synchronized first and second ultrasonic energies to the part.

The first generator can include a first output and a second output, the first output can be operatively connected to a first transducer and the second output can be operatively connected to a second transducer. The first transducer can be operatively connected to the first horn and the second transducer can be operatively connected to the second horn.

An area of the part to be joined by far-field welding can be at least ¼ inch or 6 mm away from the first welding surface of the first horn or from the second welding surface of the second horn.

According to another aspect of the present disclosure, an ultrasonic welding method for sealing together multiple layers of a part includes the steps of: moving a first welding surface of a first horn toward an opposing a second welding surface of a second horn to close a gap between the first welding surface and the second welding surface until the first and second welding surfaces contact a part to be sealed along a section thereof; responsive to contacting the part, applying to the part a first ultrasonic energy via the first horn and a second ultrasonic energy via the second horn such that a frequency and a phase of the first and second ultrasonic energies are synchronized as the first and second ultrasonic energies are applied on both sides of the part simultaneously, to thereby seal the part along the section, the first and second horns being arranged to point toward one another.

The method can further include, responsive to sealing the layers together, retracting the first horn relative to the second horn to release the part. The frequency can be between 15 kHz and 70 kHz. The moving can be caused by a rotational movement of the first horn rotating at the same speed as a rotational movement of the second horn.

An amplitude of the first ultrasonic energy can be the same as or can differ from from an amplitude of the second ultrasonic energy. An apparatus having at least one seal applied by the methods disclosed herein is also contemplated.

According to a further aspect of the present disclosure, an ultrasonic welding or metal forming system is disclosed. The system includes synchronized ultrasonic transducers and includes: an ultrasonic transducer assembly including a horn and a first transducer and a second transducer arranged to impart ultrasonic energy into the horn, the horn having a first part-interfacing surface; a gap configured to receive therein a part to receive the ultrasonic energy from the first and second transducers at an interface through the horn; an actuator assembly operatively coupled to the ultrasonic transducer assembly and configured to cause the part to move relative to the gap; one or more controllers operatively coupled to the ultrasonic transducer assembly and to the actuator assembly, the one or more controllers operatively being configured to: cause the actuator assembly to urge the part toward the gap until the part is pressed against the first part-interfacing surface, and thereby apply toward the part a first ultrasonic energy through the horn via the first transducer and a second ultrasonic energy via the second transducer such that a frequency and a phase of the first and second ultrasonic energies are synchronized as the first and second ultrasonic energies are applied to the part.

The first part-interfacing surface of the horn can vibrate back and forth as the first and the second ultrasonic energies are applied by the first and second transducers to the horn. The vibration of the first part-interfacing surface can cause a deformation of the part as it moves relative to the gap. The deformation can be a change in a metallic structure of the part, the part can be composed of a metal, or the deformation can be a sealing of multiple layers of the part to form a seal.

The horn can have a second part-interfacing surface. The system can further include an anvil having a first surface and a second surface. The one or more controllers can be configured to cause the first surface of the anvil and the first part-interfacing surface of the horn to move toward one another and to cause the second surface of the anvil and the second part-interfacing surface to move toward one another to thereby create a first seal and a second seal simultaneously as the first and second ultrasonic energies are imparted by the first and second transducers into the horn.

The system can further include a blade arranged relative to the anvil between the first surface and the second surface thereof. The one or more controllers can be configured to actuate the blade to cut the part along a section between the first seal and the second seal simultaneously as the first seal and the second seal are created or after the first seal and the second seal are created.

The first and the second part-interfacing surfaces of the horn can vibrate back and forth as the first and the second ultrasonic energies are applied by the first and second transducers to the horn. A direction of the movement of the vibrations of the first and the second part-interfacing surfaces can be orthogonal to a direction of the movement of the part. Alternately, direction of the vibration of the horn can be transverse to a direction of the movement of the part relative to the gap.

The horn can have a second part-interfacing surface that is coplanar or parallel with the first part-interfacing surface. The system can further include an anvil having a first surface and a second surface coplanar or parallel with the first surface of the anvil. The one or more controllers can be configured to cause the horn and the anvil to move toward one another to thereby simultaneously create a first seal and a second seal separated by an intra-seal gap as the first and second ultrasonic energies are imparted by the first and second transducers into the horn.

The system can further include a blade arranged relative to the anvil between the first surface and the second surface thereof, the one more controllers being configured to actuate the blade to cut the part in the intra-seal gap simultaneously as the first seal and the second seal are created or after the first seal and the second seal are created. The horn can be a resonant horn. The part can be a wire that is drawn through the die using an ultrasonic transducer system disclosed herein.

According to a still further embodiment, a method of using synchronized ultrasonic transducers to cause a horn to vibrate relative to a part contacting the horn is disclosed. The method includes: receiving a part in a gap defined at least in part by a horn of an ultrasonic transducer assembly that includes the horn and a first transducer and a second transducer each arranged to impart ultrasonic energy into the horn, the horn having a first part-interfacing surface; causing the part to move, by an actuator assembly that is operatively coupled to the ultrasonic transducer assembly, toward the gap until the part contacts the first part-interfacing surface; responsive to the part contacting the first part-interfacing surface, applying toward the part a first ultrasonic energy through the horn via the first transducer and simultaneously applying toward the part a second ultrasonic energy through the horn via the second transducer such that a frequency and a phase of the first and second ultrasonic energies are synchronized as the first and second ultrasonic energies are applied to the part.

The first part-interfacing surface of the horn can vibrate back and forth as the first and the second ultrasonic energies are applied by the first and second transducers to the horn. The vibration of the first part-interfacing surface can cause a deformation of the part as it moves relative to the gap.

The deformation can be a change in a metallic structure of the part. The part can be composed of a metal. The deformation can be a sealing of multiple layers of the part to form a seal.

The horn can have a second part-interfacing surface. The method can further include causing a first surface of an anvil and the first-part interfacing surface of the horn to move toward one another and simultaneously causing a second surface of the anvil and the second part-interfacing surface to move toward one another to thereby create a first seal and a second seal simultaneously as the first and second ultrasonic energies are imparted by the first and second transducers into the horn.

The method can further include, responsive to simultaneously creating the first seal and the second seal, actuating a blade arranged relative to the anvil between the first surface and the second surface thereof to cut the part along a section between the first seal and the second seal.

The method can further include causing the horn and an anvil to move toward one another to thereby simultaneously create a first seal and a second seal separated by an intra-seal gap as the first and second ultrasonic energies are imparted by the first and second transducers into the horn, the horn having a second part-interfacing surface that is coplanar or parallel with the first part-interfacing surface.

The method can further include, responsive to simultaneously creating the first and second seals, actuating a blade to cut the part at the intra-seal gap, the blade being arranged relative to the anvil between the first and second surfaces thereof.

The horn can include a cutting blade. The first part-interfacing surface can be a cutting edge. The cutting blade can be configured to vibrate back and forth as the first and the second ultrasonic energies are applied by the first and second transducers to the cutting blade. The cutting blade can have a height that is less than a thickness of the part that the cutting blade cuts through.

According to a yet further aspect of the present disclosure, an ultrasonic welding system having an ultrasonic transducer assembly is disclosed. The system includes: an ultrasonic transducer assembly including a horn and a first transducer arranged to impart ultrasonic energy into the horn, the horn having a first part-interfacing surface at an exposed edge extending along a length of the horn and configured to contact a part to be joined, and a second surface along an opposite exposed edge extending along the length, wherein the height is a distance between the exposed edge and the opposite exposed edge. The horn has a height corresponding to an integer multiple of one wavelength, $\lambda$, of the applied ultrasonic energy, and includes at least two nodes and at least two anti-nodes. The at least two nodes are areas or regions of the horn of minimal amplitude of the ultrasonic energy and maximal mechanical strain of the horn. The at least two anti-nodes are areas or regions of the horn of maximal amplitude and minimal mechanical strain. A first of the at least two nodes is arranged at about $\lambda/4$ from the first part-interfacing surface, and a second of the at least two nodes is arranged at about $\lambda/4$ from the second surface. A first of the at least two anti-nodes is proximate the first part-interfacing surface, and a second of the at least two anti-nodes is proximate the second surface. The system further includes: one or more controllers operatively coupled to the ultrasonic transducer assembly and to the actuator assembly, the one or more controllers operatively being configured to: cause the first transducer to impart the ultrasonic energy directly or indirectly via one or more boosters into the horn to cause the first part-interfacing surface to vibrate back and forth along the length in a direction transverse to the height.

The system can further include a second transducer arranged to impart ultrasonic energy having the same or different frequency and amplitude as the ultrasonic energy imparted by the first transducer. The integer can be one or two or three, and a frequency of the ultrasonic energy can be about 20 kHz. A part sealed according to any system disclosed herein is also contemplated, and the part can be composed of a mono-layer, a bioplastic, a biodegradable, or recyclable layer or material.

BRIEF DESCRIPTION OF THE DRAWINGS

The patent or application file contains at least one drawing executed in color. Copies of this patent application publication with color drawings will be provided by the Office upon request and payment of the necessary fee.

FIG. 4B illustrates the ultrasonic welding stack of FIG. 4A with the horns closed together. For ease of illustration to show the horns, the part to be sealed has been removed from between the horns.

FIG. 5D illustrates the same configuration shown in FIG. 5C except with the two horns spaced a distance apart to receive in the gap therebetween an interface of a part to be sealed or joined together using synchronized ultrasonic energy applied to dual horns simultaneously.

FIG. 6B is a top, perspective view of a top welding surface of a bottom one of the horns showing a grooved pattern corresponding to a spout or non-flat structure to be joined using synchronized ultrasonic energy applied to dual opposing horns simultaneously.

FIG. 8A is an illustration of a front view of dual rotary-horn configuration, whose frequency, phase, and angular speed is synchronized to weld or seal layers of a part, such as being composed of a non-woven material, together.

FIG. 9C illustrates an ultrasonic-assisted metal extrusion process using multiple, synchronized ultrasonic transducers.

FIG. 9E illustrates an ultrasonic-assisted metal rolling process using multiple, synchronized ultrasonic transducers.

FIG. 16A is a perspective view of a rotatable resonant cutting blade sandwiched between two ultrasonic stack assemblies whose transducers output synchronized ultrasonic energy into the cutting blade, which operates like a resonant horn. Alternately this horn arrangement can be driven by a single transducer.

FIG. 16B is a side view of the cutting blade assembly shown in FIG. 16A.

FIG. 16C is an end view of the cutting blade assembly shown in FIG. 16A.

FIG. 17A is a perspective view of the rotatable cutting blade assembly shown in FIG. 16A cutting through a thick block of matter, such as food.

FIG. 17B is an end view of the rotatable cutting blade assembly shown in FIG. 17A in which the dual ultrasonic stack assemblies are visible.

FIG. 17C is a side view of the rotatable cutting blade assembly shown in FIG. 17A.

FIG. 19A illustrate a paddle-shaped scrubbing metal welding horn having elongated slots and scaling protrusions along a scrubbing surface of the horn.

FIG. 19B illustrates another paddle-shaped scrubbing metal welding horn having elongated slots and a single scaling protrusion along each edge of the horn.

FIG. 19C shows a color illustration of an FEA analysis of the horn shown in FIG. 19B.

FIG. 22 is an FEA analysis of a prior-art conventional horn in which the back-and-forth movement of the horn is elongated along a height of the horn, not along a width of the horn.

DETAILED DESCRIPTION

A surprising result discovered by the inventors of the inventions disclosed herein is that a very good hermetic seal (against air and liquid) can be formed using dual horns that deliver energy at ultrasonic frequencies when their frequencies and phases are synchronized. As used herein, a phase is synchronized when two waveforms are coincident at 0 degrees ("push-push") or 180 degrees ("push-pull"). Any other angles are considered asynchronous. Advantageously, only one pass is needed to form the seal, and the seal can be formed in as little as one second or less with a single application of ultrasonic energy (e.g., 0.35 sec). The seals have produced no leaks and work especially well when the interface to be sealed has a complex number of layers to be sealed together. For example, so-called Gable tops on milk cartons and the like can have a seal interface involving two layers on one end of the interface, up to four layers in another section of the interface, and possibly five layers at the other end of the interface, depending on how the carton blank is folded. The sealing problem becomes particularly challenging when trying to seal across an interface where different layers are present in different sections of the areas along the interface to be sealed.

Figure 2:
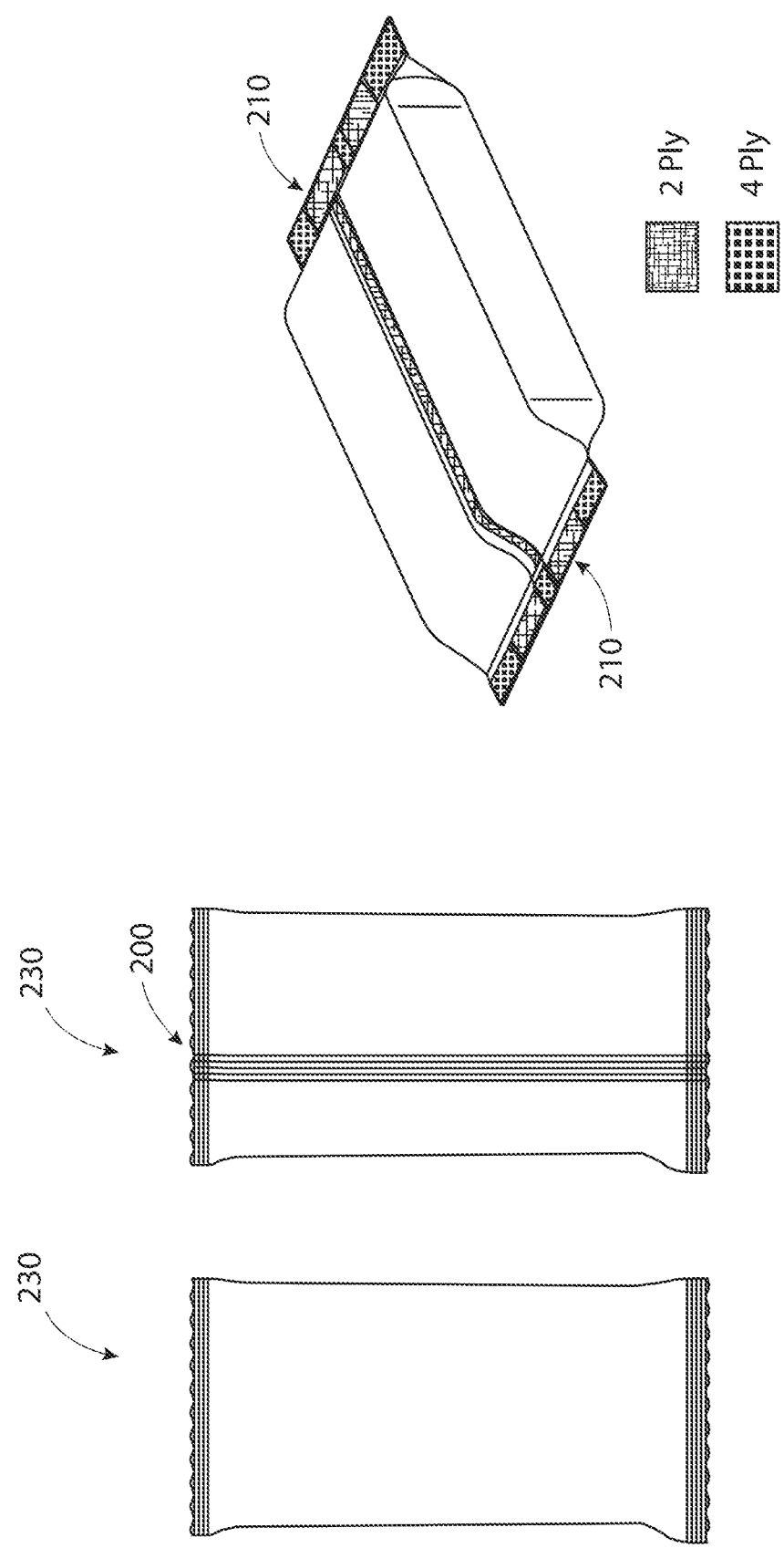
FIG. 2 illustrates a pillow pack and the number of different layers to be sealed along its ends to create a hermetically sealed package.
Figure 6A:
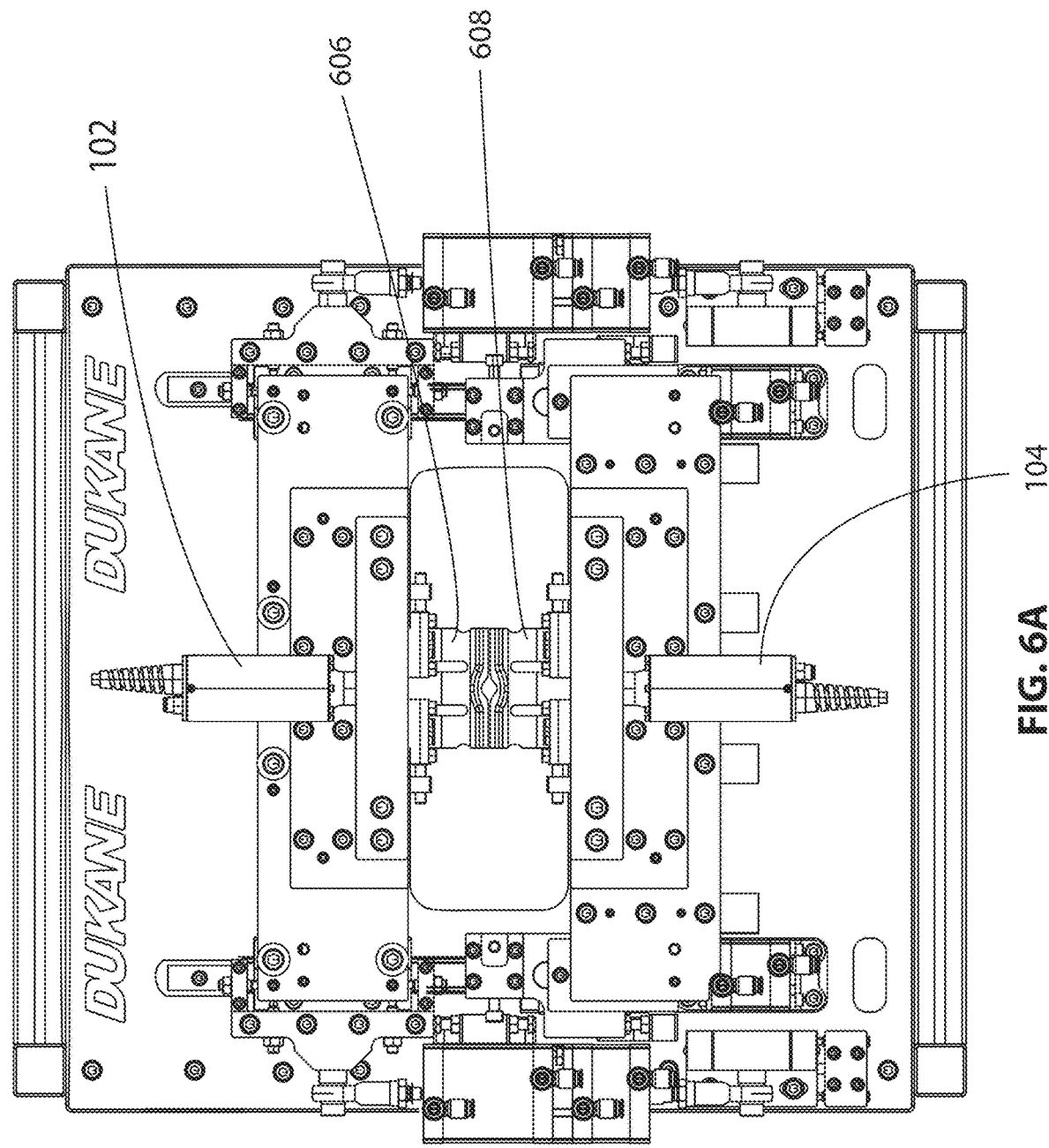
FIG. 6A illustrates another example configuration to seal or join a spout or non-flat structure to a part using synchronized ultrasonic energy applied to dual opposing horns simultaneously.
Figure 6C:
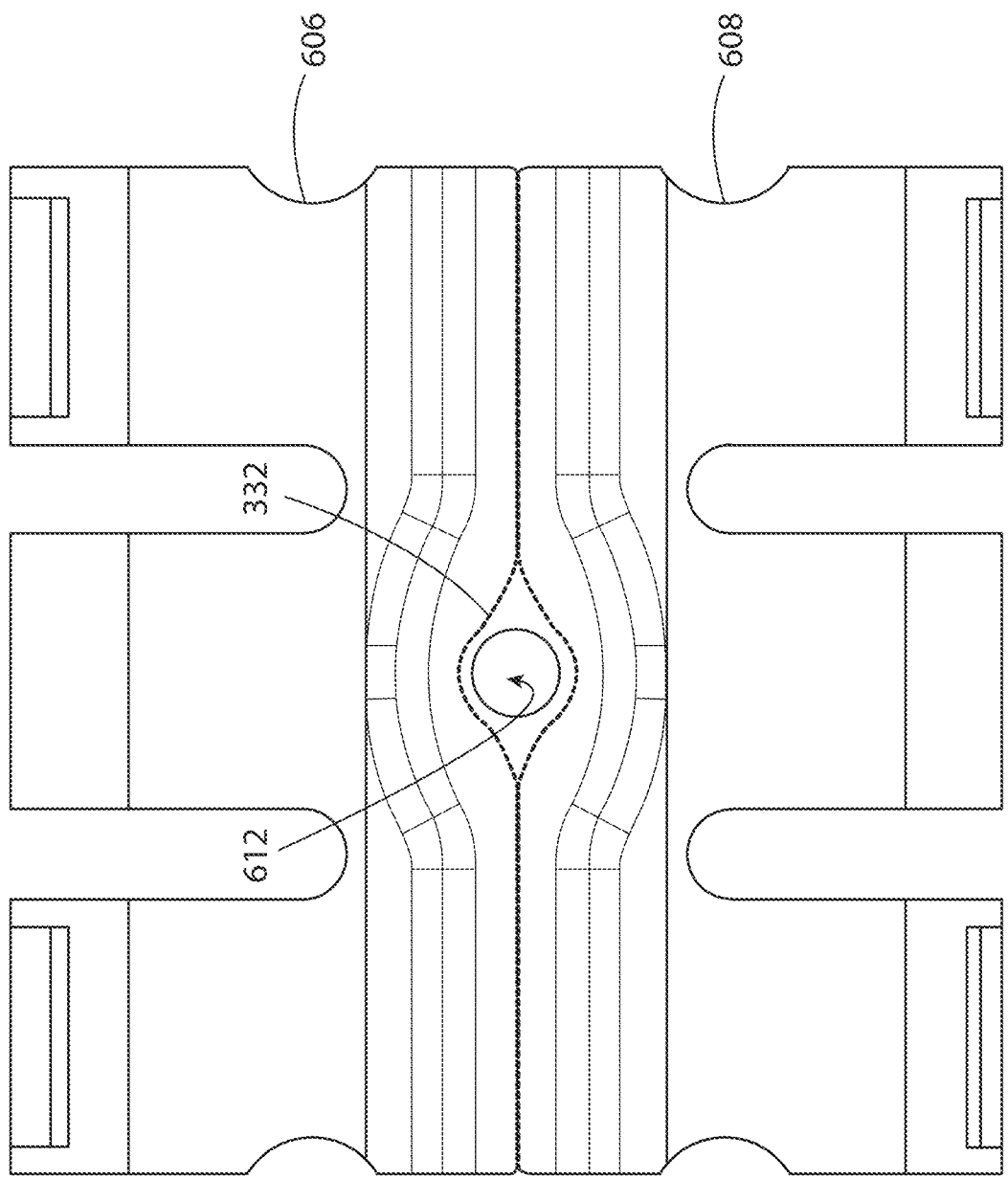
FIG. 6C is a front view of the two horns shown in FIG. 6A having a part, such as a spout, inserted between an opening that exists between the two horns when they are pressed against one another.

Examples of these complex interfaces to be sealed can be seen in FIGS. 2-3 and 6C.

Ultrasonic transducers are devices that convert energy into sound, typically in the nature of ultrasonic vibrations—sound waves that have a frequency above the normal range of human hearing. One of the most common types of ultrasonic transducers in modern use is the piezoelectric ultrasonic transducer which converts electric signals into mechanical vibrations. Piezoelectric materials are materials, traditionally crystalline structures and ceramics, which produce a voltage in response to the application of a mechanical stress. Since this effect also applies in the reverse, a voltage applied across a sample piezoelectric material will produce a mechanical stress within the sample. Suitably designed structures made from these materials can therefore be made that bend, expand, or contract when a current is applied thereto.

Many ultrasonic transducers are tuned structures that contain piezoelectric ("piezo") ceramic rings. The piezo ceramic rings are typically made of a material, such as lead zirconium titanate ceramic (more commonly referred to as "PZT"), which have a proportional relationship between their applied voltage and mechanical strain (e.g., thickness) of the rings. The supplied electrical signal is typically provided at a frequency that matches the resonant frequency of the ultrasonic transducer. In reaction to this electrical signal, the piezo ceramic rings expand and contract to produce large-amplitude vibrational motion. For example, a 20 kHz ultrasonic transducer typically produces 20 microns of vibrational peak-to-peak (p-p) amplitude. The electrical signals are often provided as a sine wave by a power supply that regulates the signal so as to produce consistent amplitude mechanical vibrations and protect the mechanical structure against excessive strain or abrupt changes in amplitude or frequency.

Typically, the ultrasonic transducer is connected to an optional ultrasonic booster and a sonotrode (also commonly called a "horn" in the ultrasonic welding industry), both of which are normally tuned to have a resonant frequency that matches that of the ultrasonic transducer. The optional ultrasonic booster, which is structured to permit mounting of the ultrasonic transducer assembly (or "stack" as it is commonly called), is typically a tuned half-wave component that is configured to increase or decrease the vibrational amplitude passed between the converter (transducer) and sonotrode (horn). The amount of increase or decrease in amplitude is referred to as "gain." The horn, which is oftentimes a tapering metal bar, is structured to augment the oscillation displacement amplitude provided by the ultrasonic transducer and thereby increase or decrease the ultrasonic vibration and distribute it across a desired work area.

Typically, all of the mechanical components used in an ultrasonic transducer assembly must be structured so that they operate at a single resonant frequency that is near or at a desired operating frequency. In addition, the ultrasonic transducer assembly must often operate with a vibrational motion that is parallel to the primary axis (i.e., the central longitudinal axis) of the assembly. The power supply for the stack generally operates as part of a closed-loop feedback system that monitors and regulates the applied voltage and frequency.

For certain applications, particularly those involving welding of thermoplastic parts together, ultrasonic welding technology is highly desirable due to its consistency (particularly when the stack's movement is controlled by a servo-driven motor), speed, weld quality, and other advantages. The inventors have discovered that leveraging dual horns synchronously applying ultrasonic energy to a complex interface having a variety of layers across the area to be sealed surprisingly produces an excellent airtight and hermetic seal in one pass, by matching the phase and frequency of the energy delivered through both horns and applying the energy on either side of the complex interface. Power to each horn is controlled by an ultrasonic generator that delivers consistent and reliable energy even in noisy environments to the horn. An example of such an ultrasonic generator suitable for use in connection with the systems and methods described herein is disclosed in U.S. Pat. No. 7,475,801, the entirety of which is incorporated herein by reference, and a suitable ultrasonic generator is commercially available from Dukane under the brand name iQ™. Each horn can be driven by an iQ™ ultrasonic generator or similar generator capable of outputting a consistent and reliable ultrasonic energy signal through the horn to a part or parts to be welded or joined. Because the components and configuration of an ultrasonic generator would be well known to the skilled person familiar with ultrasonic welding, for the sake of brevity, a detailed description of these is omitted because they are not essential for an understanding of the inventions disclosed herein. Each horn (or technically the horn's transducer) can be powered by a separate power supply, or they can be powered by a single power supply with dual power outputs that can be independently controlled. The entire pass or cycle time from applying the force to the horns 106, 108 to removing the ultrasonic energy can be very fast, e.g., 0.35 seconds or even faster with a higher amplitude of energy.

The force imparted to a part to be sealed can be adjustable within a reasonable range, such as +/−50% from the nominal value for each size machine or part. The part's geometry, material, and expectations for the finished product define choices in operating frequency (e.g., as a general rule, lower frequency and higher amplitude for larger parts, higher frequency and lower amplitude for smaller parts). In ultrasonic welding there are essentially three parameters that need to be adjusted to get a high quality and consistent weld for a specific part: a) amplitude; b) force; and c) weld time (time during which ultrasonic energy is applied to the part). Most applications call for a short weld time to maximize yield, particularly in packaging applications where hundreds or thousands of packages are filled and sealed per hour. Amplitude is often limited by stresses in the horn, so there is a practical limit as to how high the amplitude can be set. This leaves force, but as force is increased to get a good weld quickly, too much force might constrain the movement of the ultrasonic stack and it can be damaged or destroyed. Or the stack can get stuck akin to jaws closing as a brick wall. If the brick wall does not yield, then the movement of the stack will be difficult to maintain. A Gable top requires more force, whereas a pillow pack requires less force applied by the horns. Thin films would require a different ratio of amplitude and force, which can also be based on the material and speed requirements. The systems and methods disclosed herein allow for much more flexibility and significantly open the process window, meaning that the process becomes more robust and less sensitive to the usual production variables compared to conventional approaches.

Figure 1:
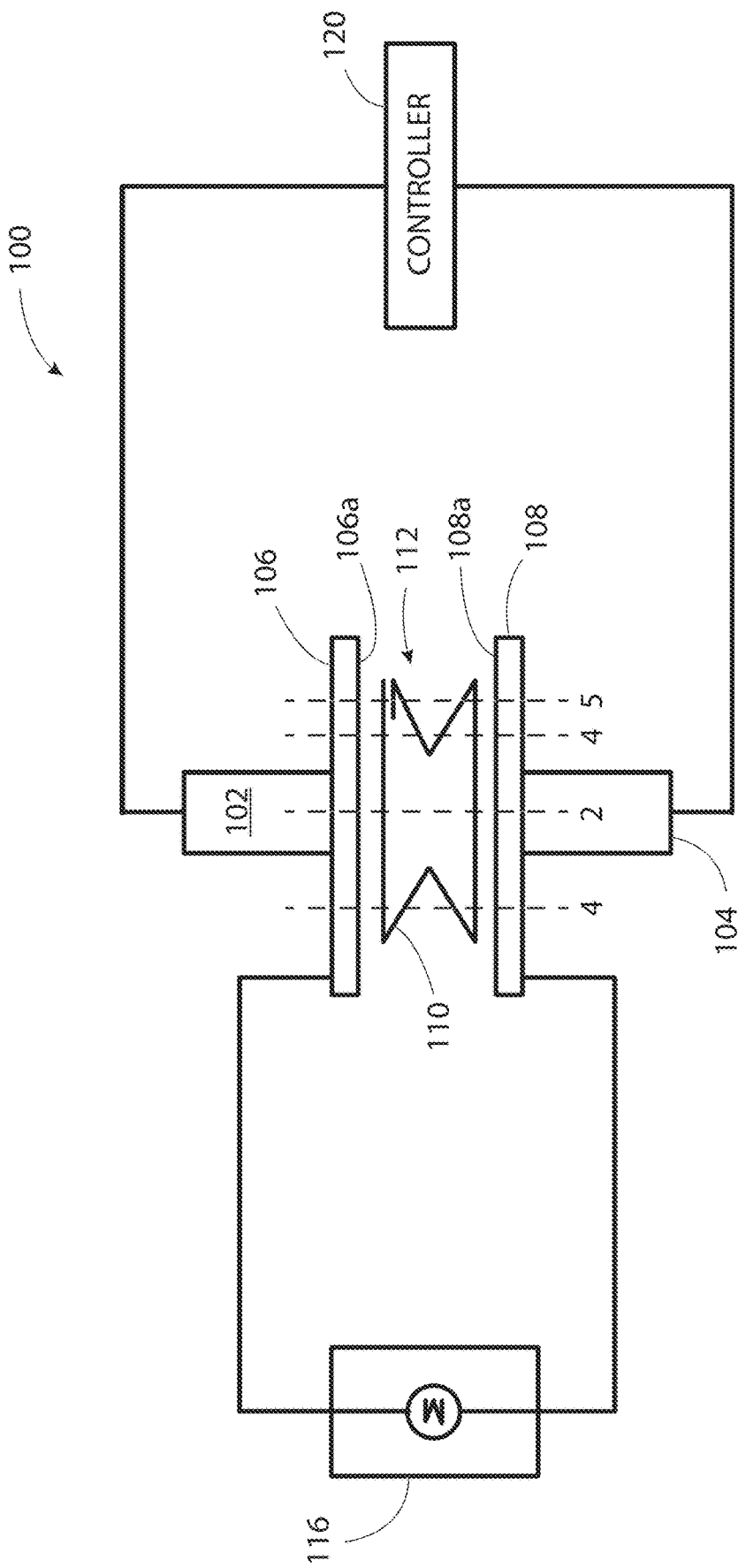
FIG. 1 is a diagram of an ultrasonic welding system for sealing together multiple layers of a part.
Figure 3A:
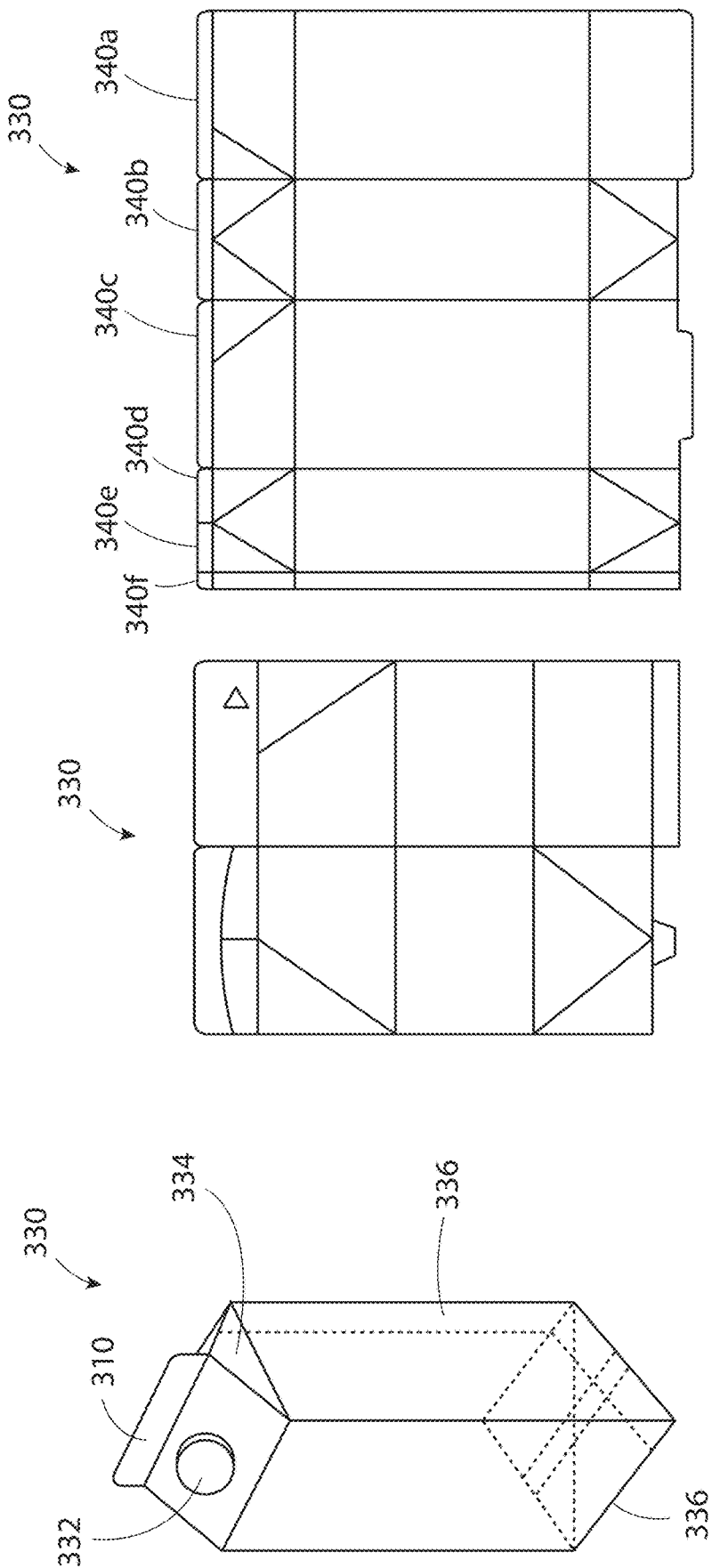
FIG. 3A illustrates a carton in various configurations showing the number of folds needed that creates the multiple layers in the Gable top of the carton.
Figure 4A:
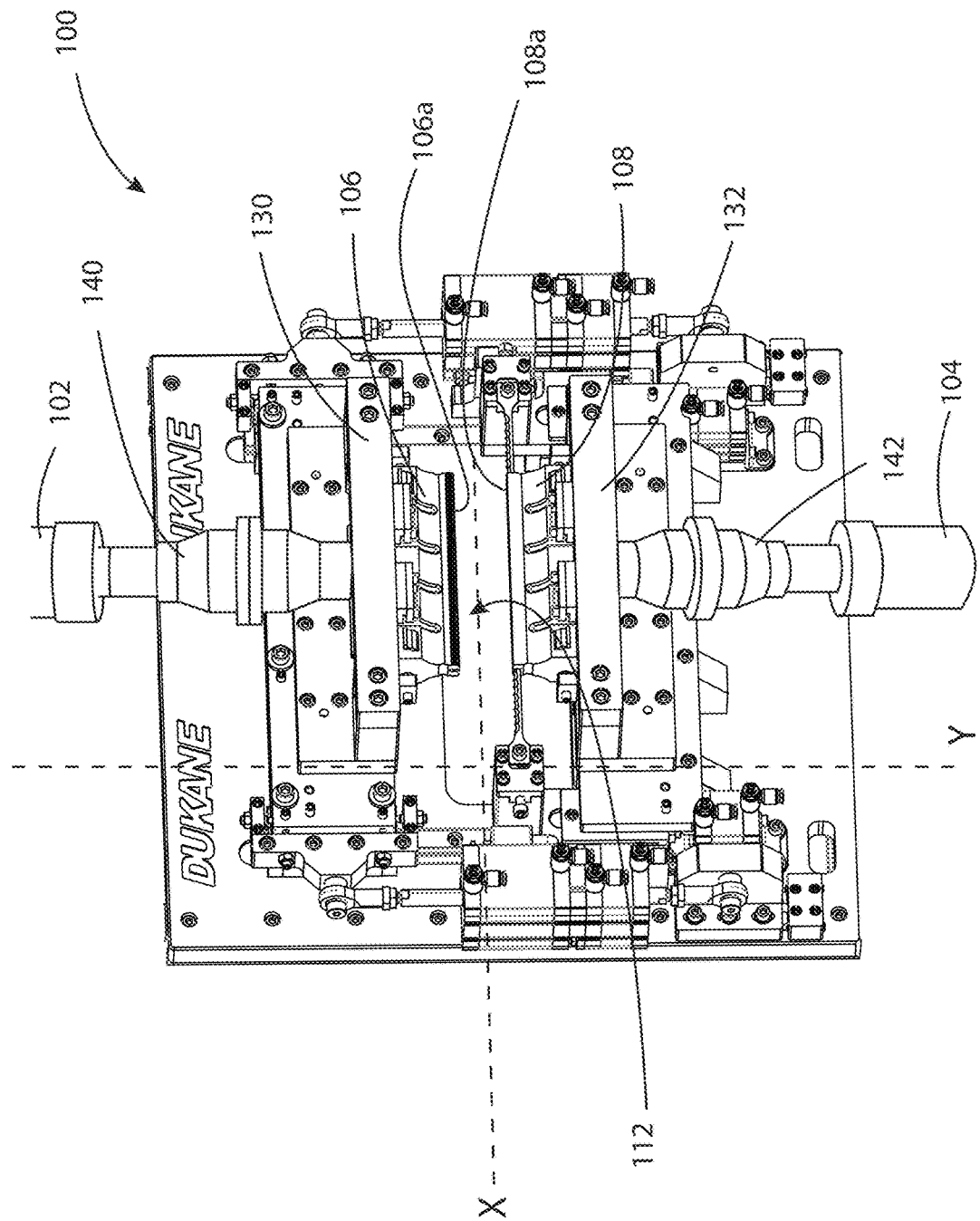
FIG. 4A illustrates an example ultrasonic welding stack having dual horns positioned directly opposite one another defining a gap between which the part is inserted to seal all the layers together.

FIG. 1 is an ultrasonic welding system 100 for sealing together multiple layers of a part 110. The system 100 includes two ultrasonic welding stacks (shown in FIGS. 4A and 4B) including a first transducer 102 and a second transducer 104. The system 100 includes a first horn 106 having a first welding surface 106a opposing a second welding surface 108a of a second horn 108 defining a gap 112 between the first and second welding surfaces 106a, 108a. The gap 112 is configured to receive therein the part 110 having a different number of layers to be sealed along a section of the part 110. The section of the part 110 to be sealed has been shown in exaggerated expanded and slightly unfolded form in FIG. 1 for ease of illustration to show the different number of layers present in this example part 100 from left to right. In reality, these layers would be pressed against one another when presented in the gap 112. Starting from the left in FIG. 1, as shown by the dashed lines, the first section of the part 110 to be sealed has four layers, followed by a second section having only two layers, followed by a third section having four layers, and finally ending by a fourth and last section having five layers. This type of interface is typically found in cartons having a Gable top such as shown in FIG. 3A. FIG. 3A shows an example carton in a fully assembled configuration, folded in half, and completely unfolded into a flat starting configuration. In the latter configuration, the complexity of the folds and layers can be seen in the top of the flattened carton, in which five sections 340a-f are present. When these are folded to form a Gable top 334, they produce an interface as shown in FIG. 1 with multiple layers. The area of the horn 106, 108 that contacts the part to be sealed is referred to herein as a "welding surface," meaning that it is a contacting surface of the horn that makes contact with the part to deliver via that surface the ultrasonic energy into an interface to be sealed of the part to weld (or seal) the interface. The ultrasonic energy passes through the horn away from the welding surface and into the part that is contact the welding surface of the corresponding horn. Each welding surface 106a, 108a of the horns 106, 108 makes physical contact with a different area of the part to be welded (the part's sealing interface), e.g., in the case of a Gable top, on either side of the Gable top to be formed when all the layers are sealed together.

Figure 3B:
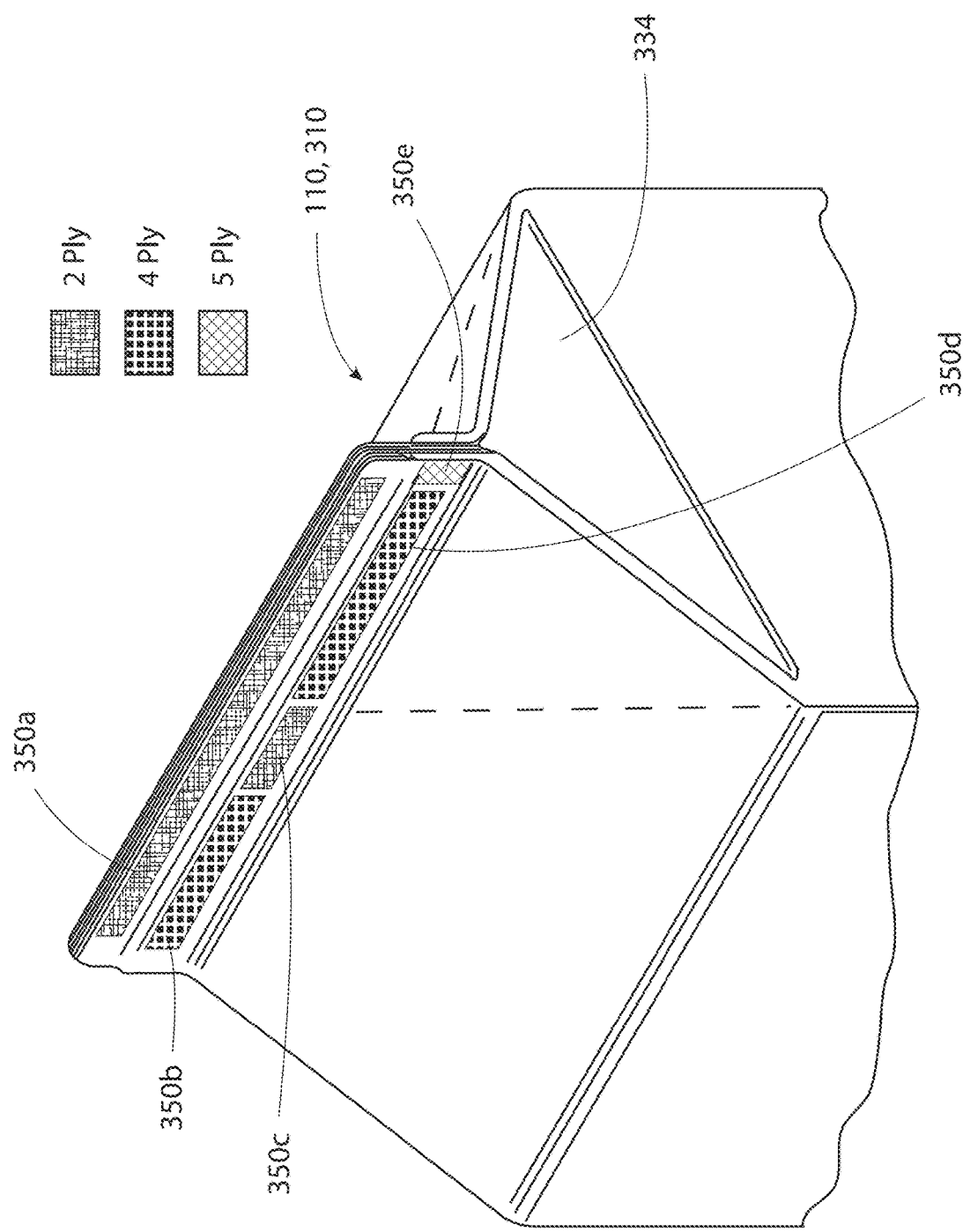
FIG. 3B illustrates a close-up view of the top of a Gable top showing the different layers present along the width, height, and depth dimensions of the Gable top.

The interface to be sealed can not only have different numbers of layers across its width but also across its height, as shown in FIG. 3B. Here, as the legend indicates, there are at least five sections 350a,b,c,d,e that need to be sealed together to form a hermetic seal. For example, along the elongated width dimension of the interface 110, 310 shown in FIG. 3B, there are four sections having, starting from left to right, four layers 350b, then two layers 350c, then four layers 350d again, terminated by five layers 350e. However, above these sections along a height dimension, there is an elongated section 350a having only two layers. Thus, taken along the height dimension (which is transverse to a longitudinal direction of the Gable top 310), there is only one section in the middle of the interface 310 where two layers are present in the area to be sealed. Everywhere else, there is a different number of layers above and below the corresponding sections of the interface 310 to be sealed. This type of Gable top 334 is particularly challenging to seal, because of the multi-dimensional changes in the number of layers across its width, height, and depth (due to the varying thickness of the different layers). Conventional adhesive-free methods are either time-consuming and require multiple passes along the interface, or simply do not produce a hermetic seal that can prevent all liquid from escaping. The carton 330 can also sometimes include a plastic spout 332 protruding from the Gable top to facilitating pouring. The Gable top 334 can be opened a la a milk carton for pouring out the liquid contents of the carton 334. The present disclosure is particularly well-suited for hermetically sealing Gable tops having many different layers in all three dimensions.

Another type of part that has a similar type of interface to be sealed is a pillow pack 230, illustrated in FIG. 2, which has tops or ends that resemble a Gable top. Pillow packs are usually first joined at a first seam running lengthwise along the pack, which presents an area that has multiple layers. The ends 210 of the pillow pack 230 also have multiple layers as shown by the legend. In this configuration, which is sometimes referred to as a 4-2-4-2-4, there are four layers in a first section of the end 230, followed by two layers, then four layers again, followed by two layers, and finally four layers. The different number of the layers are thus arranged across a longitudinal direction of the Gable top 210 of the pillow pack 230. Again, this type of part with a different number of layers presents a particular challenge to seal. The synchronized dual horn/stack configuration of the present disclosure can seal pillow packs so that they are airtight without any leaks. The pillow pack shown in FIG. 2 and the carton 330 shown in FIG. 3A can be composed of a polymeric film or a thermoplastic material.

Another type of part having interfaces that can be sealed using the inventions disclosed herein is a fluid-filled pouch having a valve or a pierceable sealing element that can be pierced, e.g., by a straw, such as described in U.S. Patent Application Publication No. 20040161171A1. An example system configured to seal using the ultrasonic technology disclosed herein a fluid-filled type of pouch is shown and described in connection with FIGS. 5A-5D. A popular type of pouch is sold in the U.S. under the brand CAPRISUN®. An example system configured to seal using the ultrasonic technology disclosed herein a part having a spout is shown and described in connection with FIGS. 6A-6C.

In liquid-filled pouches when a liquid is already present in the pouch before the pouch is sealed, the synchronized ultrasonic energy from the dual horns produces a vibration at the interface that pushes away liquids from the interface area, further contributing to creating a hermetic seal. In other words, a surprising benefit of the application of dual synchronized ultrasonic energy to a part filled with liquid is that the vibrations produced by the application of the energy from both sides of a to-be-sealed interface tends to vibrate away any droplets of liquid present around the interface, thereby allowing the layers of the interface to be sealed together without getting liquid trapped therebetween and creating opportunities for leaks. Microscopic leaks also present a health and spoliation hazard, allowing bacteria or other pathogens into the sealed pouch or mold to form around the seal. By creating a hermetic seal in one pass of the dual horns, wherein the vibrations produced by the application of ultrasonic energy from both sides of an opening of a liquid-filled pouch shake off liquid at the interface before being sealed, an additional advantage can be seen from the synchronized dual horn configuration disclosed herein.

Returning to FIG. 1, the system includes an actuator assembly 116 operatively coupled to the ultrasonic welding stack (FIGS. 4A and 4B) and configured to cause the first welding surface 106a of the first horn 106 to move relative to the second welding surface 108a of second horn 108. The movement of the horns 106, 108 together can be aided by corresponding frames 130, 132 to which the respective horns 106, 108 are coupled, which frames 130, 132 form part of the actuator assembly that moves the horns 106, 108 together and apart from one another. One movement of the horns 106, 108 together to clamp a part to be sealed and then apart following application of the ultrasonic energy to the part is referred to as a single pass or cycle. The actuator assembly 116 can include one or more motors, such as a servo motor. The two welding surfaces 106a, 108a are directly opposed one another and form mutually parallel planes that are orthogonal to an orientation of the horns 106, 108. The two horns 106, 108 can be seen as moving toward one another like a jaw that opens and closes such that the exposed end welding surfaces 106a, 108a thereof contact corresponding opposite surfaces of a part or part interface to be sealed. The corresponding ultrasonic energy from the transducers 102, 104 imparted to the horns 106, 108, which is synchronized in frequency and phase, is outputted along the same dimension in opposite directions. Each of the dual ultrasonic welding stacks can include an optional booster 140, 142, shown in FIG. 4A, which amplifies the energy emitted from the transducers 102, 104 before passing into the horn 106, 108. Again, the presence of the boosters 140, 142 is optional, and the configurations shown in FIGS. 5A and 6A lack a booster. In these configurations, the transducer 102, 104 is mounted directly to the horns 506, 508 (FIG. 5A) and 606, 608 (FIG. 6A).

A controller 120, which can be one or more controllers, is operative coupled to the ultrasonic welding stacks and to the actuator assembly 116. The controller 120 is configured to cause the actuator assembly 116 to urge the first and second welding surfaces 106a, 108a of the horns 106, 108 toward one another until contacting the part 110. A predetermined force can be applied to the horns 106, 108 to essentially clamp the part 110 between the welding surfaces 106a, 108b and keep the folded layers together. For example, the maximum force imparted by the horns on the part 110 can be set at 4500N, but will depend on the application including the thickness of the interface and the materials to be joined together. The controller 120 applies toward the part 110 a first ultrasonic energy via the output of the first horn 106 and a second ultrasonic energy via the output of the second horn 108 such that a frequency and a phase of the first and second ultrasonic energies are synchronized as the first and second ultrasonic energies are applied on both sides of the part 110 simultaneously, to thereby the seal the layers together, such as the layers 350a,b,c,d,e shown in FIG. 3B. As mentioned above, an example ultrasonic generator suitable to generate ultrasonic energy through a transducer into a horn is described in U.S. Pat. No. 7,475,801 and is commercially available from Dukane under any of the iQ™ line of ultrasonic generators.

Synchronization of two ultrasonic generators can be accomplished by providing a communication connection between the two generators so that their respective outputs to the transducers 102, 104 are synchronized in frequency and phase. Alternately, a generator such as the one described in the patent above can be modified to provide two outputs that are synchronized in frequency and phase and provided to a respective transducer 102, 104. The generators (whether separate or integrated with dual outputs) can be arranged in a master-slave relationship wherein one of the generators is assigned to be a master. The phase of the master generator is auto-locked to its ultrasonic stack's feedback using a Phase Lock Loop (PLL), and the master generator instructs the slave via the communication connection to mimic the same phase at the zero crossings (at 0 or 180 degrees) and ignore the slave's own phase and frequency feedback. This allows the slave's phase to drift in the same manner as the master. Phase drifts can occur, e.g., due to thermal effects, so by locking the phase of the slave to the master allows the phase (and therefore by implication the frequency corresponding to the zero crossings of the ultrasonic energy signal's phase) to be synchronized in both transducers 102, 104.

Figure 7:
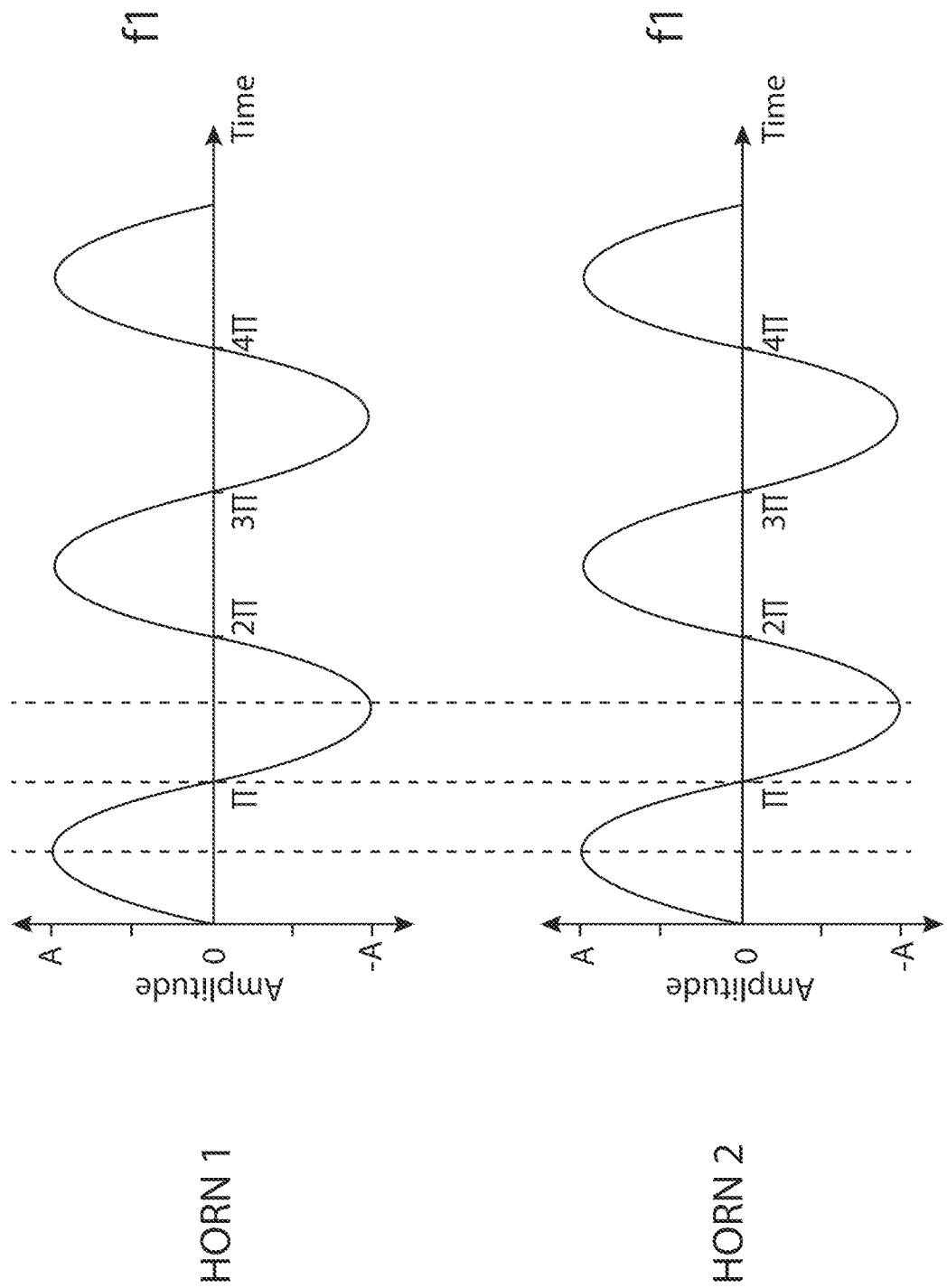
FIG. 7 are example waveforms of ultrasonic energy applied to a first and a second horn, which waveforms are synchronized in frequency and phase according to aspects of the present disclosure.

FIG. 7 illustrates example waveforms, which are not to scale, of synchronized ultrasonic energy applied to the first transducer 102 and to the second transducer 104. Here, synchronized refers to the energy having the same frequency, f1, and phase. The amplitude, A, may or may not be identical for both horns. Depending on the application and the thickness of the part closest to the horn 106, 108, a different amplitude can be applied through the first horn 106 relative to the second horn 108. Just as the frequency, f1, is matched in both horns 106, 108, so too the phase of both energies is time synchronized so that the zero-crossings and the peaks of the energy over time coincide at the same time as shown by the dashed lines in FIG. 7. The frequency, f1, of the energy generated in one horn 106 (or transducer 102) can be within 3 Hz of the energy generated in the other horn 108 (or transducer 104). Using two, synchronized horns halves the energy attenuation through multiple layers, such as when sealing a Gable top compared to a single horn setup. For example, in a single-stack configuration, the ultrasonic energy must pass through 4-5 layers of a Gable top, producing up to about a 50% attenuation or loss of ultrasonic energy/amplitude. By contrast, when using the synchronized dual horns according to the present disclosure, the energy from one horn only passes through 2 or 2.5 layers (the energy from the other side similarly passes through only half the number of layers compared to a single-stack configuration), and hence the energy/amplitude losses are only about 20-25%, producing a high quality weld or seal without burning the layers or creating any visual artifacts on the outer surface of the interface being sealed.

It has been found that the frequency of the ultrasonic energy delivered through both of the transducers 102, 104 to the horns 106, 108 is between about 15-70 kHz (e.g., ±10%). Particularly effective results are seen with 15 kHz, 20 kHz and 30 kHz. The frequency and phase of the ultrasonic energy delivered through both transducers 102, 104 to the horns 106, 108 to seal the part are synchronized in time so that peak amplitude of the ultrasonic energy is delivered simultaneously on both sides of the part to be sealed. The amplitude of the ultrasonic energy can be controlled independently on both transducers 102, 104. A frequency of 20-35 kHz is particularly suited for sealing smaller or thinner packaging, and higher frequencies can be used for sealing larger or thicker packaging.

An example "scrubbing" configuration is shown in FIGS. 5A-5D. In this configuration, there are two transducers 102, 104 synchronized in frequency and phase just as in the previous configurations, but the horns 506, 508 are positioned so that their sides come into contact to press against a to-be-sealed interface of a part, such as a thin film having a thickness in a range of 10-20 um or even over 100 um, or a thin, non-woven film where the thickness can vary along the length of the interface. The variation in thickness can be ±2 um at unpredictable locations along the length of the interface. Thus, while the application of energy may be uniform, the thickness of the interface (e.g., which can be composed of just two layers being sealed together) can vary along the length of the interface being sealed together, creating opportunities for small leaks or uneven welding of the seal. The so-called scrubbing action leverages the tiny, mechanical Y-axis motions produced by the two horns 506, 508 vibrating relative to one another as the frequency- and phase-synchronized ultrasonic energy is imparted through the transducers 102, 104 to the horns 506, 508. These vibrations produce very short, rapid back and forth motions in the horns 506, 508 that resemble a scrubbing movement, which has been found to produce very high quality hermetic seals where the interface has a non-uniform thickness, such as when the interface is a thin film or non-woven film. The configuration shown in FIGS. 5A-5D also allow for gentler control of amplitude and force as applied to a thin interface, and a wider process window.

Figure 5A:
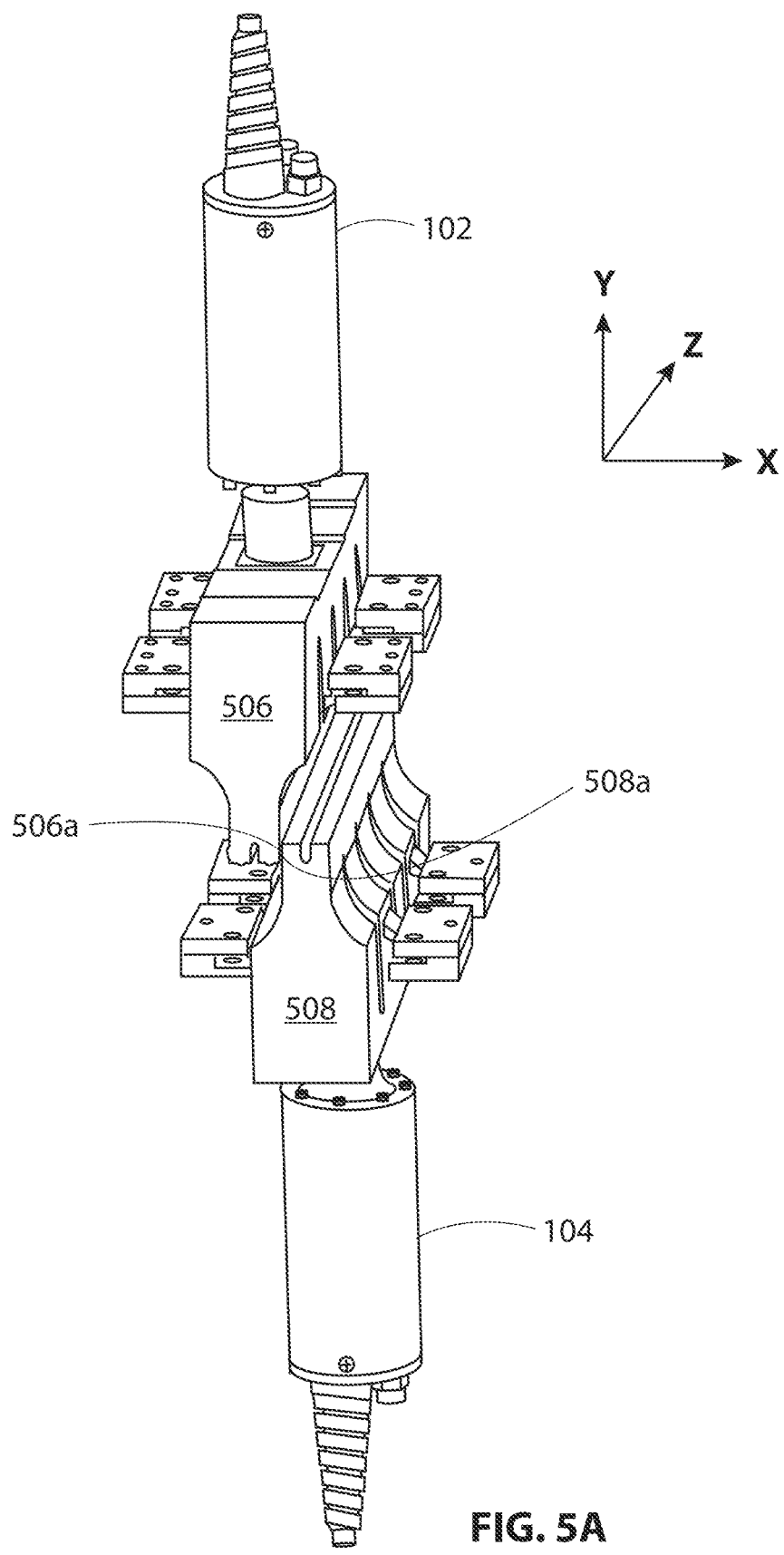
FIG. 5A illustrates a dual-stack setup configured to perform a "scrubbing" welding action using synchronized ultrasonic energy applied through a respective horn of each stack.

In FIG. 5A, two ultrasonic stacks, each including a transducer 102, 104 and a horn 506, 508. The horns 506, 508 are positioned adjacent one another so that their respective side welding surfaces 506a, 508a move toward one another. These welding surfaces 506a, 508a are parallel to the Y-Z plane and extend along a length along the Z axis. The ultrasonic energy is applied through the transducer 102 along the Y axis direction, and the ultrasonic energy through the second transducer 104 is applied in the opposite direction along the Y axis direction. The side surfaces 506a, 508a vibrate past one another as the part is positioned therebetween and the frequency- and phase-synchronized ultrasonic energy is applied through the horns 506, 508 simultaneously. Thin film or thin non-woven materials form a hermetic seal with only one pass of ultrasonic energy through the horns 506, 508. Only two horns 506, 508 and a single pass are required to produce a consistent, hermetic seal, free from burns or visual artifacts or microscopic leaks. While a thin film or non-woven material has been described in these examples, the scrubbing aspects disclosed herein also work with welding metal films, metal foils or thin metals, or any combination of thin film, non-woven material, or metals. For example, scrubbing is particularly effective at sealing metals together, but also is effective at sealing dissimilar materials together, e.g., a non-woven material to a metal film or foil.

Figure 5B:
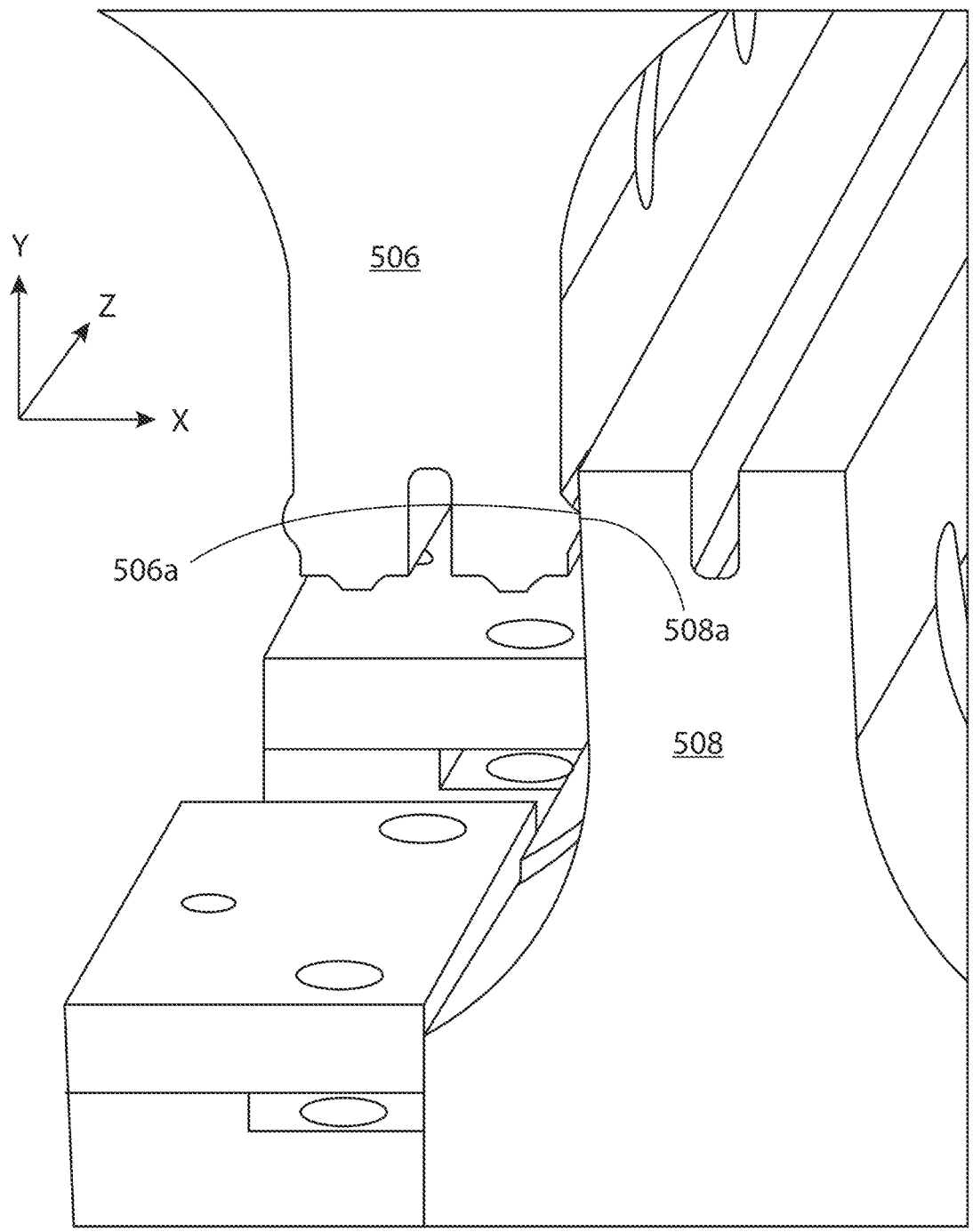
FIG. 5B is a cross-sectional view showing respective side welding surfaces of two horns abutting one another to seal a part interposed therebetween using synchronized ultrasonic energy applied through both horns simultaneously.
Figure 5C:
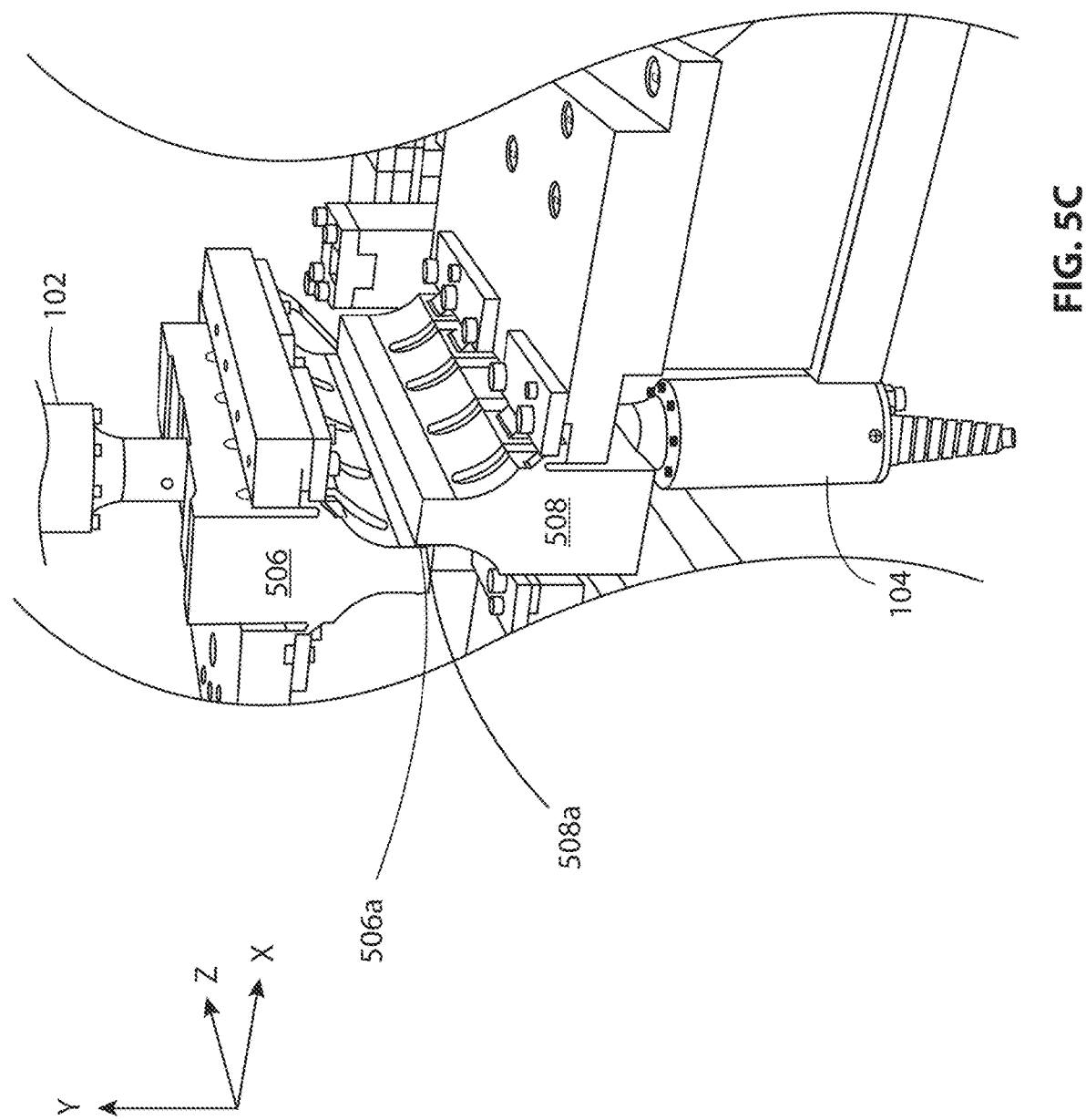
FIG. 5C illustrates an example configuration for carrying out a scrubbing-type welding action using synchronized ultrasonic energy applied to opposing horns simultaneously.

In FIG. 5B, a close-up of the two side welding surfaces 506a, 508a can be seen of the horns 506, 508. The welding surface 506a extends away to form a smaller exposed surface area compared to the flat side welding surface 508a. In this way, the side welding surface 506a acts as a "scrubber" as it moves rapidly back and forth along the Y-axis direction under ultrasonic influence when a part 110 is positioned between the two horns 506, 508. An example configuration can be seen in FIG. 5C, where the horns 506, 508 are in contact with one another. The part 110, which for example can be a pouch having an open end that needs to be sealed, has its open end positioned between the horns 506, 508, which would "scrub" the two layers of the interface together as the ultrasonic energy is applied from opposite sides of the interface. The mechanical action coupled with the heat produced by the ultrasonic energies cooperate to produce a hermetic seal free from artifacts or microscopic leaks. FIG. 5D shows the horns 506, 508 spaced apart. The part's interface 110 is positioned in the gap between the two side welding surfaces 506a, 508a, which are urged toward one another along the X-axis direction until their side welding surfaces 506a, 508a contact with opposite sides of the interface 110. A force is applied to the horns 506, 508 while the ultrasonic energy is applied through the transducers 102, 104 and into the horns 506, 508, producing the tiny mechanical vibrations referred to as the scrubbing action along the melting of the interface 110 where the welding surfaces 506a, 508a press against it. Once the horns 506, 508 are retracted, a hermetic seal is present at the part's interface 110, requiring only one pass or movement of the horns 506, 508 and one application of the synchronized ultrasonic energies.

Another synchronized dual-horn configuration is shown in FIGS. 6A-6C, which is suitable for sealing parts having complex geometries, such as a plastic or metal spout for a liquid pouch, pillow, or container. Here, two transducers 102, 104 are positioned relative to a first contoured horn 606 and a second contoured horn 608 having an opening 612 (best seen in FIG. 6C) to receive therein a part 332 to be sealed. The end of the horns 606, 608 have a knurled surface 608*b* (best seen in FIG. 6B), to clamp around the part 332 (which can be a round spout, for example), which transition to a ribbed welding surface 608*a* that receives the round (or oval) part 332. The other horn 608 has the same welding surfaces, so that they press against one another, the part 332 is held in place and a uniform application of energy is evenly distributed around the part to produce a consistent weld. The contoured horns 606, 608 can be shaped to match the contour of any part's geometry, including round, oval, or any irregular geometry.

Figure 8B:
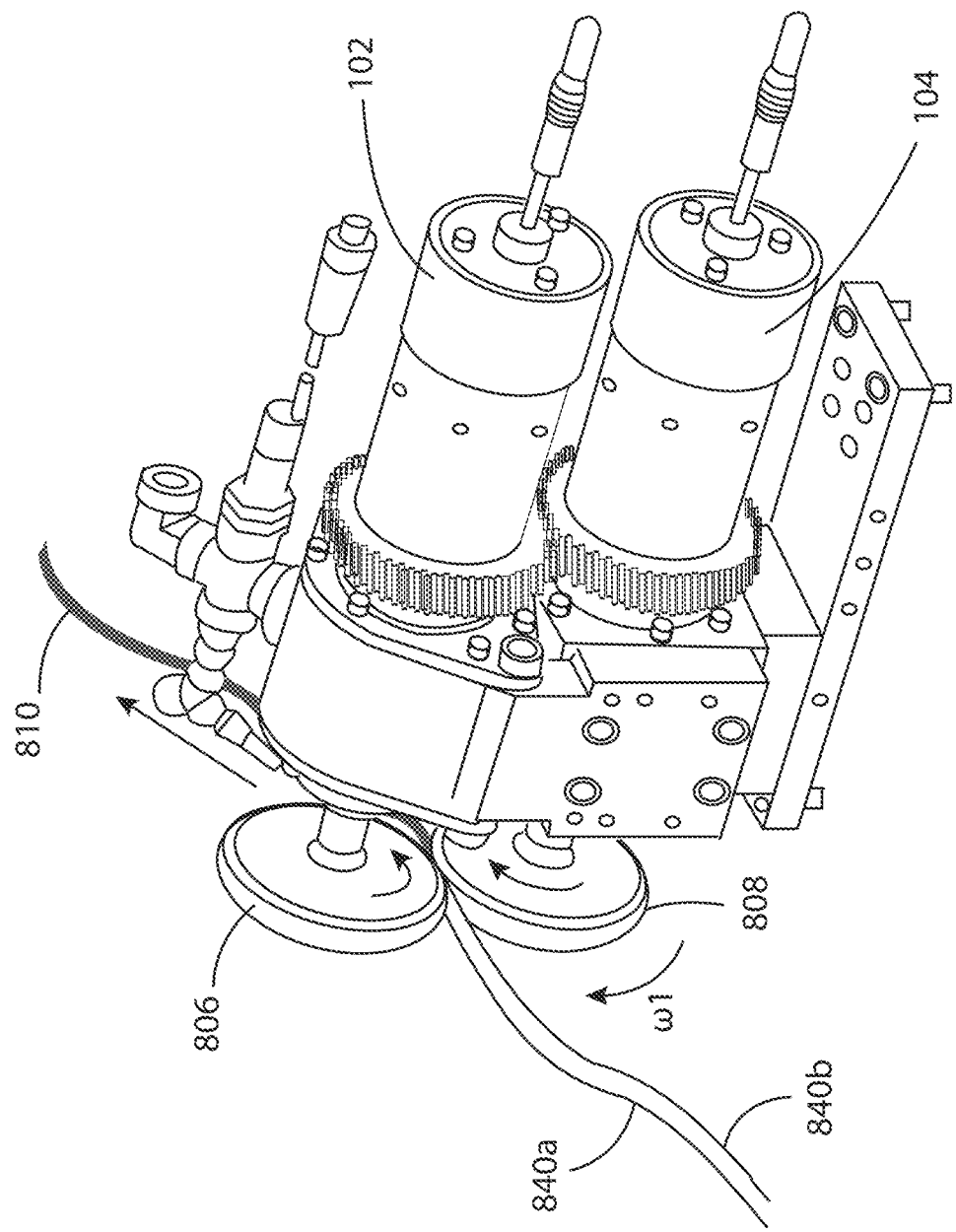
FIG. 8B is a rear view of the dual rotary-horn configuration shown in FIG. 8A.

A further dual-horn configuration is schematically illustrated in FIGS. 8A and 8B. Two horns 806, 808 are of the rotary type, and those familiar with the art of ultrasonic welding will appreciate rotary horns and how they are driven, the details of which are not pertinent to an understanding of this configuration. An example of a configuration including a rotary horn and a stationary anvil is shown in U.S. Pat. No. 10,479,025, granted Nov. 19, 2019, and entitled "Apparatus for fabricating an elastic nonwoven material," the entirety of which is incorporated herein by reference. According to the concepts disclosed herein, two rotary horns 806, 808 are proposed as shown in FIG. 8A, in which both horns 806, 808 contact both sides of a part 810 having multiple layers 840*a*, 840*b* (though more than two are contemplated), such as a non-woven material having multiple layers to be joined or sealed together, which passes between the two horns 806, 808 as the horns are rotating at the same angular speed, w 1. The frequency and phase of the respective ultrasonic energies being imparted to the horns 806, 808 are synchronized, as disclosed herein, producing a high quality seal or joining of the layers 840*a*, 840*b* of the part 810 in one pass through the horns 806, 808. A force can be applied to the layers 840*a*, 840*b* of the part 810 between the horns 806, 808, as the part 810 passes therebetween. For ease of illustration, the physical separation between the layers 840*a*, 840*b* has been exaggerated in FIGS. 8A and 8B to show how they are joined together by the dual rotary horns 806, 808, which are driven by respective transducers 102, 104. Each of the transducers 102, 104 is powered by corresponding outputs of one or more ultrasonic generators as described above that produce ultrasonic energy outputs to both transducers 102, 104 that is synchronized in both frequency and phase. Thus, in this configuration, and angular speed ω1 of the horns and frequency and phase of the ultrasonic energy applied to each horn are synchronously matched.

The layers 840*a*, 840*b* of the part 810 are drawn between the two horns 806, 808, which are rotating at the same angular speed as ultrasonic energy having the same frequency and phase is imparted to both horns 806, 808 simultaneously. By applying ultrasonic energy matched in frequency and phase to both horns 806, 808 simultaneously allows the amplitude of the energy to be reduced compared to a configuration having only one energized stack, which produces higher throughput (e.g., exceeding 2000 feet per minute) while expanding the process window.

An ultrasonic welding method for sealing together multiple layers (forming a to-be-sealed interface) of a part is also disclosed. The method includes moving a first welding surface of a first horn toward an opposing a second welding surface of a second horn to close a gap between the first welding surface and the second welding surface until the first and second welding surfaces contact a part, such as a part having a different number of layers along a section of the part to be sealed. Responsive to contacting the part, the method applies toward the section of the part between the two horns a first ultrasonic energy via an output of a first horn and a second ultrasonic energy via an output of a second horn such that a frequency and a phase of the first and second ultrasonic energies are synchronized as the first and second ultrasonic energies are applied on both sides of the part simultaneously, to thereby seal the layers together. The respective output tips of the first and second horns are arranged to point toward one another. Importantly, the closing and retraction of the horns occurs only one time to seal the interface without causing any burns, visual artifacts, or leaving any air or liquid leaks along the interface. By contrast, conventional approaches require multiple horn movements (e.g., three or more) to create a seal, which is time consuming and increases the risk of burning parts of the interface or creating undesirable visual artifacts particularly in thinner areas of the interface (e.g., when sealing a gable top).

Aspects of the present disclosure are also applicable to so-called far-field welding where the area to be welded is located a physical distance away from the horn output or surface from which the ultrasonic energy transitions from a solid substrate into the area outside the horn. In many applications, the location of the joint in regard to the area of horn contact can be critical, because the ultrasonic energy must travel through the material to reach the desired area of melt. Near-field and far-field welding refer to the distance that ultrasonic energy is transmitted from the point of horn contact to the joint interface. For example, when the distance between the horn output or surface and the joint interface to be welded is ¼" (6 mm) or less, it can be considered near field. By contrast, when the distance is greater than ¼" (6 mm), the weld can be considered far field. Whenever possible, it is always best to weld near field. This is because far-field welding requires higher than normal amplitudes, longer weld times, and higher forces to achieve a comparable near-field weld. Generally speaking, far-field welding is advised only for amorphous resins, which transmit energy better than semi-crystalline resins. However, with the two-horn configuration disclosed herein, the applications for far-field welding can be expanded because the energy is being applied from two sides of an interface simultaneously.

The dual horn aspects disclosed herein are also applicable to ultrasonic-assisted metal wire drawing processes or ultrasonic-assisted metal forming processes. Conventional metal drawing or forming processes contemplate using one source of ultrasonic energy applied to a hard steel die or the like as the wire or metal is pulled through the die. The pulling force is very high and eventually the die dulls and requires replacement. The present disclosure contemplates applying ultrasonic energy synchronized in frequency and phase to two sides of the die simultaneously as the wire or metal is drawn through the die by an external pulling force. The energy produces vibrations in the die, causing the die to act as a lubricant, thereby reducing the forces required to draw the wire through the die. The die will require replacement at a longer time interval, improving throughput for processes involving metal wire drawing or metal forming.

Figure 9A:
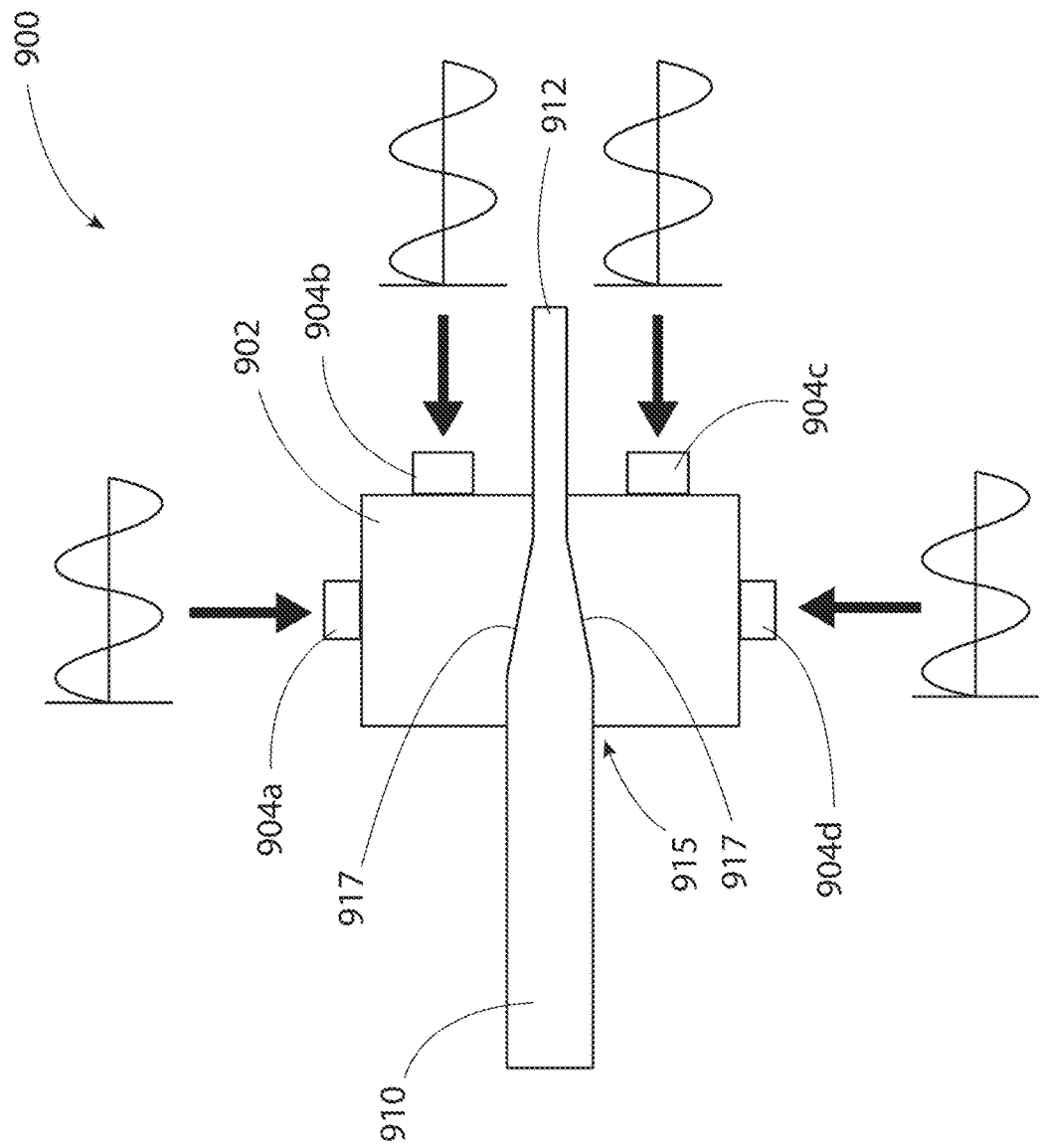
FIG. 9A illustrates an ultrasonic-assisted metal wire drawing processing using multiple, synchronized ultrasonic transducers.

Examples of ultrasonic-assisted metal forming processes using synchronized ultrasonic energy as shown in FIGS. 9A-9E. For convenience, "ultrasonic welding system" as used herein encompasses ultrasonic-assisted metal forming processes such as shown in FIGS. 9A-9E. While these processes do not weld parts together in the traditional or conventional sense, they operate using the synchronized frequency principles disclosed herein and are subsumed under the umbrella of ultrasonic welding systems. FIG. 9A illustrates an example configuration of a wire drawing system 900 having a die 902 with multiple ultrasonic stacks (including transducers and horns) 904a, 904b, 904c, 904d applying ultrasonic energy that is synchronized in frequency and phase to various parts of the die 902. The die 902 operates as a horn in this example, oscillating mechanically back and forth in a vibration movement according to the ultrasonic energies imparted into it by the transducers 904a, 904b, 904c, 904d. Wire drawing and metal-forming systems are well known in the art, and their configuration is also well known to those familiar with these arts, and are not reproduced here for ease of discussion. The basic configuration includes some sort of die 902, which in the example shown in FIG. 9A is shaped such that when a wire having an initial gauge or thickness is drawn through a gap 915 in the die, typically by pulling, the gap 915 of the die 902 has a starting diameter that is larger than a terminating diameter so that the diameter of the wire 910 as it is pulled through the die 902 decreases to a desired gauge or thickness (912). The wire 910 is pressed against a first part-interfacing surface 915 and a second part-interfacing surface 917 of the die 902 as it is drawn through the gap 915 of the die 902. The inventive concept here is to use pairs of synchronized (in frequency and also in phase) ultrasonic stacks that apply energy to the die 902 (which in this ultrasonic embodiment becomes a non-resonant part) in a manner that causes the parts of the die 902 to mechanically vibrate, producing a number of benefits over conventional wire-drawing techniques that do not use frequency-synchronized ultrasonic energy. An example for applying ultrasonic vibrations to a non-resonant part is disclosed in U.S. Pat. No. 9,993,843, titled "Adapter for Ultrasonic Transducer Assembly," the entirety of which is incorporated herein by reference.

In the assembly 900 shown in FIG. 9A, there are four ultrasonic stacks including transducers 904a, 904b, 904c, 904d arranged about the die 902 to apply energy into the die 902 at the transducer locations. In a practical application, these stacks can be deployed in pairs (e.g., 904a with 904d, or 904b with 904c). In other words, even though four ultrasonic stacks are shown in FIG. 9A, it is contemplated that a single pair of stacks, e.g., 904a and 904d, can be employed instead. Again, the energy is fully synchronized in frequency and phase in one embodiment as shown by the example waveforms in the figures. In other embodiments, it can be advantageous to have the frequency only synchronized but with two more different phases among the four ultrasonic stacks 904a, 904b, 904c, 904d. While the representative waveforms shown in the figures are shown as having the same frequency and phase relative to one another, it is understood that the phases among any of the transducers can be different or asynchronous. The synchronized energy applied through the die (operating as a non-resonant part) 902 via the transducers 904a, 904b, 904c, 904d causes the die 902 to mechanically vibrate rapidly (at or around the frequency of the ultrasonic energy), acting as a sort of lubricant to the wire as it is drawn through the gap 915 of the die 902. Less pulling force is also required compared to conventional techniques because the "lubricated" die 902 that is vibrating rapidly allows the wire 910 to be pulled through the die more quickly and with less force and without the use of liquid or wet lubricants. This kind of wire drawing is called dry wire drawing because no lubricants or liquids are used at the wire-die interface to facilitate the wire drawing process. The wires 910 drawn by this process advantageously have a superior smooth surface finish with few to no blemishes, and result in faster draw speeds, lower draw force, and reduce or avoid the need to use any external lubricants at the wire-die interface. The wire 910 can be composed of copper, aluminum, or any other electrically conductive metal or metal alloy, and can be solid or stranded.

Returning to FIG. 9A, the direction of the wire drawing is from left to right while viewing the figure, with the thicker portion of the wire 910 being drawn through an input section of the gap 915 of the die 902 to produce the thinner portion of the wire 912 on the right side at an output section of the die 902. Four ultrasonic stacks 904a, 904b, 904c, 904d are positioned about the die 902, which acts as a mechanically vibrating horn when ultrasonic energies are applied by these transducers through the die 902. The top die 904a is positioned to abut a top surface of the die 902, and a bottom die 904d is positioned abut a bottom surface of the die 902. The top and bottom die 904a, 904d are arranged to direct their respective ultrasonic energies toward one another and toward the wire 910 being drawn through the die 902. These energies are synchronized in frequency, and can optionally also be synchronized in phase. In addition, two other transducers 904b, 904c are arranged on end surfaces of the die 902 above and below the output section of the die 902. These transducers 904b, 904c direct their respective ultrasonic energies parallel to one another and in a direction opposite to the direction of travel of the wire 910 through the die 902. This produces a landscape of harmonized ultrasonic energies within the die 902 all vibrating at the same frequency, which causes the surface interfaces between the die 902 and the wire 910 to mechanically vibrate rapidly and uniformly in multiple directions. Without the synchronized frequencies, the vibrations within the die will not be uniform, which would cause the wire to have undesirable surface artifacts as it is drawn through the die and/or to experience different mechanical stresses or strains or uneven deformations along its diameter as it is pulled through the die, causing one side of the wire to be drawn at a different rate compared to another side of the wire.

Figure 9B:
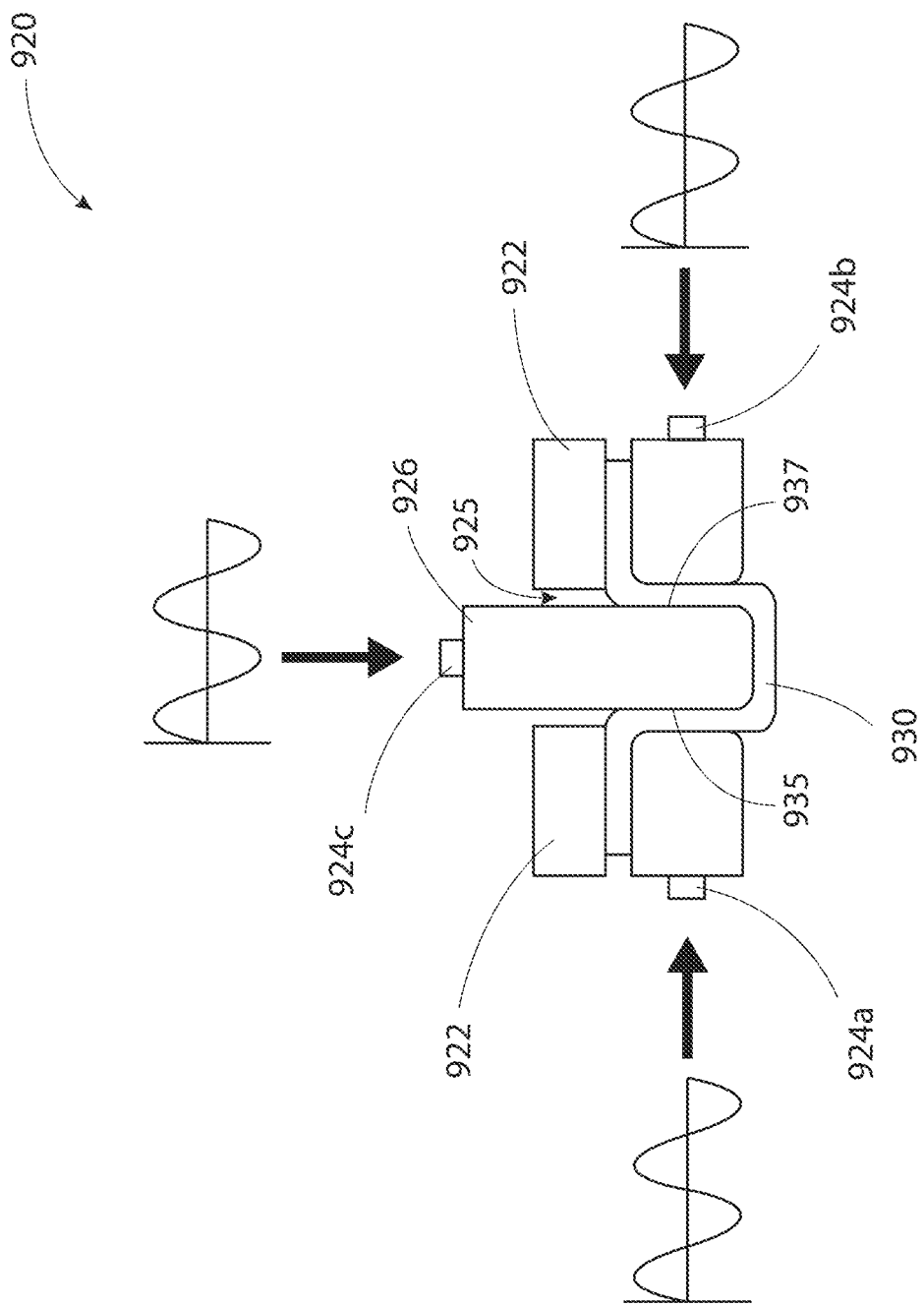
FIG. 9B illustrates an ultrasonic-assisted metal deep drawing process using multiple, synchronized ultrasonic transducers.

Another ultrasonic-assisted metal forming process 920 is shown in FIG. 9B in which a metal part 930 is undergoing a deep drawing process aided by a die 922 and a punch 926. Three ultrasonic transducers 924a, 924b, 924c are arranged on the die 922 and the punch 926 to facilitate a deep drawing operation on the part 930. In this example, an ultrasonic stack 924c is arranged to abut the punch 926 and to direct its ultrasonic energy in the same direction as the punch moves to complete the deep drawing process on the part 930. Two other ultrasonic stacks 924a, 924b are arranged to abut opposite surfaces of the die 922 so that their respective energies are directed toward one another and to the part 930 being punched through the punch-die interface. The ultrasonic frequency of the transducers 924a, 924b, 924c is synchronized, and optionally the phase can also be synchronized. Alternately, the phase of the ultrasonic energy applied through the punch 926 by the transducer 924c can be out of phase relative to the synchronized phase of the energy applied by the transducers 924a, 924b to opposite sides of the die 922. The part 930 is received in a gap 925 of the die 922, which like the die 902 shown in FIG. 9A operates as a non-resonant part to the stacks 924a, 924b. The die 922 has a first part-interfacing surface 935 and a second part-interfacing surface 937 that contact the part 930 as it is undergoing the deep drawing process. The synchronized vibrations of the die 922 cause the part to vibrate back and forth relative to the die at the first and second part-interfacing surfaces 935, 937 (and other part-interfacing surfaces in contact with the die), primarily those surfaces involved in being deformed or bent during the deep drawing process.

An extrusion-type ultrasonic-assisted metal forming process 940 is shown in FIG. 9C in which a metal part 950 undergoes extrusion through a die 942 by a ram 946 applying a pushing force against the metal part 950 as it is extruded through a gap 945 in the die 942. Similar to the assembly shown in FIG. 9A, four ultrasonic stacks 944a, 944b, 944c, 944d are arranged about the output section of the die 942 and their ultrasonic energy outputs are synchronized in frequency and optionally in phase. The physical arrangement of the ultrasonic stacks 944a, 944b, 944c, 944d in this assembly 940 is similar to the arrangement of the stacks 904a, 904b, 904c, 904d shown in FIG. 9A. The arrows indicate the directions of the respective ultrasonic energy outputs from the transducers of the stacks 944a, 944b, 944c, 944d, and these are provided through the die 942 as the part 950 is extruded by the impact force of the ram 946 through the die 942. There are at least four part-interfacing surfaces 955a, 955b, 957a, 957b of the die 942 in contact with the corresponding surfaces of the part 950 as it undergoes the metal forming process.

Figure 9D:
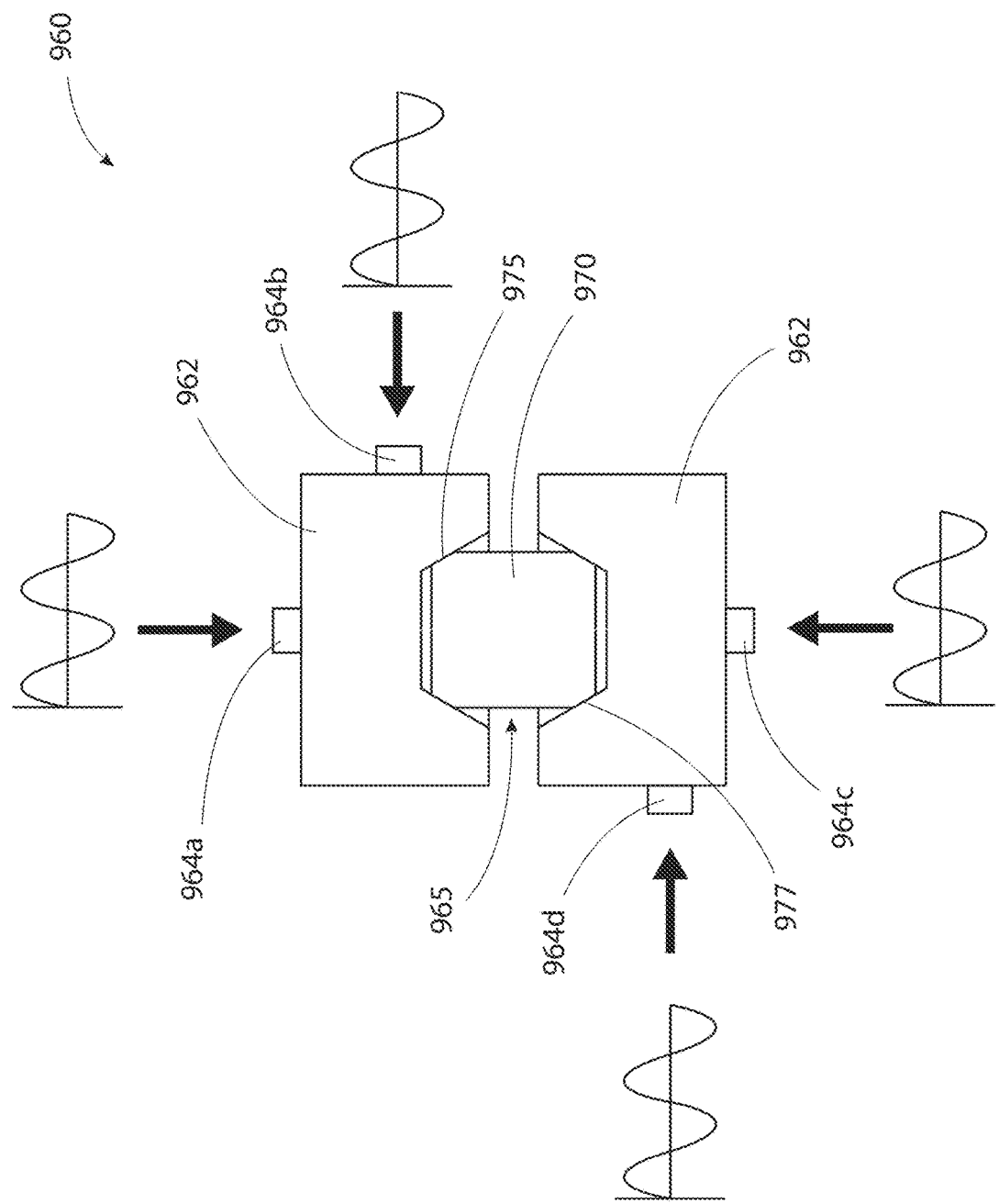
FIG. 9D illustrates an ultrasonic-assisted metal forging process using multiple, synchronized ultrasonic transducers.

A forging-type ultrasonic-assisted metal forming process 960 is shown in FIG. 9D in which a metal part 970 undergoes a compression force by a die 962. Four ultrasonic stacks including transducers 964a, 964b, 964c, 964d are arranged to abut sections of the die 962, and their ultrasonic energies are synchronized in frequency and optionally also in phase. A top transducer 964a is arranged to abut a top surface of a top section of the die 962 and direct its energy downwards toward the part 970. A bottom transducer 964c is arranged to abut a bottom surface of a bottom section of the die 962 and direct its energy upwards toward the part 970 and towards the top transducer 964a. As shown in FIG. 9D, a first side transducer 964d is arranged to abut a left side of a bottom section of the die 962 and direct its energy into the die 962 from left to right as viewed in the figure. A second side transducer 964b is arranged to abut a right side of a top section of the die 962 and direct its energy into the die 962 from right to left and in a direction opposite to that of the first side transducer 964d. The part 970 is provided in a gap 965 and contacts at least a first part-interfacing surface 975 of the die 962 and a second part-interfacing surface 977 of the die 962, which again operates like an ultrasonic non-resonant part/horn when the ultrasonic energies are applied to the horn or die 962. This configuration creates a consistent and uniform vibration profile at the die-part interfaces to allow uniform compression at a faster speed compared to conventional metal forging processes.

A rolling-type ultrasonic-assisted metal forming process 980 is shown in FIG. 9E in which a part 990 undergoes a rolling force by two rolls 982a, 982b. The part 990 is drawn through a gap 985 between the rolls 982a, 982b in a direction of arrow A so that its cross sectional area is reduced. The part 992 contacts a first part-interfacing surface 995 of the top roll 982a and a second part-interfacing surface 997 of the bottom roll 982b. A first ultrasonic stack 984a is configured to abut a top roll 982a, and a second ultrasonic stack 984b is configured to abut a bottom roll 982b. The ultrasonic stacks 984a, 984b are positioned to output their respective ultrasonic energy in a direction B that is transverse or perpendicular to the direction of arrow A. This process 980 produces a much smoother rolling operation without the use of external lubricants and without creating artifacts on the surfaces of the part 990 being drawn through the rolls 982a, 982b.

Figure 10:
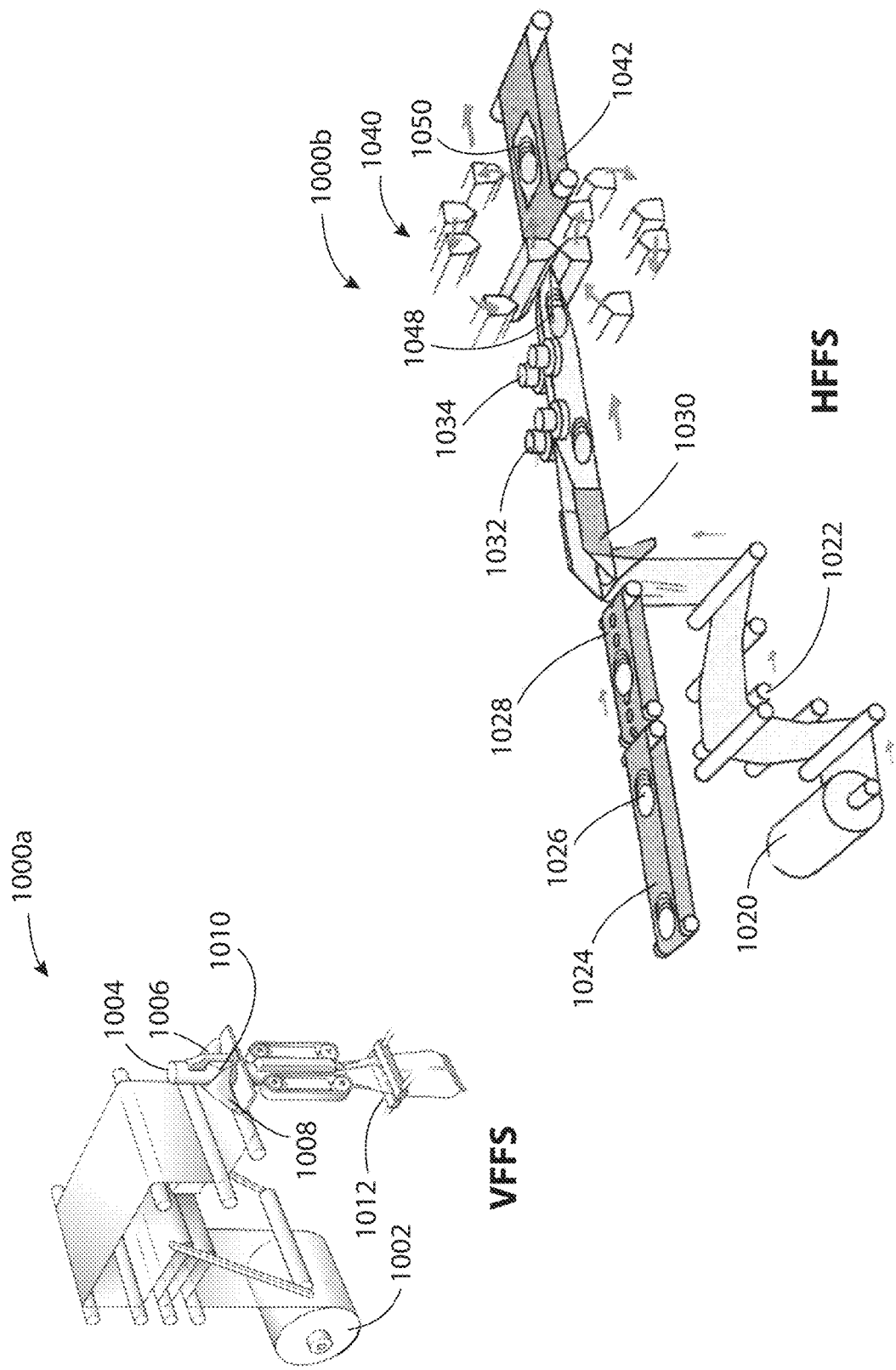
FIG. 10 illustrates example vertical form, fill and seal (VFFS), and horizontal form, fill and seal (HFFS) packaging systems in which any of the ultrasonic welding systems disclosed herein can be incorporated.

FIG. 10 illustrates two example configurations of two packaging systems in which any of the ultrasonic welding systems disclosed herein can be incorporated. Those skilled in the art of packaging will readily appreciate that the machines can be oriented so that the packages or pouches or bags or other receptacles filled with matter (food, liquids, powders, etc.) are formed along a horizontal orientation or a vertical orientation. Horizontally arranged packaging systems are called horizontal form, fill and seal (HFFS) packaging systems, and vertically arranged packaging systems are called vertical form, fill and seal (VFFS) packaging systems. The implementations and embodiments disclosed herein can be oriented horizontally or vertically, and apply equally to both HFFS and VFFS packaging systems. In the left diagram of FIG. 10, an example VFFS packaging system 1000a is shown. And in the right diagram, an example HFFS packaging system 1000b is shown. To reiterate, this shows one example configuration of many, and those familiar with the packaging arts will appreciate that other configurations will vary from those shown in FIG. 10. These exemplars are for ease of discussion to explain where the ultrasonic welding systems herein can be introduced into the packaging system process to seal and optionally cut the parts into singulated parts filled with matter.

The example VFFS packaging system 1000a includes a roll of film 1002 that is conveyed through a system of rollers in a vertical direction toward a forming tube 1006 into which product 1004 or any other matter to fill the pouch or pocket or bag or container formed by the film before entering a sealing unit 1012, which optionally can cut the film to singulate the part and thereby separate it from the roll of film 1002. Any of the ultrasonic welding systems disclosed herein, in particular but not limited to those discussed in the subsequent figures, can be incorporated as the sealing unit 1012 shown in the VFFS packaging system shown in FIG. 10.

The example HFFS packaging system 1000b includes a roll of film 1020 that passes through a series of rollers 1022 toward a forming box 1030 where the film is folded to make a pouch or other vessel to contain a product or matter 1026 conveyed by a belt conveyor 1024 toward the forming box 1030. The product or matter 1026 enters the forming box 1030 to be loosely contained therein until its top can be sealed in a fin seal roller 1034. The to-be-formed pouch 1048 or package enters an end sealer and cutter assembly 1040, where the sides of the pouch are sealed and cut to singulate the package or pouch 1050 before it is presented to a discharge conveyor 1042. To singulate a to-be-formed package 1048 on two open sides, the sealer and cutter assembly 1040 needs to make two passes as the to-be-formed package 1048 passes through the assembly 1040. The assembly 1040 can rotate, for example, and this is the section where any of the ultrasonic welding systems disclosed herein can be substituted. The ultrasonic welding systems herein overcome many disadvantages presented in conventional sealer and cutter assemblies, including only one pass needs to be made, a higher quality hermetic seal results, and the throughput of package 1050 singulation is increased. Additional benefits compared to traditional heat sealing technologies include reduced machine down time; no heat-up or cool-down required—the ultrasonic energy is immediately available for welding; weld parameters can be changed on-the-fly with immediate response; the ultrasonic welding is gentle to the product and packaging material and does not produce visual or other undesirable artifacts at the sealing interface; no burning of packages or material at the machine stop situs; no film shrinkage; and no thermal impact to the product being packed inside the pouch or container. Thermal seals tend to be, on average, 13 mm (½") wide at the top of a package; however, ultrasonic sealing according to the present disclosure can produce seals as narrow as 1-2 mm wide. The bag or container can be made smaller, as well, because the narrow, quality seal allows for smaller headspace requirements, without excessive oxygen transmission or the product (bag) getting caught in a wider seal. Accordingly, material savings of up to 25% can be achieved with smaller bag sizes and an overall small seal real estate.

Figure 11A:
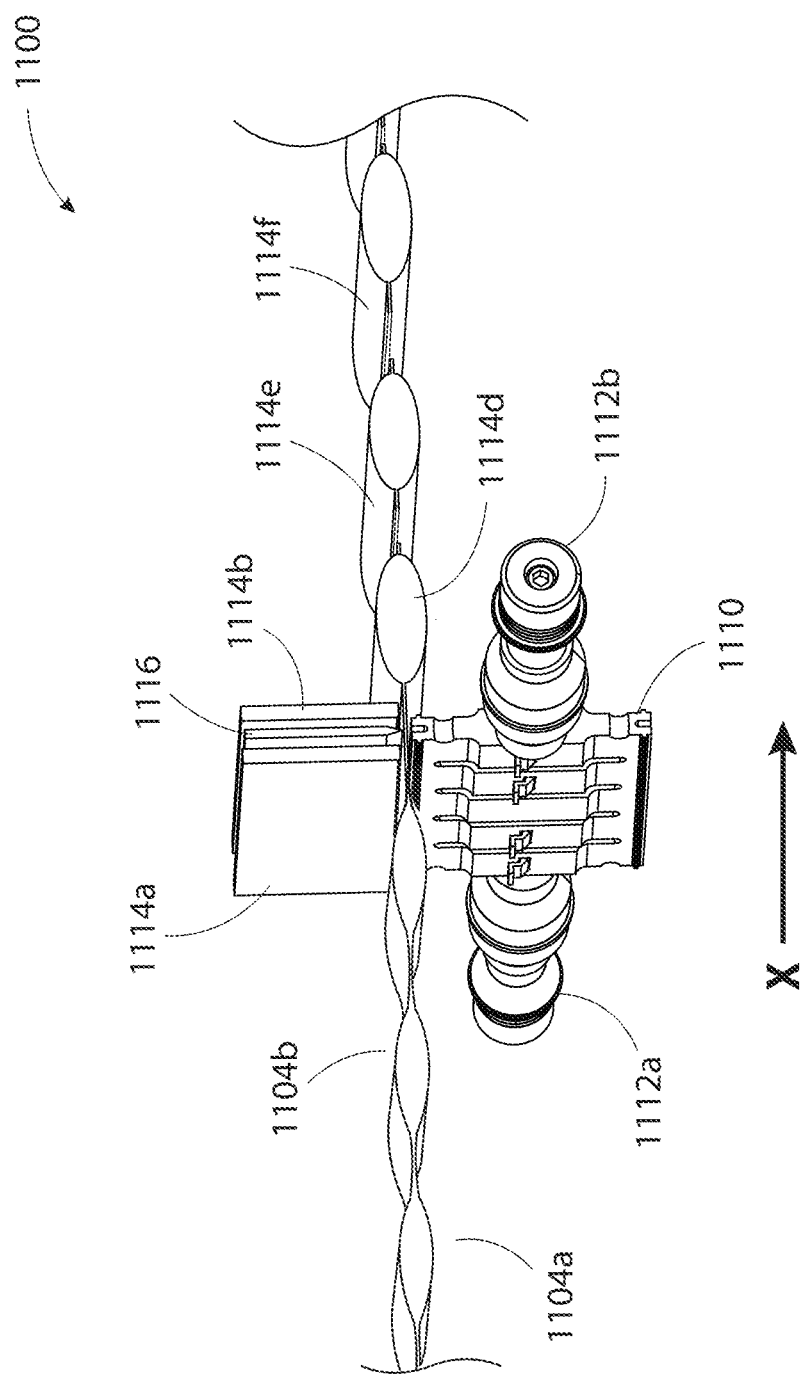
FIG. 11A is a perspective view of an ultrasonic-assisted "cut and seal" assembly having dual ultrasonic transducers applying synchronized ultrasonic energy to a horn by using a "scrubbing" motion to seal one or more interfaces on a part. Alternately this horn arrangement can be operated with a single transducer and two boosters or a single transducer and one booster providing cantilevered support.
Figure 11B:
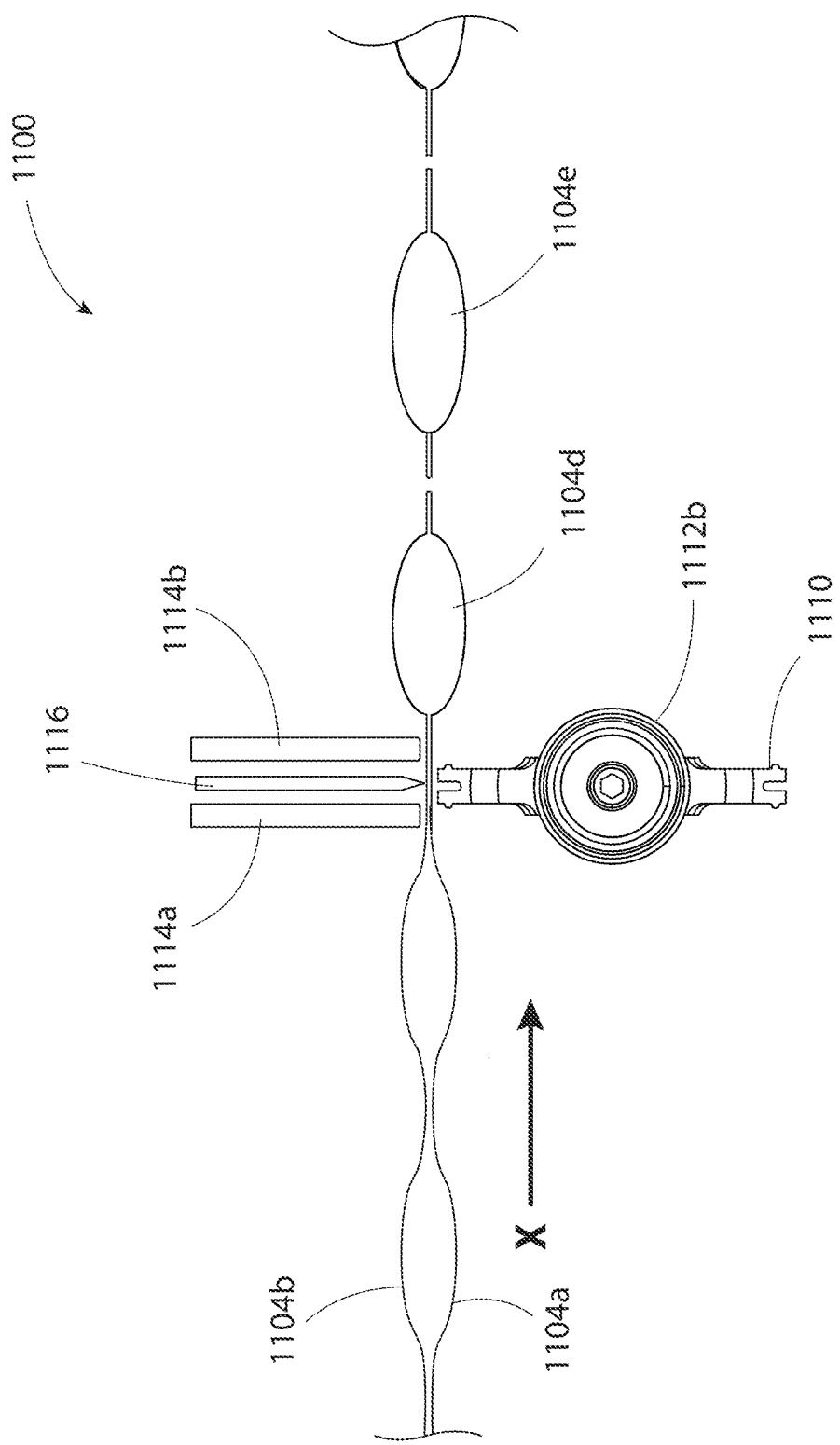
FIG. 11B is a side view of the ultrasonic-assisted cut and seal assembly shown in FIG. 11A.

FIG. 11A illustrates a perspective view of an ultrasonic-assisted "cut and seal" assembly 1100 having dual ultrasonic transducers applying synchronized ultrasonic energy to a horn 1110 (shown in FIG. 12) that captures a roll 1102 having multiple layers between the horn 1110 and an anvil 1114a, 1114b. Alternately, the horn 1110 can be driven by a single ultrasonic transducer in applications requiring a lower power to weld but still benefiting from the horns scrubbing action. This configuration leverages the "scrubbing" action described herein, and is particularly effective at sealing two or more films in a roll 1102 together. References will be made to FIGS. 11A, 11B, 11C, 11D, 11E, 11F, and 12, which show how the horn 1110, transducers 1112a, 1112b, and anvil 1114a, 1114b cooperate to cause the ultrasonic energy to apply a scrubbing action to the roll 1102 while sealing the roll in a section between two adjacent sections 1104 of the roll 1102 in two places simultaneously while also optionally carrying a cutting operation to cut an area between the two sealed sections. Again, while these example configurations are shown in a horizontal orientation suitable for an HFFS packaging system, these examples apply equally to a VFFS packaging system and can be oriented vertically. Those familiar with film packaging systems will readily appreciate that the orientation does not matter for implementing the novel and inventive concepts herein.

In this example, a multitude of pouches or pockets 1104d, 1104e, 1104f are made from the roll 1102, which are formed between two layers 1104a, 1104b of a film or other material, and which need to be sealed, such as after they have been filled with content matter (e.g., liquid, a food, powder, or the like). So-called pillow pouches or bags are well known in the packaging industry, and traditionally, they are formed along a continuous roll, and then conventionally sealed using heat and then later cut to singulate the pouches from the roll into individual items. Only those structures and devices that are pertinent to carrying out the claimed invention are described here, because it is assumed that the person skilled in the packaging arts, and in particular pillow pouch packaging will be very familiar with machines that are employed to fill, seal, and cut the roll into individual pouches.

Figure 11C:
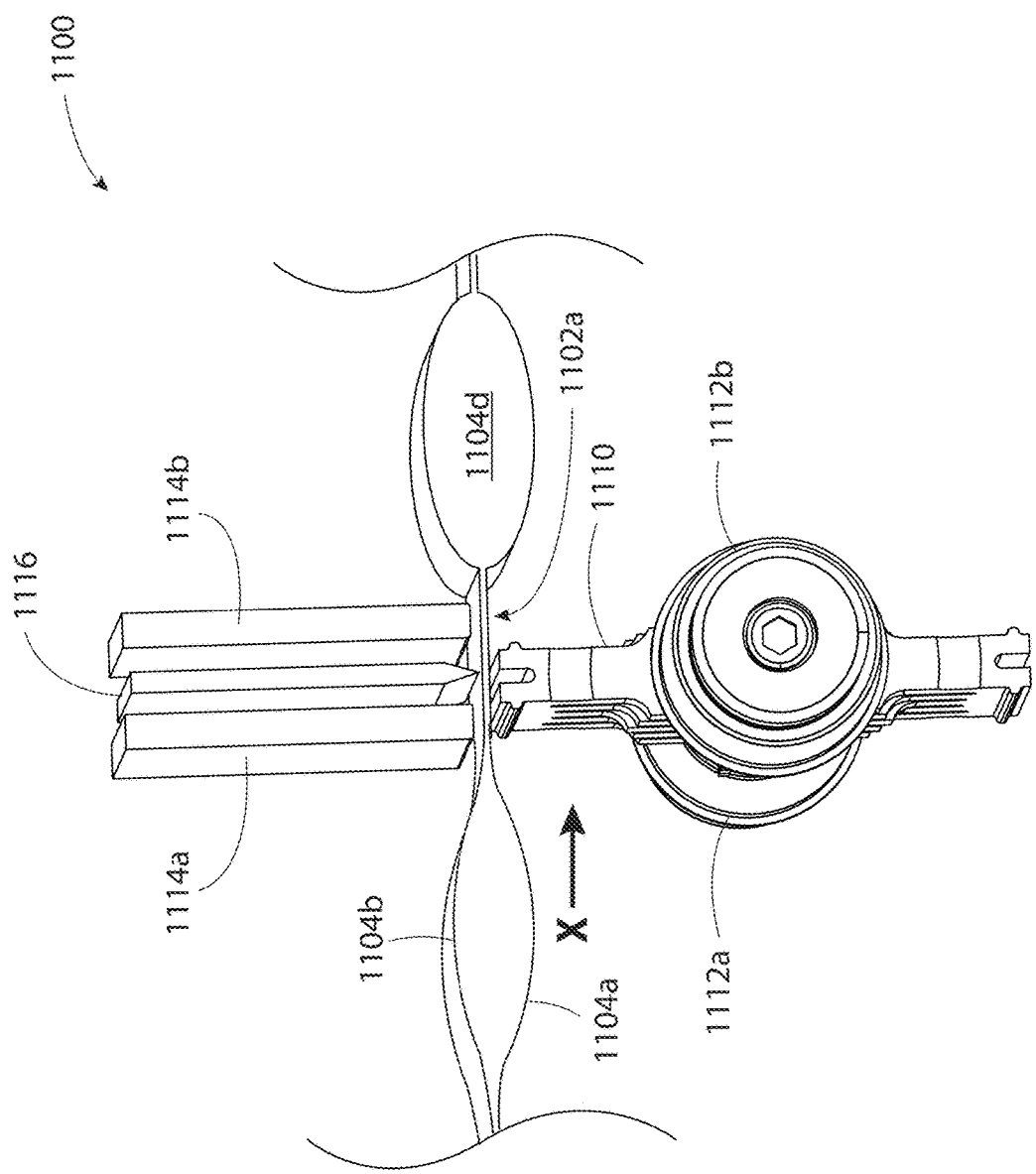
FIG. 11C is a perspective view of the ultrasonic-assisted cut and seal assembly shown in FIG. 11A with the part arranged between the horn and the anvil.
Figure 11D:
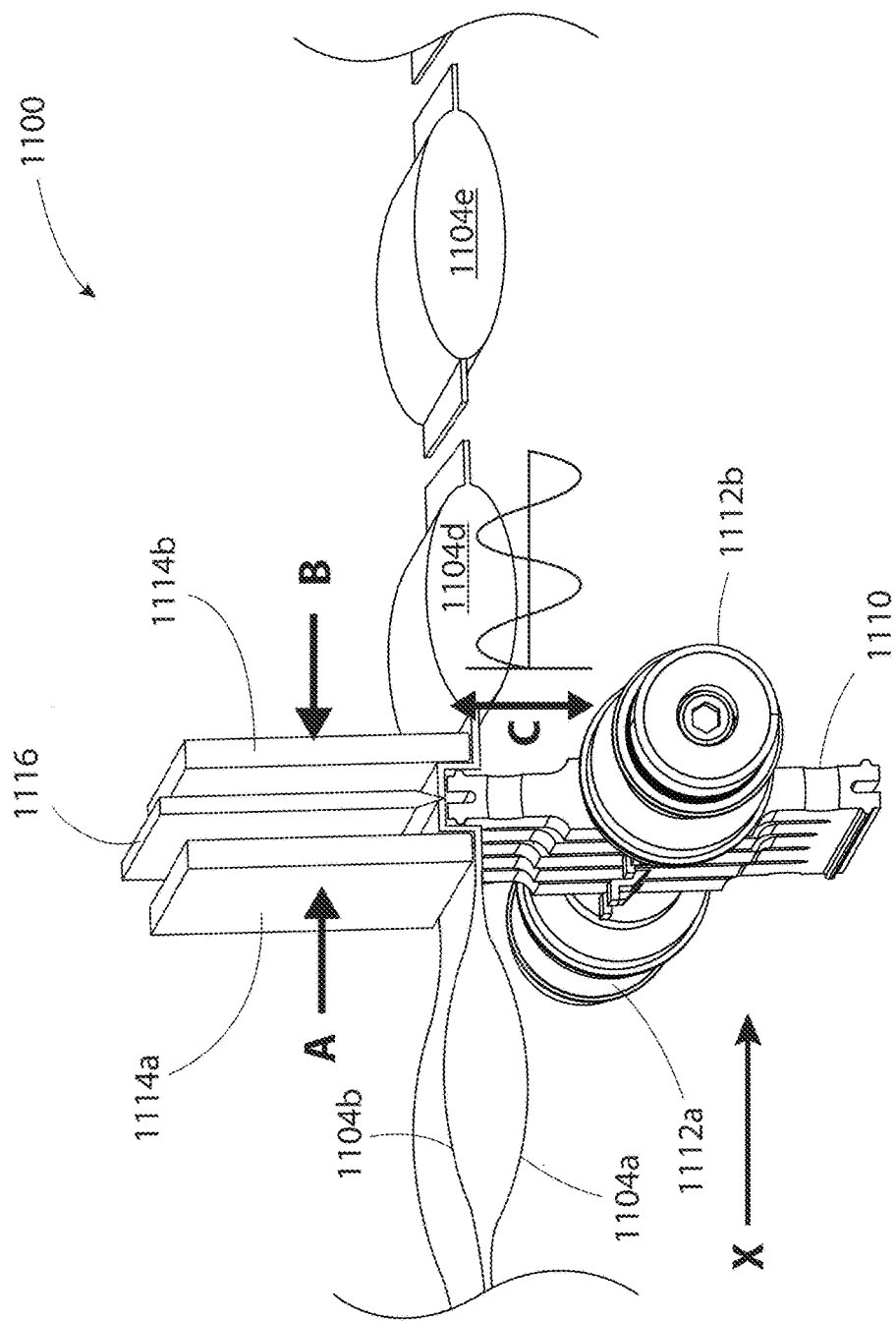
FIG. 11D is a perspective view of the ultrasonic-assisted cut and seal assembly shown in FIG. 11C with the part pressed between the horn and the anvil to simultaneously form two sealing interfaces on the part.
Figure 11E:
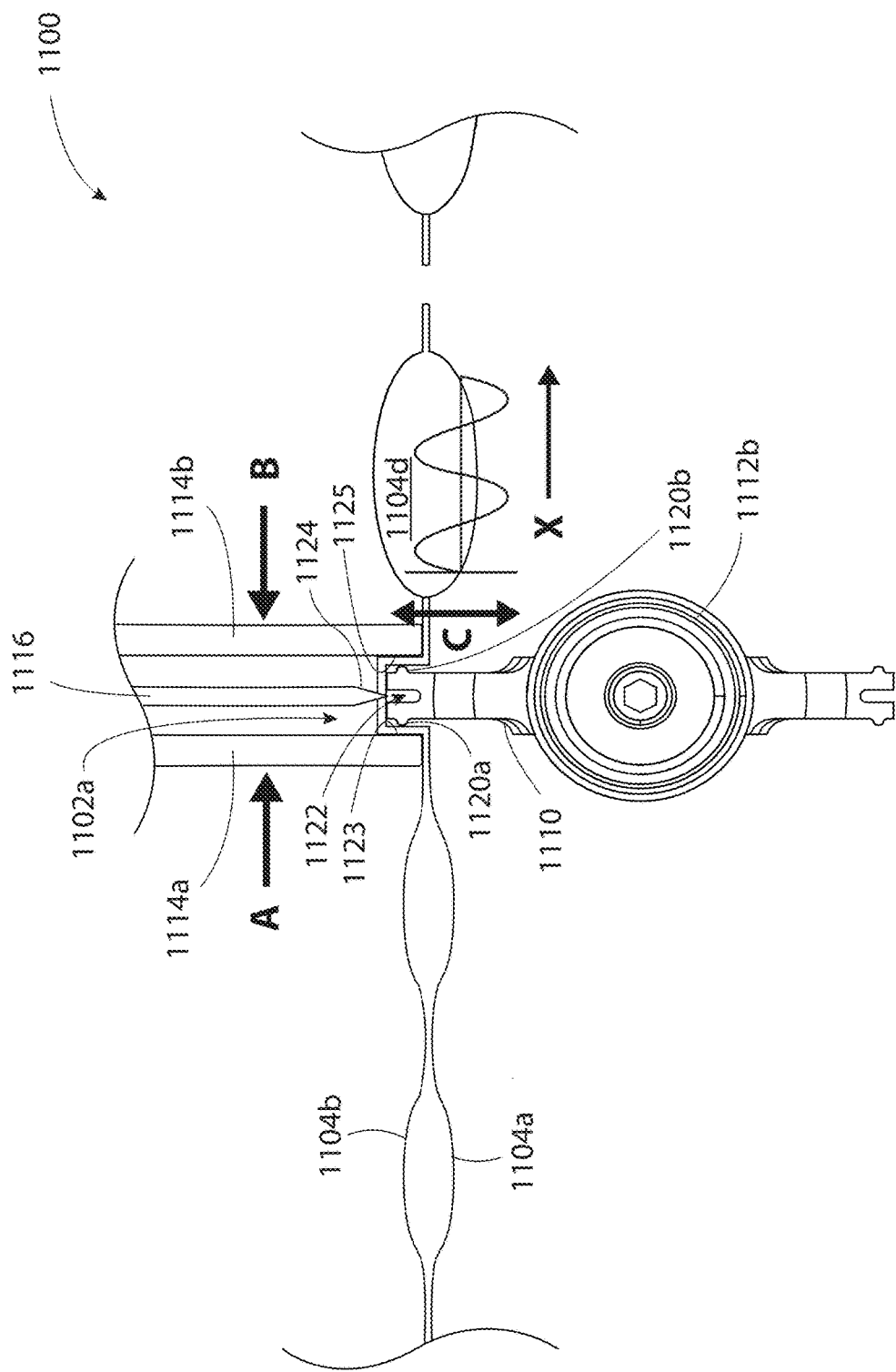
FIG. 11E is a side view of the ultrasonic-assisted cut and seal assembly shown in FIG. 11D.
Figure 11F:
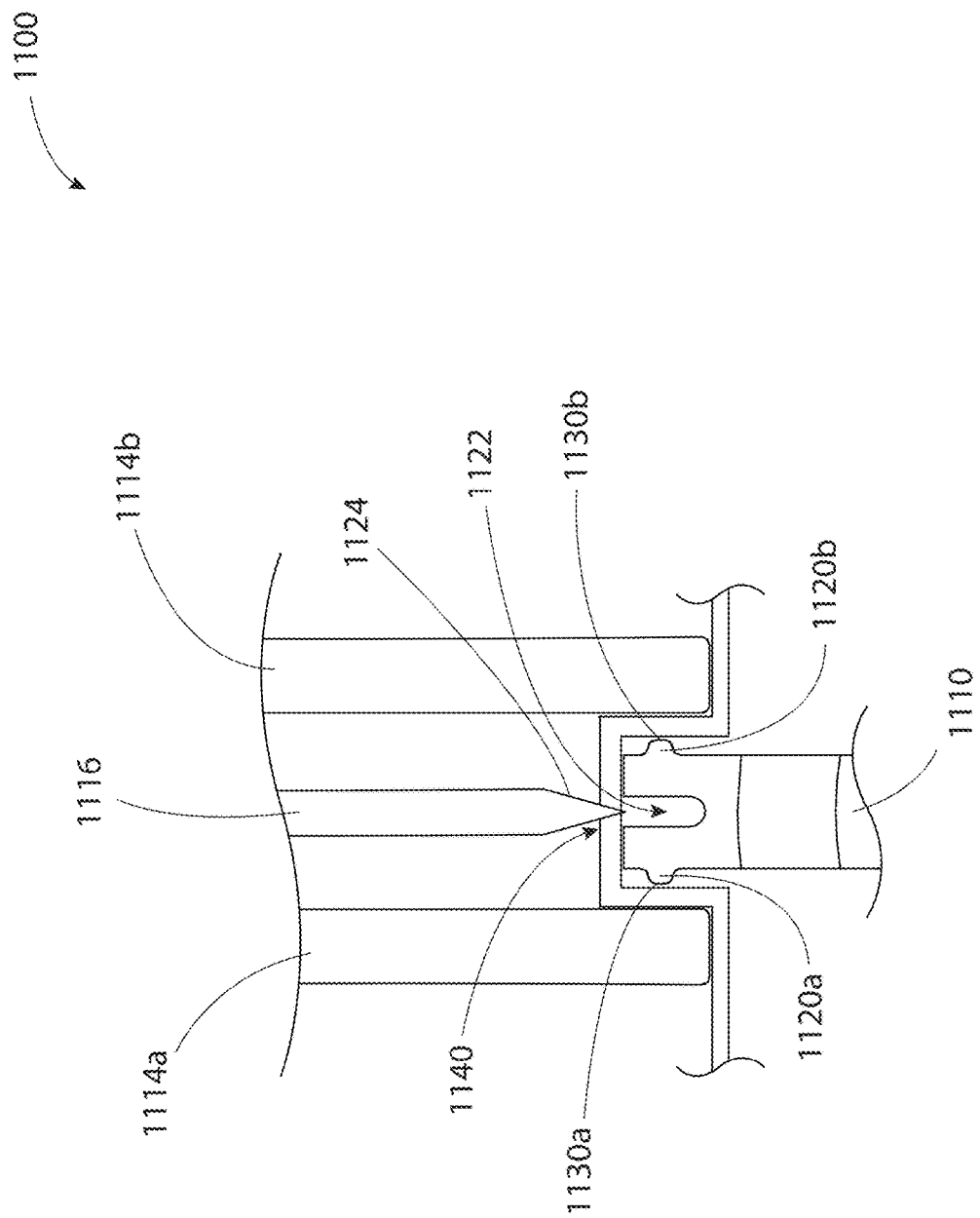
FIG. 11F is an enlarged side view of the ultrasonic-assisted cut and seal assembly shown in FIG. 11E to show the two sealing interfaces between the horn and the anvil, and the blade inside the anvil cutting the part to singulate the forward part from the remainder of the advancing roll.

The present disclosure advances the art of pillow pouch packaging by introducing at least two ultrasonic transducers 1112a, 1112b that apply ultrasonic energy that is synchronized in frequency and phase into a horn 1110. An example of this configuration can be seen in FIG. 11A. The transducers 1112a, 1112b are arranged relative to the horn 1110 so that they direct their respective ultrasonic energies toward one another into the horn in a direction that is transverse to a direction of travel of the roll 1102 (e.g., from left to right indicated by the arrow X). As the roll 1102 travels in the direction X between the anvils 1114a, 1114b and the horn 1110, either the anvils 1114a, 1114b or the horn 1110 or both are brought toward one another to clamp a section 1102a of the roll therebetween. FIG. 11C shows a section 1102a of the roll almost ready to be clamped between the horn 1110 and anvils 1114a, 1114b. In FIG. 11D, the section 1102a of the roll can be seen clamped in a U-formation between the horn 1110 and the anvils 1114a, 1114b. The anvils 1114a, 1114b are clamped together by moving them in the direction of arrows A and B as shown in FIG. 11D while the horn 1110 is rapidly vibrated up and down in the bidirectional direction indicated by arrow C. This rapid up and down mechanical movement of the horn (see FEA analysis in FIG. 12) caused by the synchronized ultrasonic energies applied by the transducers 1112a, 1112b cause a first horn interface 11120a and a second horn interface 1120b (best seen in FIG. 11E) to undergo a "scrubbing" action against the portion of the roll 1110 trapped between the interfaces 1120a, 1120b and respective anvils 1114a, 1114b to create two seals simultaneously in a single pass (e.g., the back of the forward pouch 1104d and the front of the next pouch 1102c on the roll 1102. The advancing roll 1102 needs to pause only for as long as the ultrasonic energies can be applied, and then can resume to seal the next advancing pouch 1104c. This rapid movement creates a uniform seal among the layers of the roll 1102 in two places simultaneously along the section 1102a of the roll 1102. A gap or trough 1130b formed in an end 1122 of the horn 1110 as shown in FIG. 11E can receive an optional blade 1116 having a sharp tip 1124, which can cut the section 1140 of the roll 1102 at the same time as the two seals are being formed at the horn interfaces or part-interfacing surfaces 1120a, 1120b, which is best seen in FIG. 11F. This dual action is referred to as a "cut and seal," because these two operations are performed simultaneously, increasing the throughput of the roll and singulation or individuation of the pouches or bags. The section between the two seals is referred to as an intra-seal gap 1102a. The anvil 1114a has a surface 1123 that presses against the part 1104 of the roll 1102 adjacent to the first part-interfacing surface 1120a of the horn 1110. The anvil 1114b also has a surface 1125 that presses against the part 1104 of the roll 1102 adjacent to the second part-interfacing surface 1120b of the horn 1110.

Figure 12:
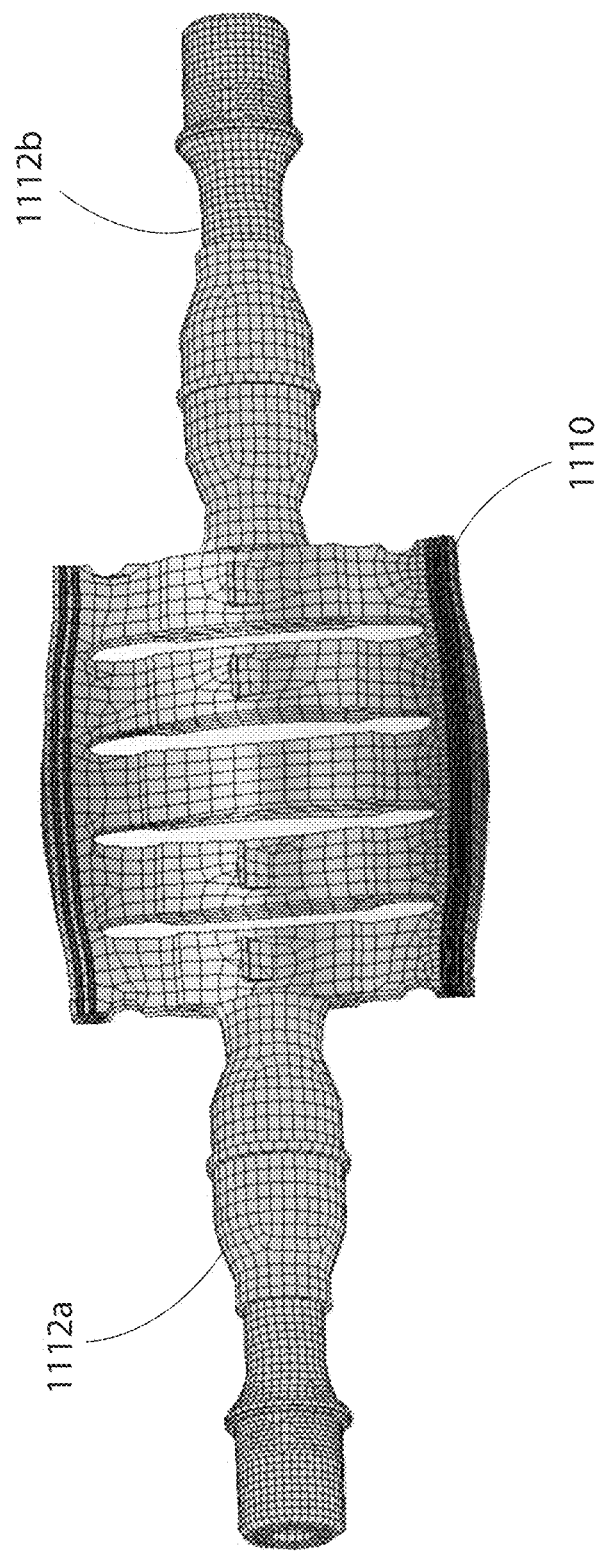
FIG. 12 is a color illustration of a finite element analysis (FEA) of an ultrasonic stack assembly used in FIGS. 11A-11F having a horn between dual transducers arranged to inject ultrasonic energy into the horn. Alternately this horn arrangement can be operated with a single transducer and two boosters or a single transducer and one booster providing cantilevered support.

FIG. 12 is a color illustration of a finite element analysis (FEA) of the horn 1110 as synchronized ultrasonic energy is being transmitted by the dual transducers 1112a, 1112b into the horn 1110. The stresses and strains of the metal of the horn 1110 cause it to expand and contract rapidly, which creates the scrubbing action, allowing the interfaces 1120a, 1120b to move rapidly back and forth. This friction creates a uniform heat energy that rapidly creates a hermetic seal on the roll in two places simultaneously at the interfaces 1120a, 1120b. The distortion of the metal has been exaggerated in this model for ease of illustration.

Figure 13A:
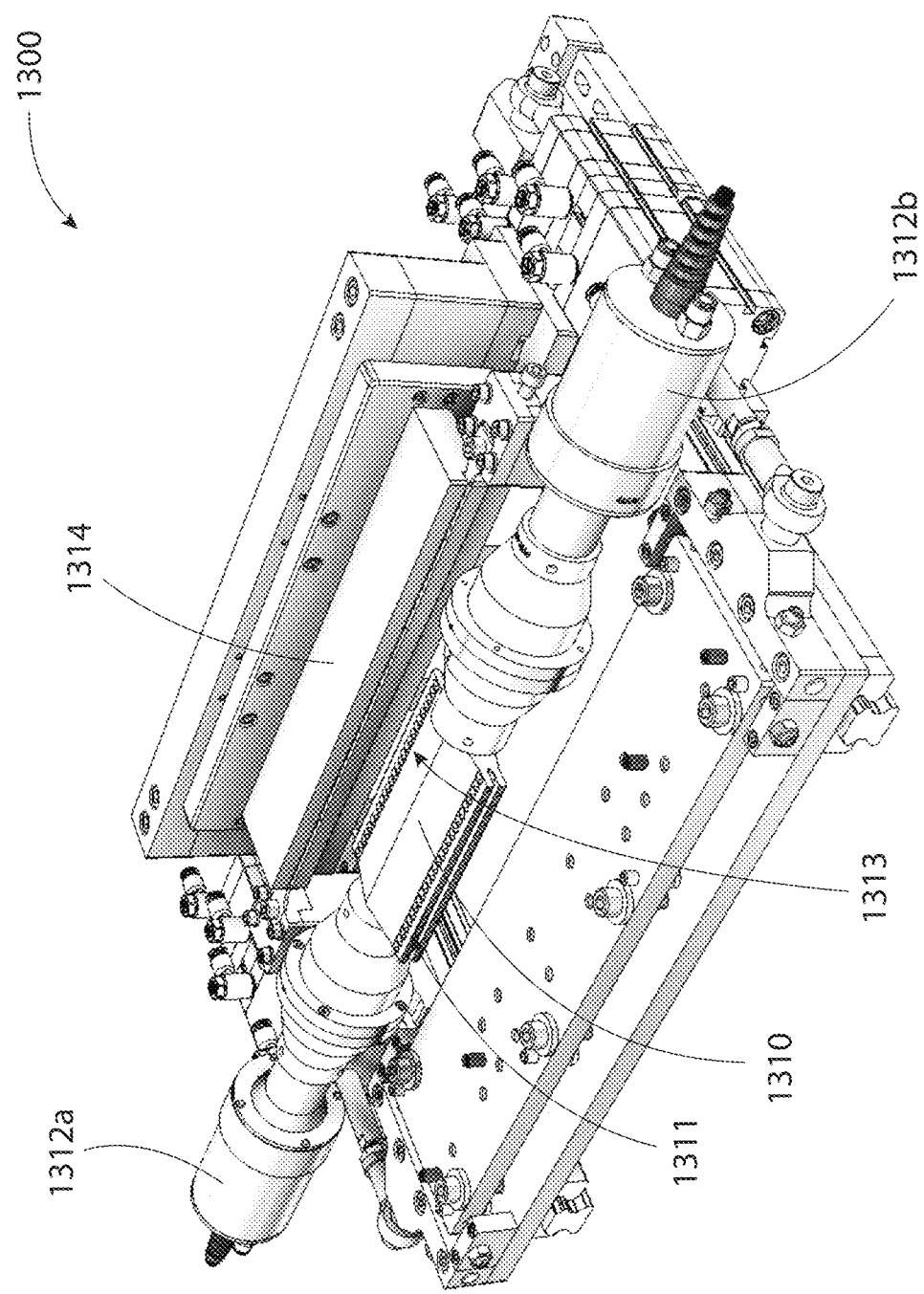
FIG. 13A is a perspective view of an ultrasonic-assisted "cut and seal" assembly having dual ultrasonic transducers applying synchronized ultrasonic energy to a resonant horn that captures a roll having multiple layers between the horn and an anvil.
Figure 13B:
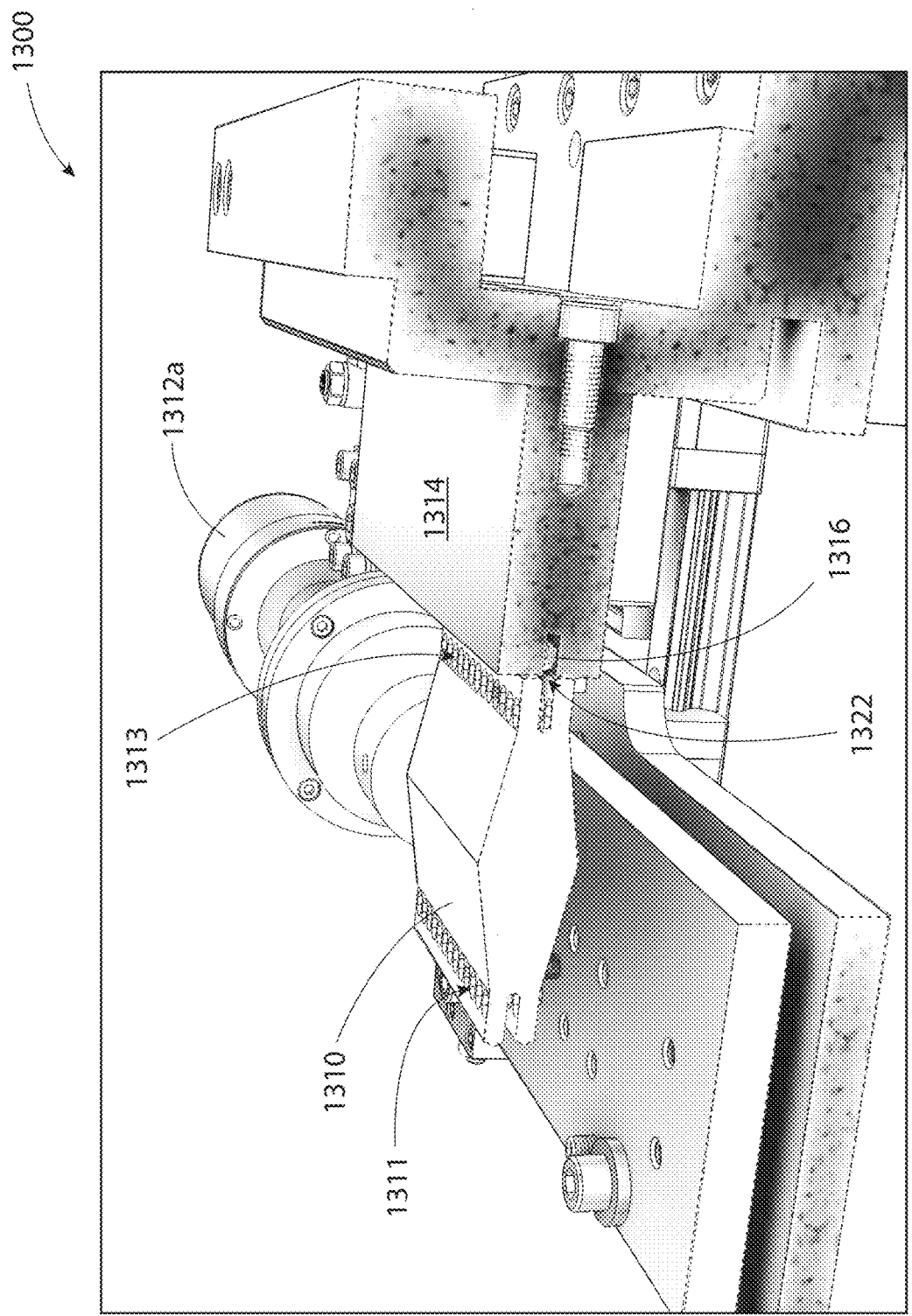
FIG. 13B is a perspective, cut-away view of the ultrasonic-assisted "cut and seal" assembly shown in FIG. 13A to show the blade between the anvil abutting the horn having a corresponding opening or slot to receive therein the blade when actuated into the horn to cut the part arranged between the horn and the anvil.
Figure 13C:
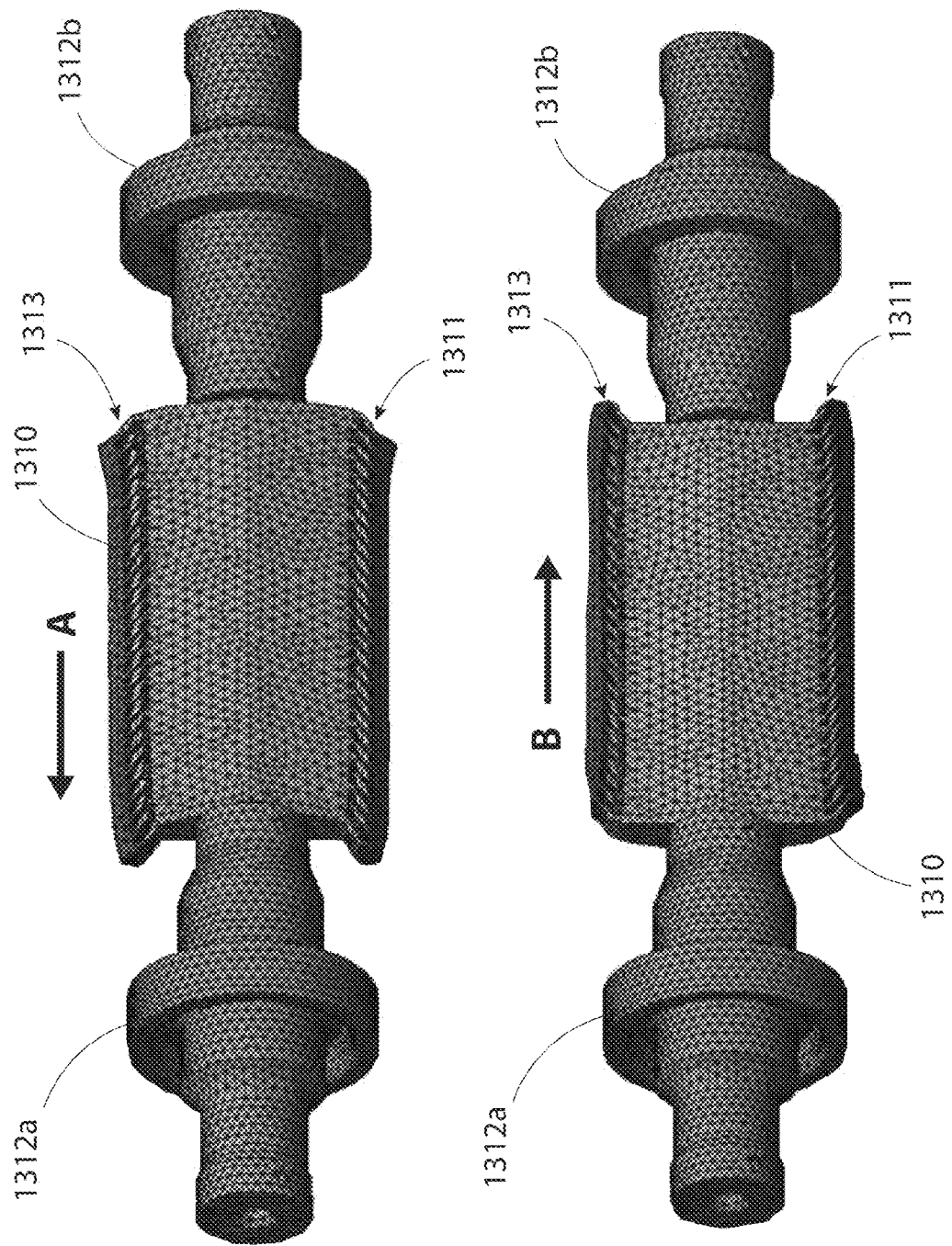
FIG. 13C shows two color illustrations of FEA analyses of the horn shown in FIGS. 13A and 13B to show an exaggerated direction of flexure or movement of the horn as the disparate phases of ultrasonic energies are imparted from the dual transducers into the horn from opposite sides thereof.
Figure 14A:
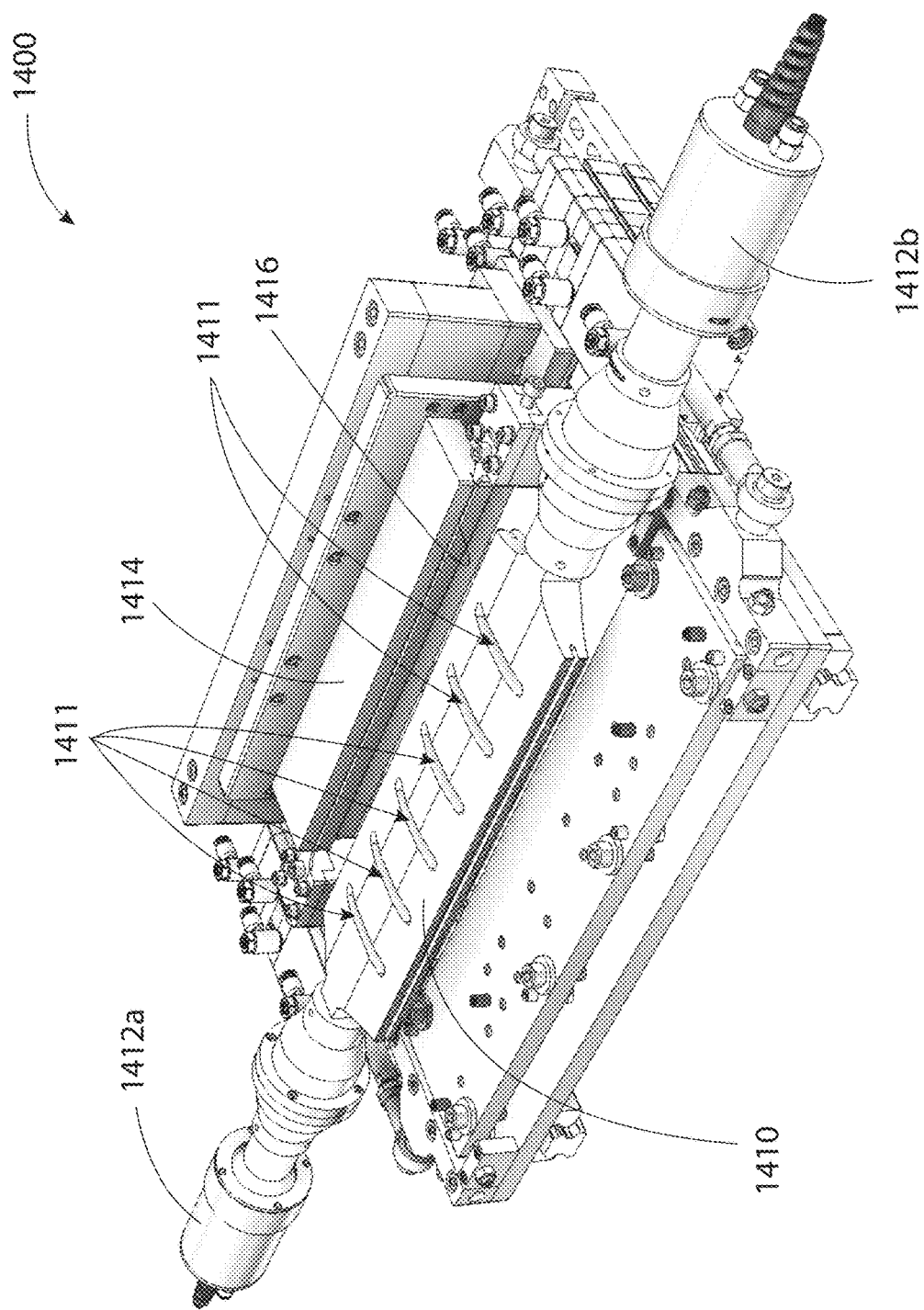
FIG. 14A is a perspective view of an ultrasonic-assisted "cut and seal" assembly having dual ultrasonic transducers applying synchronized ultrasonic energy to a resonant horn that captures a roll having multiple layers between the horn and an anvil. Alternately this horn arrangement can be operated with a single transducer and two boosters or a single transducer and one booster providing cantilevered support.

FIG. 13A is a perspective view of an ultrasonic-assisted "cut and seal" assembly 1300 having dual ultrasonic transducers 1312a, 1312b applying synchronized ultrasonic energy to a resonant horn 1310 that captures a roll, such as 1102, having multiple layers between the horn 1310 and an anvil 1314. FIG. 14A is a perspective view of an ultrasonic-assisted "cut and seal" assembly 1400 having dual ultrasonic transducers 1412a, 1412b applying synchronized ultrasonic energy to a resonant horn 1410 that captures a roll, such as 1102, having multiple layers between the horn 1410 and an anvil 1414. Alternately, the horn 1310 can be driven by a single ultrasonic transducer in applications requiring a lower power to weld but still benefiting from the horns scrubbing action. As can be seen by comparing FIGS. 13A and 14A, the resonant horn 1310 in FIG. 13A has short slots 1311, 1313 formed along an end edge of the horn 1310. The resonant horn with short slots near the output face as shown in FIG. 13C has a node (region with minimal motion) near the interior side of the slots and an anti-node (region with maximum activity) on the outside surface of the horn. This motion creates a scrubbing action back and forth as shown in FIG. 13C. The resonant horn 1410 in FIG. 14A has long slots 1411 formed along a main body of the horn 1410, but otherwise the assemblies 1300, 1400 are the same. An optional blade 1316 is shown in the anvil 1315, which can be used to carry out a cutting operation in the space between adjacent sealed interfaces defined by the gap 1322 between the fingers of the horn 1310 and the anvil 1314 as shown in FIG. 13B. FIG. 13C illustrates two FEA images of the horn 1310 as the out-of-phase ultrasonic energy is applied by the dual transducers 1312a, 1312b into the body of the horn 1310. The distortion or displacement of the horn 1310 has been exaggerated for ease of illustration, but the images show how the horn 1310 moves rapidly back and forth in directions of arrows A and B to create a scrubbing action on its end surfaces. When pressed against the anvil 1314, the combination of the scrubbing action, which produces heat contributed by the ultrasonic energy, and the mechanical forces pressed against the film between the horn 1310 and anvil 1314, produces a hermetic seal at the film's interface where the scrubbing is carried out. This seal can be produced by actuating the horn in and out or by rotating the horn continuously such that it contacts the film twice per rotation.

Figure 14B:
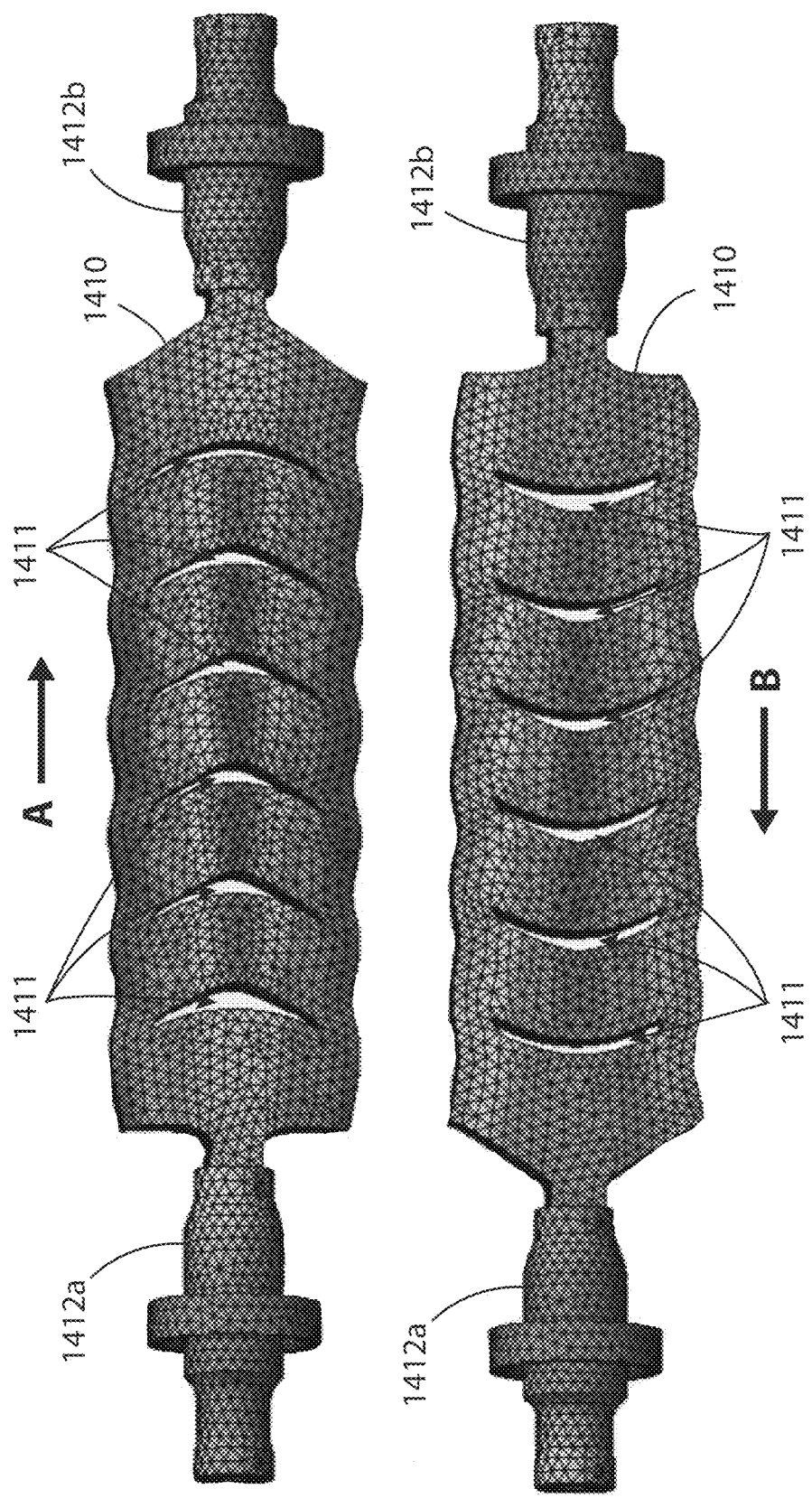
FIG. 14B shows two color illustrations of FEA analyses of the horn shown in FIG. 14A to show an exaggerated direction of flexure or movement of the horn as the disparate phases of ultrasonic energies are imparted from the dual transducers into the horn from opposite sides thereof.

FIG. 14B illustrates two FEA images of the resonant horn 1410 shown in FIG. 14A. Again, the distortions have been exaggerated to show the direction of movement or distortion of the horn 1410 as the out-of-phase ultrasonic energy is passed through the body of the horn 1410 by the dual transducers 1412a, 1412b, which pass ultrasonic energy having a synchronized frequency toward one another into the horn 1410. The slots 1411 become slightly distorted allowing the mechanical movement of the horn 1410, which creates a rapid back-and-forth action referred to herein as scrubbing on the end surfaces of the horn 1410 where they are pressed against the anvil 1414. The horn 1410 may be actuated in and out or rotated continuously such that it contacts the film twice per rotation. The longer in FIG. 14B create a node (region of minimal activity) and passes through the slots. The anti-node (region of maximum motion) occurs on the output face of the horn creating a scrubbing action back and forth as shown in FIG. 14B.

Figure 15A:
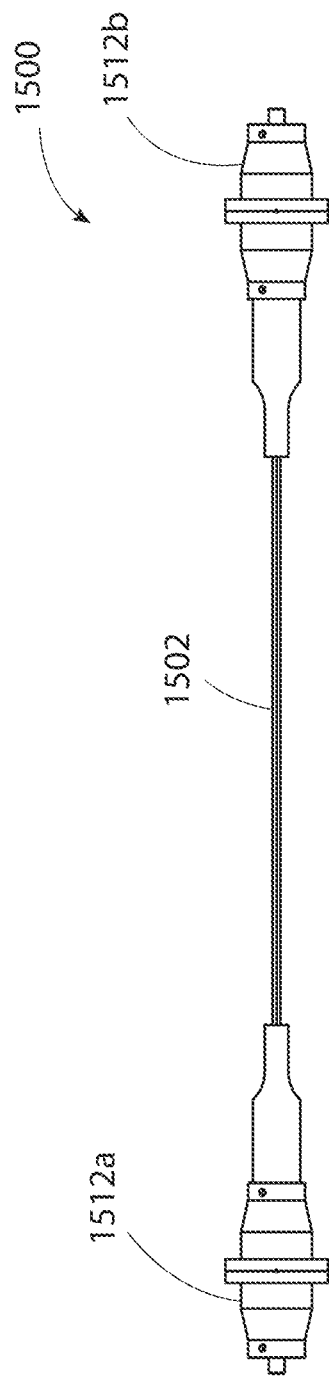
FIG. 15A is a top or bottom view of a cutting blade sandwiched between two ultrasonic stack assemblies whose transducers output synchronized ultrasonic energy into the cutting blade.
Figure 15B:
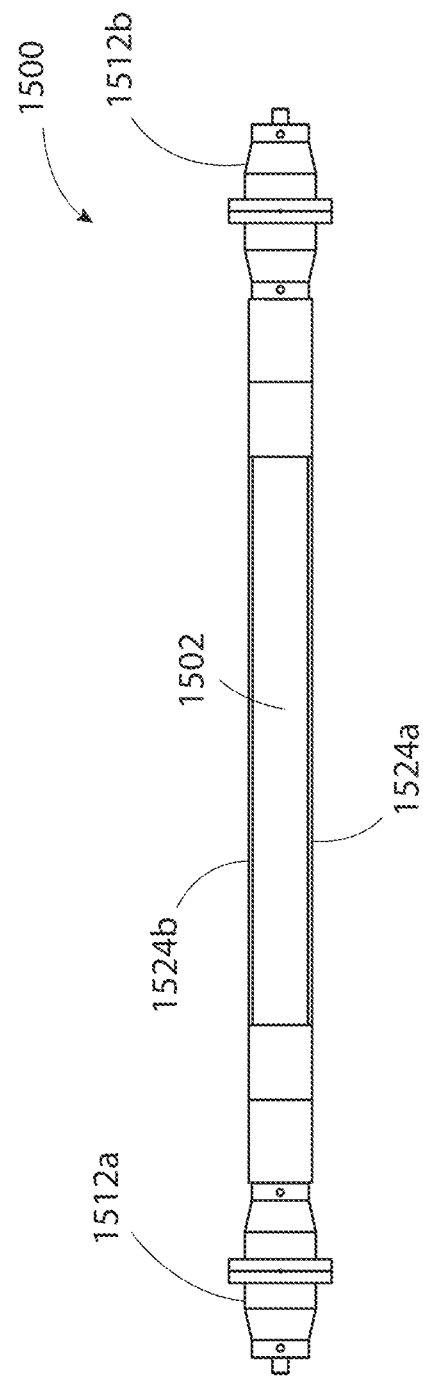
FIG. 15B is a side view of the cutting blade and ultrasonic stack assemblies shown in FIG. 15A.

FIG. 15A is a top or bottom view of a prior art cutting blade 1502 sandwiched between two ultrasonic stack assemblies 1512a, 1512b. FIG. 15B is a side view of the cutting blade 1502 and ultrasonic stack assemblies 1512a, 1512b shown in FIG. 15A. The cutting blade 1502 has two cutting edges 1524a, 1524b having a sharpness configured to cut through matter, such as a block of food. The type of matter is immaterial to the present disclosure. A drawback to this prior art approach is that the cutting blade 1502 suffers from multiple nodal points (areas of minimal motional activity) along the axis (and the cutting edges) of this blade 1502. As a result, there will be very poor cutting at and near those nodal points. The embodiments shown next in FIGS. 16-18 eliminate these undesirable nodal points along the cutting edges and ensures a consistent amplitude along the cutting edges of the cutting blade. Moreover, the cutting blade 1502 shown in FIGS. 15A and 15B is poorly suited to cut through materials having a thickness equal to or greater than a height of the cutting blade 1502.

FIG. 16A is a perspective view of a rotatable resonant cutting blade 1602 of a synchronized cutting assembly 1600, which is sandwiched between two ultrasonic stack assemblies 1612a, 1612b whose respective transducers output synchronized ultrasonic energy (in frequency and phase) into the cutting blade 1602, which operates like a resonant horn. Alternately the horn shown in FIG. 16A can be driven by a single ultrasonic transducer in applications requiring a lower power. FIG. 16B is a side view of the cutting blade assembly 1600 shown in FIG. 16A. FIG. 16C is an end view of the cutting blade assembly 1600 shown in FIG. 16A. In this example, the cutting blade 1602 has long slots similar to that shown in the horn 1110 of FIG. 11A and can be configured to rotate about an axis running through the stacks 1612a, 1612b and the cutting blade 1602. An example of this rotation is shown in FIGS. 17A-17C. As the cutting blade 1602 is cutting through matter, both stack assemblies 1612a, 1612b introduce synchronized ultrasonic energy into the cutting blade 1602 simultaneously, causing the blade 1602 to vibrate in a push-pull manner toward one stack 1612a and away from the other stack 1612b, and vice versa. In addition to generating a consistent, even amplitude along the cutting edges 1624a, 1624b of the cutting blade 1602, the blade 1602 has the other advantage of being able to cut through material having a thickness that exceeds a height of the blade 1602. An example of this embodiment is shown in FIG. 17.

FIG. 17A is a perspective view of the rotatable cutting blade assembly 1600 shown in FIG. 16A cutting through a thick block of matter 1700, such as food. FIG. 17B is an end view of the rotatable cutting blade assembly 1600 shown in FIG. 17A in which the dual ultrasonic stack assemblies 1612a, 1612b are visible. FIG. 17C is a side view of the rotatable cutting blade assembly 1600 shown in FIG. 17A. The entire cutting blade assembly 1600 together with the stacks 1612a, 1612b can be configured to rotate about an axis running through the stacks 1612a, 1612b and the blade 1602, which facilitates cutting through thick matter, even thicknesses that exceed a height of the blade 1602. As the blade 1602, which is undergoing a push-pull vibration thanks to the synchronized energies simultaneously applied by the stacks 1612a, 1612b, slices or cuts through the matter 1700, the blade 1602 can be rotated slightly to ensure that the cut is straight, and to accommodate the non-flat contour of the blade 1602.

Figure 18A:
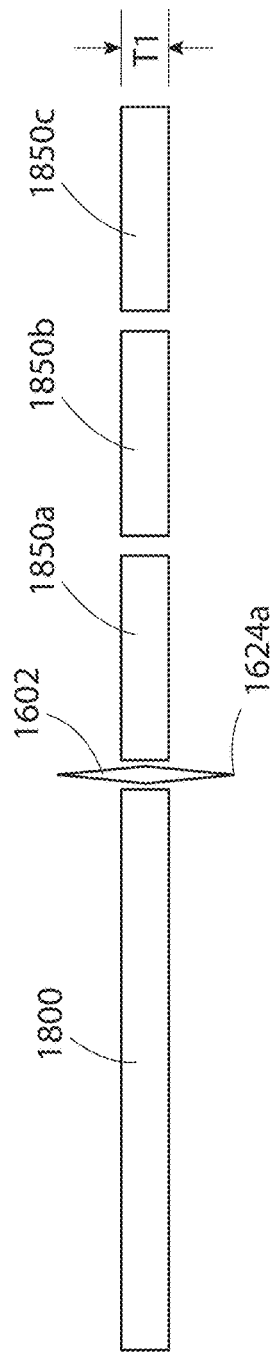
FIG. 18A is a functional illustration of a cutting blade that is configured to cut from a top or bottom cutting blade surface through matter having a thickness T1.

FIG. 18A is a functional illustration of a cutting blade 1602 that is configured to cut from a top or bottom cutting blade surface 1624a, 1624b through matter 1800 having a thickness T1. In this example, T1 is less than a height of the blade 1602, and either cutting surface 1624a, 1624b of the cutting blade 1602 can cut the matter 1800 as it is singulated into parts 1850a, 1850b, 1850c, and so on.

Figure 18B:
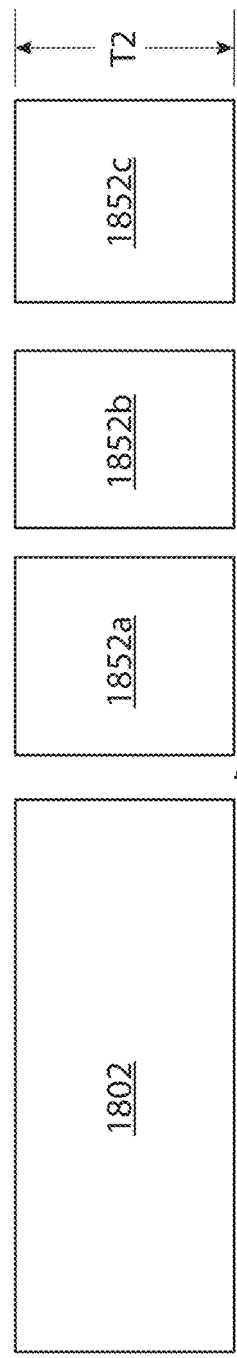
FIG. 18B a functional illustration of a cutting blade that is configured to cut through matter having a thickness T2>>T1 and also greater than a height of the cutting blades.

FIG. 18B a functional illustration of a cutting blade 1602 that is configured to cut through matter 1802 having a thickness T2>>T1 and also greater than a height of the cutting blade 1602. This embodiment demonstrates that the synchronized ultrasonic stacks herein can be leveraged to apply synchronized ultrasonic energy to a cutting blade having a height that is less than a thickness of the matter being cut to produce singulated blocks of matter 1852a, 1852b, 1852c, and so on.

Figure 18C:
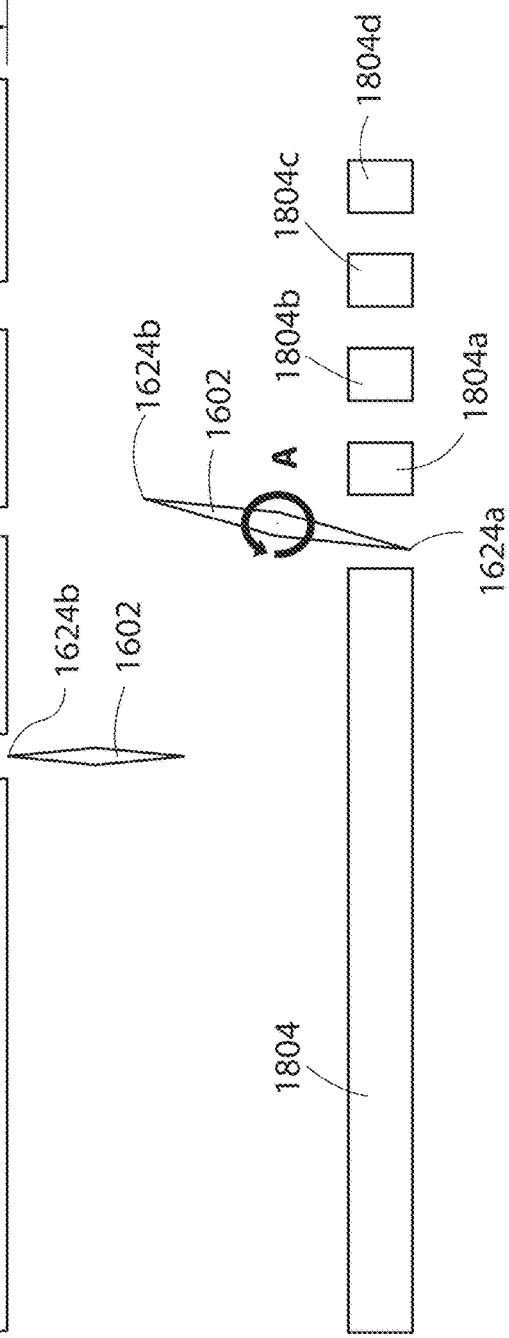
FIG. 18C is a functional illustration showing how the cutting blade can be rotated to cut a block of matter at least twice per complete rotation of the cutting blade.

FIG. 18C is a functional illustration showing how the cutting blade 1602 can be rotated to cut a block of matter 1804 at least twice per complete rotation of the cutting blade 1602, to produce singulated blocks of matter 1804a, 1804b, 1804c. During the first half of the rotation, one of the cutting blade edges 1624a cuts through the matter 1804, and during the second half of a complete rotation, the other cutting blade edge 1624*b* cuts through the matter 1804. The thickness of the matter 1804 is less than half of a height of the cutting blade 1602 to ensure that the rotation of the blade 1602 does not interfere with the passing matter 1804 moving relative to the blade 1602.

FIGS. 19A-19C, 20A-20C, and 21 illustrate different types of paddle horns similar to those shown in FIGS. 12, 13A-13C, and 14A-14B. Because the paddle horns perform a "scrubbing" motion described above in which the entire surface in contact with the part(s) to be joined moves rapidly back and forth along a lateral direction (see arrows A and B in FIGS. 13C and 14B), the entire exposed edge or end surfaces of the horn on both sides is available for imparting ultrasonic energy into the part(s) to be joined. The horns shown in FIGS. 12, 13A-13C, and 14A-14B also share this advantage, namely, that the entire edge surface from one end of the horn to the other is available for imparting ultrasonic energy onto or into the part(s) to be joined. As a result, a much larger welding area can be covered by the paddle horn, allowing longer or larger parts to be joined, e.g., film attached to the top of a container, and when the paddle rotates, two welding cycles can be performed in a single 360 degree rotation of the horn. No heat is required or applied to the weld interface, compared to conventional sealing applications, because the ultrasonic energy is sufficient to join the parts together, e.g., a film to a container, or two films without application of any heat energy. The paddle-shaped horns herein allow the horn to expand and contract along its lateral dimension (orthogonal to its axis of rotation), creating a "scrubbing" movement along the entire welding interface, as opposed to a "swelling" movement that can be found in conventional applications. Such swelling movements produce a much smaller, and less reliable, weld area.

The paddle horns disclosed herein are particularly effective at sealing uneven film layers, e.g., when a total thickness of films to be joined varies along a length of the weld. Normally, using conventional applications, such uneven thickness would produce uneven welds; but with the ultrasonic-driven paddle horns disclosed herein, the weld joints are uniform and hermetic.

The horn can be made of metal, and can be rigidly mounted to a fixed frame or structure, so that rotations of the horn are uniform and not susceptible to wobble, allowing faster, consistent, and repeatably high quality welds for thousands and thousands of welds for many applications including packaging and non-woven applications.

FIGS. 19A and 19B illustrate two different paddle "cross seal" style horns 1910 having two elongated slots 1911 formed transverse to an axis of rotation of the paddle. The horn 1910 in FIG. 19A has multiple scaling protrusions 1936 whereas the horn 1910 in FIG. 19B has a single scaling protrusion 1934 along edge surfaces of the horn 1910. The scaling protrusion 1934 allow for welding multiple different types of products using the same horn 1910, and can be designed so that the weld area is much larger compared to traditional scrubbing-type horns. Ultrasonic energy is available across the entire length 1924 of the horn along its axis of rotation, allowing for a welding large areas. Dual ultrasonic boosters 1912*a*, 1912*b*, which are connected to corresponding ultrasonic transducers (e.g., like transducers 2112*a*, 2112*b* shown in FIG. 21), apply the synchronized ultrasonic energy to the horn 1910 as described above, which reaches the entire end or edge face of the horn 1910 on both sides of the paddle parallel with the axis of rotation. FIG. 19C is a color illustration of an exaggerated FEA analysis of the horn 1910, showing how the slots 1911 allow the horn 1910 to expand and contract laterally along its axis of rotation to create the back and forth scrubbing movement along the entire face edges of the horn 1910. The optional scaling protrusions 1934, 136 scale the welding surface as the horn 1910 moves rapidly back and forth along the entire welding surface as ultrasonic energy is imparted throughout the horn 1910.

Figure 20A:
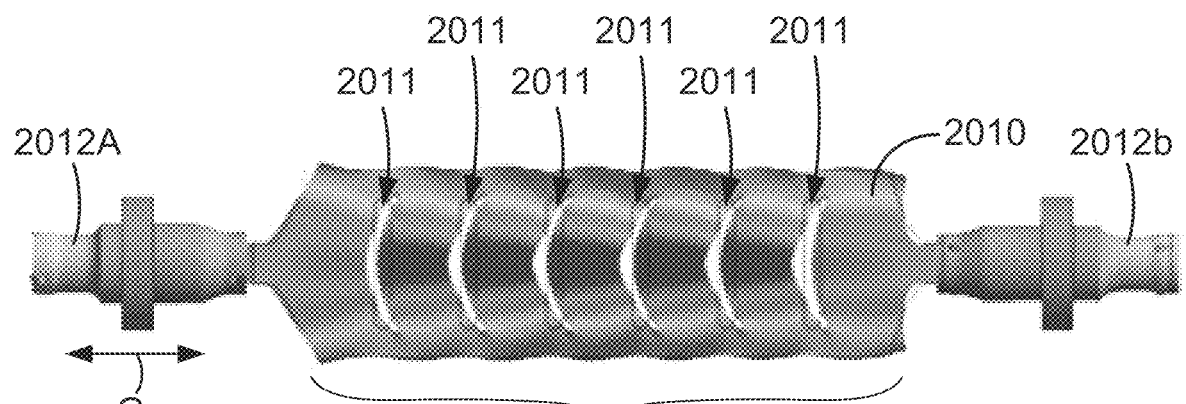
FIGS. 20A, 20B, and 20C are color illustrations of exaggerated FEA analysis of horns having different numbers of slots, commensurate with a length (from fixed point to fixed point) of the horn.
Figure 20B:
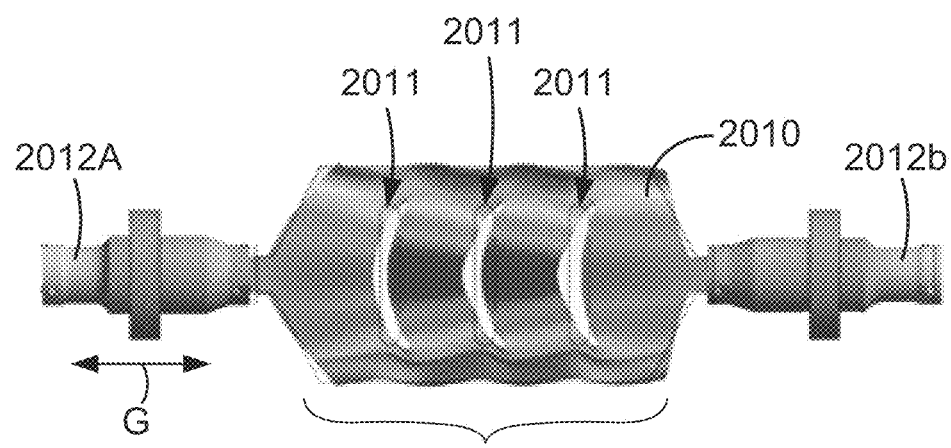
Figure 20C:
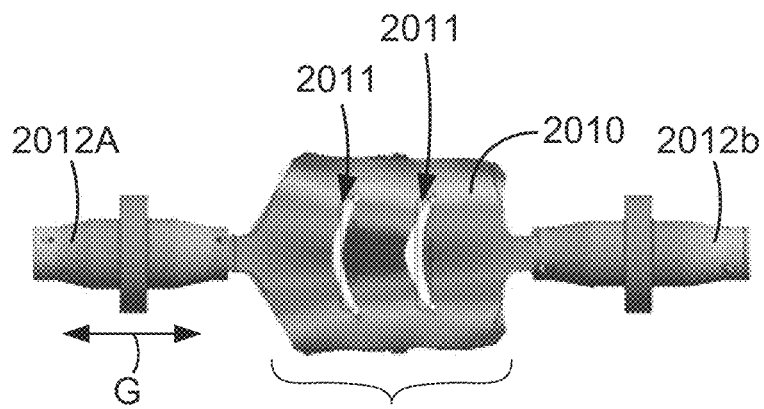

FIGS. 20A, 20B, and 20C are color illustrations of exaggerated FEA analyses (for ease of discussion) of horns 2010 having different numbers of slots 2011. The number of slots 2011 is commensurate with a length of the horn 2010, such that the longer the horn, the more slots 2011 are formed along its length as shown. In each case, welding is achieved along the entire length 2024 of the exposed face edges of the horn 2010. Dual ultrasonic boosters 2012*a*, 2012*b*, which are connected to corresponding ultrasonic transducers (e.g., like transducers 2112*a*, 2112*b* shown in FIG. 21), apply the synchronized ultrasonic energy to the horn 2010 as described above, which reaches the entire end or edge face of the horn 2010 on both sides of the paddle parallel with the axis of rotation.

Figure 21:
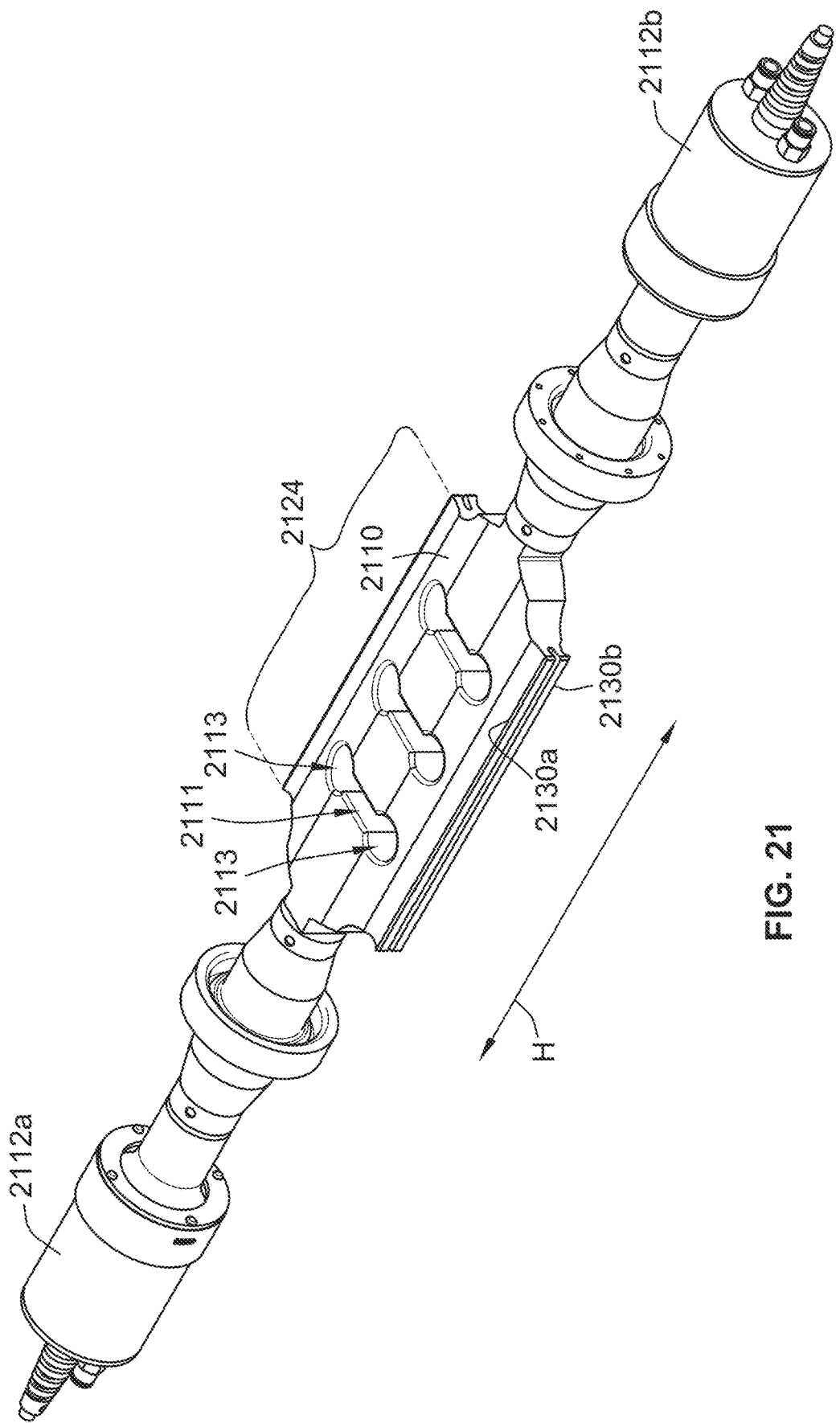
FIG. 21 is an illustration of a cross-seal style paddle-shaped horn with keyhole-shaped slots to facilitate a scrubbing motion along its lateral exposed edge surfaces.

FIG. 21 illustrates another style of paddle horn 2110 capable of performing a cross seal welding operation without use of heat to make the weld with three keyhole-shaped slots 2111 having enlarged portions 2113 to facilitate move lateral movement (along the direction of arrows H) along the exposed edge surfaces 2130*a*, 2130*b* of the horn 2110. Dual ultrasonic transducers coupled to corresponding ultrasonic boosters 2112*a*, 2112*b* apply the synchronized ultrasonic energy to the horn 2110 as described above, which reaches the entire end or edge face of the horn 2110 on both sides of the paddle parallel with the axis of rotation to allow a uniform weld seal to be created on parts to be joined along the entire length of the end or edge face on both sides of the horn 2110. Alternately, if only one side is used for sealing, the other side can be used when the first side wears out. In this example, the horn would be flipped over 180 degrees so that unused side can be used to continue sealing, effectively doubling the operational lifetime of the horn before it needs to be serviced or machined.

The horns shown in FIGS. 13C, 14B, 16A, 19A-19C, 20A-20C, and 21 described above produce a scrubbing motion thanks to design principles that will be discussed next. Ultrasonic horns are designed to have a natural resonance that is excited in operation. Many resonances exist in a structure of this size. A computer simulation can be used to tune the horn structure to have a resonance with a desired motion direction and uniformity, while keeping any other undesired resonances more distant in terms of frequency.

It should be noted that these resonances exist in the horn structure independent of the booster and transducer attached to it. The purpose of the booster is to provide mechanical support, and, together with the transducer, provide input vibrations to excite the aforementioned natural resonance. The booster and transducer have no substantial influence on the motion direction of the resonance, only on its amplitude.

Figure 23:
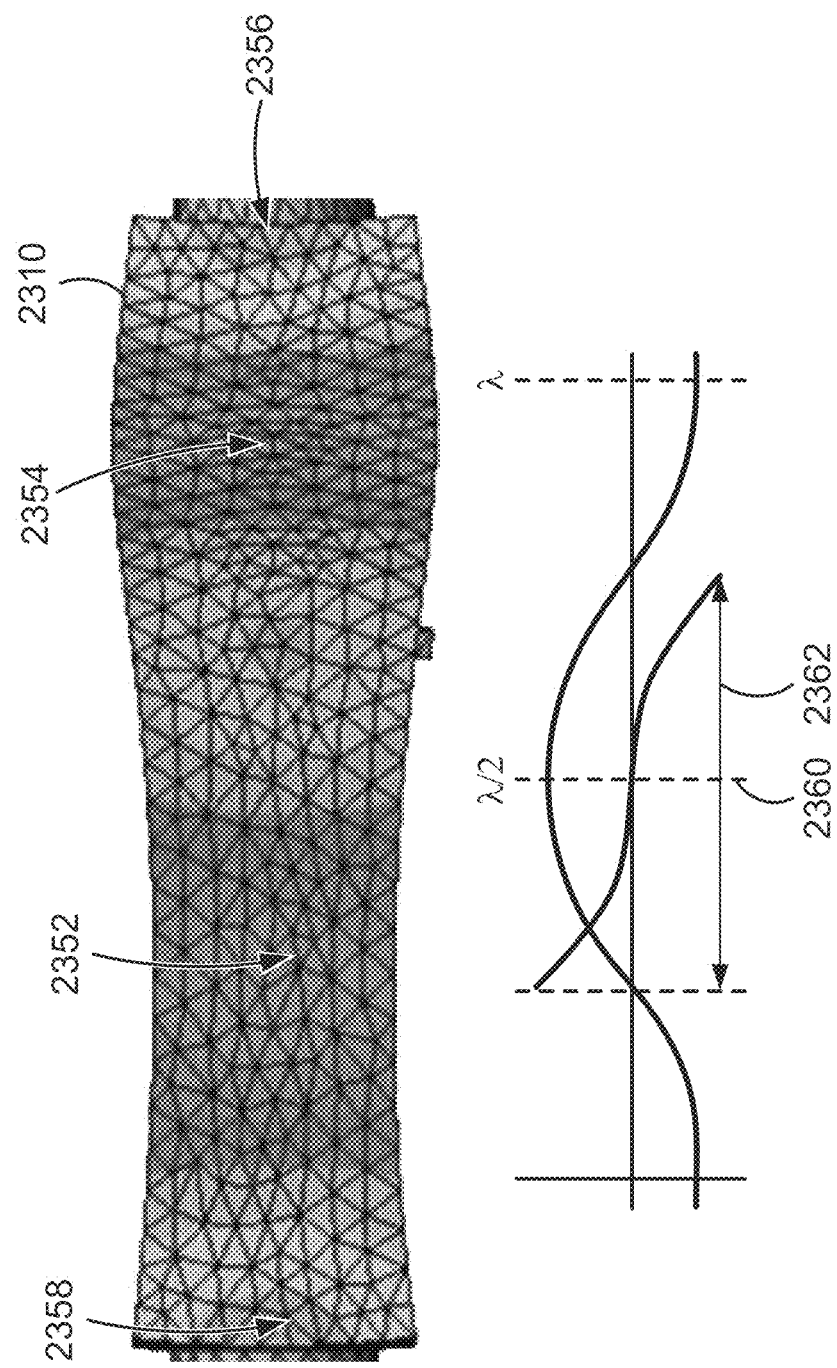
FIG. 23 is an FEA analysis of a prior-art conventional metal welding horn oriented horizontally and dimensioned to have 1 lambda wavelength along its width dimension, producing a wavelike undulating movement pattern along its width, which is not suitable for a scrubbing action along its full width but rather only at a small portion of its face on the protrusion shown in yellow.

FIGS. 22 and 23 show two types of prior-art horns that use traditional elongation resonance, where the direction of movement of the structure is designed to elongate the horn. Simple elongation-type ultrasonic horns have been utilized in industry for many years. In the FEA example of a prior-art vertically-oriented horn 2210 shown in FIG. 22, the vertically-oriented horn 2210 has a height corresponding to a half wavelength ($\lambda/2$) of the ultrasonic frequency applied and has a node 2252 shown at the approximate central region ($\lambda/4$) of the horn 2210. A node here refers to a region of minimum or minimal amplitude and maximum or maximal strain. Two anti-nodes 2250, 2254 appear at the top and bottom regions of the elongated horn. An anti-node is a region of maximum amplitude and minimum strain. As a result of the location of the node at the mid-section and the anti-nodes at either end of the horn 2210, the horn 2210 elongates along its length, moving in an up-and-down direction as shown in FIG. 22, according to the frequency applied by the ultrasonic transducer (not shown).

Similarly, FIG. 23 shows a prior-art, horizontally-oriented metal welding horn 2310 having a length corresponding to one wavelength (1λ) of the applied ultrasonic frequency. Here, two nodes 2352, 2354 appear at approximately λ/4 and 3λ/4 along the length of the horn 2310, and two anti-nodes 2356, 2358 are at the ends of the horn 2310, where it is typically fixed, e.g., to boosters or other fixed structures. Vibration occurs along section 2362, producing elongated movement of the horn 2310 along its length. The elongated motions produced by the prior-art horns shown in FIGS. 22 and 23 will not produce a scrubbing motion across the horn's entire width (e.g., its longest dimension) as disclosed herein, but rather only in a much smaller, confined region.

Figure 24:
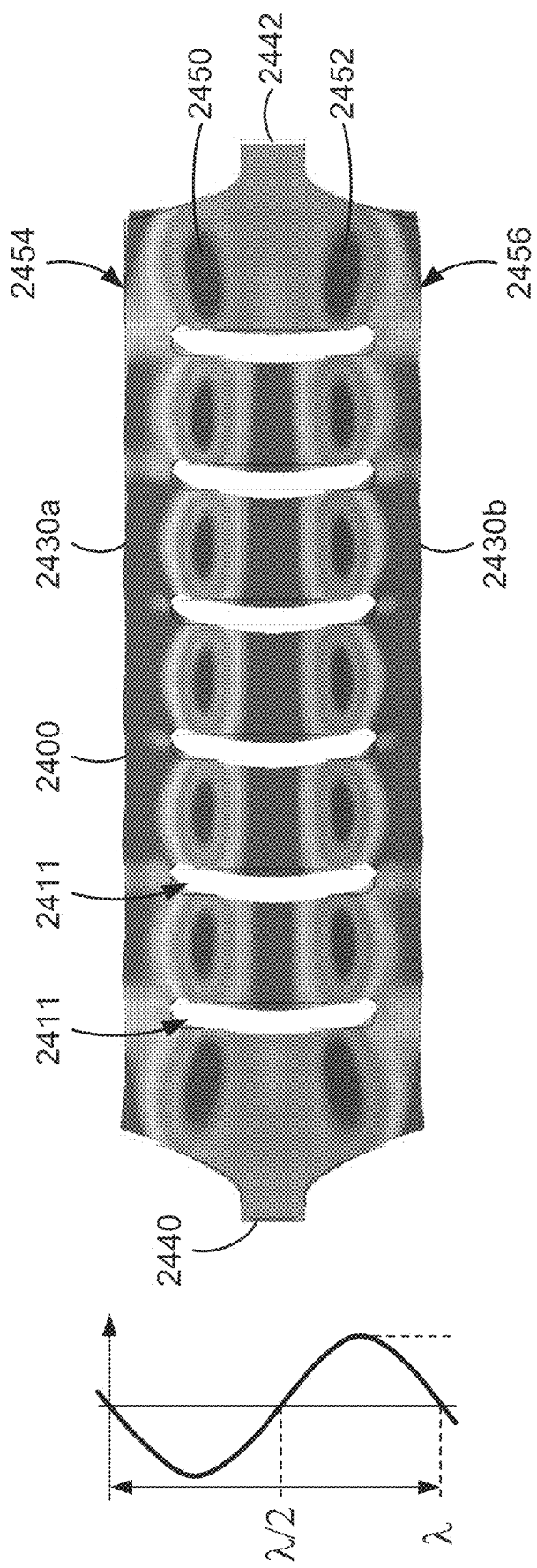
FIG. 24 is an FEA analysis of a paddle-style horn according to the present disclosure showing design principles of placement of the nodes and anti-nodes to produce a scrubbing motion along the horn's width (perpendicular to its height).

Scrub-type horns using an elongational horn but contacting the side create a scrubbing effect, such as the horns shown in FIGS. 13A through 14B and FIGS. 19A through 21. FIG. 24 illustrates an FEA analysis of a horn 2400 like those shown above that produce a back-and-forth scrubbing action. This horn 2400, which can be composed of a metal, including titanium, is a vertically-oriented horn having a height corresponding to one wavelength (1λ) of the applied ultrasonic frequency (e.g., 20 kHz). Example height dimensions include 4.6 inches per half wavelength (λ/2)+/−0.25 inches depending upon the overall configuration of the horn. It should be emphasized that these dimensions are exemplary only, and those skilled in the art can appreciate how to adapt the dimensions using the teachings of the present disclosure based on the wavelength and frequency of the applied ultrasonic energy. To produce the scrubbing effect, two sets of nodes 2450, 2452 (regions of minimum or minimal amplitude and maximum or maximal strain) are arranged at each λ/4 section along the height (1λ) of the horn 2400. By contrast, two anti-nodes 2454, 2456 are arranged at either end 2430a, 2430b of the horn 2400. The horn 2400 is fixed between points 2440, 2442, e.g., by respective boosters (not shown). A single ultrasonic transducer (not shown) can drive the horn 2400 to produce the scrubbing action along the ends 2430a, 2430b, thanks to the positions of the nodes 2450, 2452 and the anti-nodes 2454, 2456, which cooperate to produce the scrubbing action even with a single ultrasonic transducer.

Multiple slots 2411 can be formed along the length of the horn 2400, and the number of slots can be related to the length of the horn 2400 as described above.

For double-supported paddle-type horns, the choice of one versus two transducers is based upon the required input power level. If two transducers are used, the choice of push/push or push/pull is determined by the motion designed into the horn, whereas in two horn applications the push/push or push/pull can be chosen independently of the horn's design. The two horn embodiment has unique advantages described in FIGS. 2 through 3B above.

While some materials have been described herein as being suitable for sealing or welding using the synchronized dual-horn ultrasonic energy applications disclosed herein, including plastic and non-woven film, the present disclosure contemplates sealing or welding other types of same or dissimilar materials together, including pouches made from polyester printed to aluminum then laminated to polyethylene, metal including aluminum, metal foil, fabric, film, polyethylene-coated fiberboard or liquid paperboard, and the like. The scrubbing motion or cross-seal and all other aspects herein are particularly well suited for mono-layer plastic films, PLA, bioplastics, biopolymers, biodegradable polymers or recyclable materials, which are not particularly well-suited for heat sealing but seal very well when ultrasonic energy is applied at the seal interface. Thinner layers can be sealed consistently and even hermetically according to the aspects disclosed herein. By contrast, conventional heat sealing techniques can only be used on a few types of films with specific width and thickness, where the minimum width is much greater than is possible with the ultrasonic techniques disclosed herein.

Advantages of the systems and methods disclosed herein include:

Process speed increase: compared to conventional ultrasonic welding techniques that require multiple cycles and applications of ultrasonic energy, the systems and methods herein require only one cycle to create a hermetic seal for a variety of packaging, geometries, and materials.

Seal through same or dissimilar materials: a hermetic seal is formed through one application of synchronized ultrasonic energy imparted through two opposing horns, regardless of the material or its thickness uniformity.

Consistency, repeatability in weld results with wider process window parameters: Because two horns are applying the same ultrasonic energy (same frequency and phase) simultaneously, this effectively doubles the amplitude of the energy, enabling wider process window parameters compared to conventional techniques.

Housekeeping in production area, greener process (ultrasonic welding requires a lot less energy than heat seal technology): compared to heat-seal technologies that require application of heat energy to create a seal, ultrasonic energy by comparison utilizes less energy, creating a seal in a fraction of a second, such as 0.35 seconds or even faster.

Enable use of new materials, including bioplastics and material with poor welding compatibility: the dual horn setup synchronized to frequency and phase, and optionally coupled with the scrubbing action produced by the vibrations of the horns, significantly expands the available combinations of materials, interfaces, and geometries available for creating consistently high quality and hermetic seals or welds.

Waste and delay reduction; yield improvements: conventional techniques produce inconsistent seals, sometimes with tiny leaks, or can create burns or other visual artifacts requiring that some parts be discarded, lowering overall yield.

Narrower seal producing material savings: the interface or area to be sealed can be quite small compared to conventional techniques, allowing less overall material to be used. When millions of parts are being sealed or welded, a small reduction in material per part can yield a significant reduction in overall material.

Eliminate channel leaking: conventional techniques can produce tiny leaks that can create opportunities for air, pathogens, and/or mold to be present, but systems and methods of the present disclosure eliminate leaks without creating any visual artifacts and without causing burns at the interface of the seal. This can extend the shelf life of product inside the package/container, which allows product to be shipped farther over longer distance. Compared to thermal sealing, the ultrasonic techniques herein reduce leakage rate from 1.5% to about 0.87-0.50%, saving millions of packages annually, reducing landfill waste.

Reducing manufacturing process complexity as for example welding spout to pouches can be done in one pass or cycle with this technology. By comparison, the same spout-to-pouch welding is currently being carried out in three passes or cycles with conventional ultrasonic welding technology.

Eliminate liquid or product contamination in the joint area due to ultrasonic energy (vibrations) from the ultrasonic stacks. It can also eliminate liquid content between two joints on vertical or horizontal packaging machines, where liquid is not desirable (e.g., in a brick carton assembly line).

Unlike heat sealing, ultrasonic sealing produces heat only inside the seal, and not beyond. For applications such as wet food containing proteins and sugary drinks in pouches, for example, or salad or powdery products, it is important not to introduce thermal energy into the contents during the sealing process. Ultrasonic energy using the aspects disclosed herein prevent thermal impingement into the product contents. In ultrasonic sealing, the sealing layers bond together at a molecular layer before any undesirable heat conduction can be disseminated into the package contents or material. Using the ultrasonic techniques herein, packaging can be closed much more "gently" for the type of packaging and feed material. Shrinkage and leakage are minimized or all but eliminated altogether. The vibrational movements of the ultrasonic techniques herein can also advantageously vibrate potential contaminants away from the seal area. This is not possible with conventional thermal applications.

Moreover, many more highly accurate and digital parameter control options are available using the ultrasonic techniques disclosed herein. Whereas heat seal applications allow temperature, pressure, and time settings to be adjusted; the ultrasonic applications disclosed herein have the following parameters that can be adjusted with extreme precision, and using digital control: operating frequency, tool amplitude, weld mode (time, energy, or by collapse distance), velocity, trigger force, seal force, hold time, reject limits, and data acquisition for quality assurance, traceability, and regulatory requirements.

As mentioned above, the ultrasonic embodiments disclosed herein produce a smaller package size, a smaller seal width, and therefore material savings for each package. The following Table 1 illustrates one example of such savings:

TABLE 1

| | Package 1: Heated Tooling Seals | Package 2: Ultrasonic Seals |
|---|---|---|
| Overall package height | 6.0" | 5.25" |
| Width per seal (x2) | 0.50" (1.00") | 0.125" (0.25") |
| Internal package height | 5.0" | 5.0" |
| Production rate | 24 million | 24 million |
| Material savings/pkg | N/A | 0.75" |
| Net material savings | | 24 million x 0.75"/36~ 500,000 yards per year |

The following Table 2 shows total power savings, reducing the carbon impact using the ultrasonic embodiments disclosed herein:

TABLE 2

| | Heat Seal | Ultrasonic Seal |
|---|---|---|
| Seal rate/min | 100 | 100 |
| Consumption W/hr | 4 x 500 W cartridge heaters = 2000 W/hr | 1,500 W power supply = 1,500 W/hr max. with continuous operation; ~500 W/hr max in non-continuous operation |
| Total consumption (W x 16 hr) | 32,000 W/day | 24,000 W/day-continuous operation 500 W/day-non-continuous operation |
| Savings | | 25-75% depending on the application and operating time |

The ultrasonic embodiments disclosed herein are particularly well-suited for mono-materials or materials with a mono-layer as opposed to multiple layers. However, mono-materials are more susceptible to film shrinkage due to mechanically and thermally less stable support layers. The sealing seam appearance can suffer as a result. Ultrasonic sealing counteracts this due to cold tools, which has a in turn a positive effect on downtimes and the need for wear materials such as high-temperature Teflon tapes used in some conventional applications. Ultrasonic energy is only needed during the sealing time, so there is no need to have high standby power consumption as with conventional thermal sealing processes. The tools in the ultrasonic applications are ready for immediate use without having to heat up first.

What is claimed is:

1. An ultrasonic welding system having an ultrasonic transducer assembly, the system comprising:
   an ultrasonic transducer assembly including a horn and a first transducer arranged to impart ultrasonic energy into the horn, the horn having a first part-interfacing surface and a second part-interfacing surface opposite the first part-interfacing surface;
   an actuator assembly operatively coupled to the ultrasonic transducer assembly and configured to cause rotation of the horn;
   one or more controllers operatively coupled to the ultrasonic transducer assembly and to the actuator assembly, the one or more controllers operatively being configured to:
      cause the actuator assembly to rotate the horn so that the first part-interfacing surface applies the ultrasonic energy to a first part along an entire length of the first part-interface surface while a first ultrasonic energy is applied through the horn via the first transducer to cause the first part-interfacing surface to vibrate back and forth along its length as the first ultrasonic energy is applied by the first transducer to the horn.

2. The system of claim 1, wherein the horn has a paddle shape and a plurality of elongated slots formed along a body thereof to facilitate movement of the part-interfacing surfaces responsive to introduction of the first ultrasonic energy to the horn.

3. The system of claim 2, the ultrasonic transducer including a second transducer arranged to impart a second ultrasonic energy into the horn, the one or more controllers being configured to cause the second ultrasonic energy to be applied through the horn simultaneously with the first ultrasonic energy, wherein the first and second ultrasonic energies are synchronized in frequency and phase.

4. The system of claim 1, wherein the back and forth vibration movement is in a lateral direction parallel to an axis of rotation of the horn.

5. The system of claim 1, wherein a weld or seal is formed at the first part-interfacing surface without application of any external heat energy toward the weld or seal.

6. The system of claim 3, wherein the first and the second part-interfacing surfaces of the horn vibrate back and forth as the first and the second ultrasonic energies are applied by the first and second transducers to the horn, and wherein a direction of the movement of the vibrations of the first and the second part-interfacing surfaces is along a direction of rotation of the horn, and wherein the phase of the first ultrasonic energy is 180 degrees out of phase with the phase of the second ultrasonic energy.

7. The system of claim 2, wherein the second-part-interfacing surface is on an opposite side of the horn from the first part-interfacing surface such that they are 180 degrees apart from one another along the rotational axis of the horn.

8. The system of claim 1, wherein the second part-interfacing surface is parallel with the first part-interfacing surface.

9. The system of claim 8, further comprising a blade arranged relative to the anvil between the first surface and the second surface thereof, the one more controllers being configured to actuate the blade to cut the part in the intra-seal gap simultaneously as the first seal and the second seal are created or after the first seal and the second seal are created.

10. A method of using an ultrasonic transducer to cause a horn to vibrate relative to a part brought in contact with the horn, the method comprising the steps of:
  applying, to a horn of an ultrasonic transducer assembly that includes the horn and a first transducer, a first part-interfacing surface opposite a second part-interfacing surface, by the first transducer a first ultrasonic energy, the horn having a first part-interfacing surface; and
  causing the horn to rotate concurrently with the applying the ultrasonic energy along an entire length of the first part-interfacing surface and of the second part-interfacing surface to cause the first part-interfacing surface to vibrate back and forth along its length as the first ultrasonic energy is applied by the first transducer to the horn.

11. The method of claim 10, wherein the ultrasonic transducer assembly includes a second transducer that outputs a second ultrasonic energy, the first part-interfacing surface of the horn vibrating back and forth in response to applying the first and the second ultrasonic energies by the first and second transducers to the horn.

12. The method of claim 11, further comprising causing the second ultrasonic energy to be applied through the horn simultaneously with the first ultrasonic energy, wherein the first and second ultrasonic energies are synchronized in frequency and phase.

13. The method of claim 10, wherein the back and forth vibration movement is in a lateral direction parallel to an axis of rotation of the horn.

14. The method of claim 10, further comprising the steps of:
  creating a first seal on a first part via the first part-interfacing surface during the rotation of the horn; and
  creating a second seal on a second part via the second part-interfacing surface during the rotation of the horn.

15. The method of claim 11, wherein a direction of movement of the vibrations of the first part-interfacing surface is along a direction of the rotation of the horn, and wherein the phase of the first ultrasonic energy is 180 degrees out of phase with the phase of the second ultrasonic energy.

16. The method of claim 11, wherein the first part-interfacing surface is parallel with the second part-interfacing surface.

17. An ultrasonic welding system having an ultrasonic transducer assembly, the system comprising:
  an ultrasonic transducer assembly including a horn and a first transducer arranged to impart ultrasonic energy into the horn, the horn having a first part-interfacing surface at an exposed edge extending along a length of the horn and configured to contact a part to be joined, and a second surface along an opposite exposed edge extending along the length, wherein the height is a distance between the exposed edge and the opposite exposed edge;
  wherein the horn has a height corresponding to an integer multiple of one wavelength, λ, of the applied ultrasonic energy, and includes at least two nodes and at least two anti-nodes, wherein the at least two nodes are areas or regions of the horn of minimal amplitude of the ultrasonic energy and maximal mechanical strain of the horn, and wherein the at least two anti-nodes are areas or regions of the horn of maximal amplitude and minimal mechanical strain, wherein a first of the at least two nodes is arranged at about λ/4 from the first part-interfacing surface, and a second of the at least two nodes is arranged at about λ/4 from the second surface, and wherein a first of the at least two anti-nodes is proximate the first part-interfacing surface, and a second of the at least two anti-nodes is proximate the second surface;
  one or more controllers operatively coupled to the ultrasonic transducer assembly and to the actuator assembly, the one or more controllers operatively being configured to:
    cause the first transducer to impart the ultrasonic energy directly or indirectly via one or more boosters into the horn to cause the first part-interfacing surface to vibrate back and forth along the length in a direction transverse to the height.

18. The ultrasonic welding system of claim 17, further comprising a second transducer arranged to impart ultrasonic energy having the same or different frequency and amplitude as the ultrasonic energy imparted by the first transducer.

19. The ultrasonic welding system of claim 17, wherein the integer is one, and wherein a frequency of the ultrasonic energy is about 20 kHz.

* * * * *